United States Patent
Piao et al.

(10) Patent No.: US 11,616,971 B2
(45) Date of Patent: Mar. 28, 2023

(54) ENCODING AND DECODING METHOD AND DEVICE FOR DETERMINING A DECODING ORDER BETWEEN A LEFT AND A RIGHT LOWER BLOCKS

(71) Applicant: SAMSUNG ELECTRONICS CO., LTD., Suwon-si (KR)

(72) Inventors: Yin-ji Piao, Yongin-si (KR); Jie Chen, Seoul (KR); Elena Alshina, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/651,865

(22) PCT Filed: Mar. 30, 2018

(86) PCT No.: PCT/KR2018/003824
§ 371 (c)(1),
(2) Date: Mar. 27, 2020

(87) PCT Pub. No.: WO2019/066174
PCT Pub. Date: Apr. 4, 2019

(65) Prior Publication Data
US 2020/0260104 A1 Aug. 13, 2020

Related U.S. Application Data

(60) Provisional application No. 62/564,660, filed on Sep. 28, 2017.

(51) Int. Cl.
*H04N 7/12* (2006.01)
*H04N 19/52* (2014.01)
(Continued)

(52) U.S. Cl.
CPC ........... *H04N 19/52* (2014.11); *H04N 19/117* (2014.11); *H04N 19/159* (2014.11);
(Continued)

(58) Field of Classification Search
CPC ............................. H04N 19/52; H04N 19/647
See application file for complete search history.

(56) References Cited

U.S. PATENT DOCUMENTS

| | | | |
|---|---|---|---|
| 9,420,293 B2 | 8/2016 | Song et al. | |
| 2013/0064292 A1 | 3/2013 | Song et al. | |

(Continued)

FOREIGN PATENT DOCUMENTS

| | | |
|---|---|---|
| CN | 102907100 A | 1/2013 |
| KR | 1020110126485 A | 11/2011 |

(Continued)

OTHER PUBLICATIONS

Communication dated Jul. 22, 2021 issued by the Korean Intellectual Property Office in application No. 10-2020-7004583.
(Continued)

*Primary Examiner* — Y Lee
(74) *Attorney, Agent, or Firm* — Sughrue Mion, PLLC

(57) ABSTRACT

A video decoding method includes obtaining split information indicating whether to split a current block, splitting the current block into two or more lower blocks when the split information indicates to split the current block, obtaining encoding order information indicating an encoding order of the lower blocks of the current block, determining a decoding order of the lower blocks according to the encoding order information, and decoding the lower blocks according to the decoding order.

3 Claims, 34 Drawing Sheets

(51) Int. Cl.
*H04N 19/117* (2014.01)
*H04N 19/159* (2014.01)
*H04N 19/176* (2014.01)
*H04N 19/635* (2014.01)
*H04N 19/64* (2014.01)

(52) U.S. Cl.
CPC ......... *H04N 19/176* (2014.11); *H04N 19/635* (2014.11); *H04N 19/647* (2014.11)

(56) References Cited

U.S. PATENT DOCUMENTS

| | | |
|---|---|---|
| 2014/0341283 A1 | 11/2014 | Choi et al. |
| 2017/0272750 A1 | 9/2017 | An et al. |
| 2017/0353721 A1 | 12/2017 | Piao et al. |
| 2019/0281285 A1 | 9/2019 | Piao et al. |

FOREIGN PATENT DOCUMENTS

| | | |
|---|---|---|
| KR | 10-2013-0031078 A | 3/2013 |
| KR | 1020130085391 A | 7/2013 |
| KR | 10-1379188 B1 | 4/2014 |
| WO | 2011/145819 A2 | 11/2011 |
| WO | 2013/062194 A1 | 5/2013 |
| WO | 2017123980 A1 | 7/2017 |

OTHER PUBLICATIONS

Shiodera et al. "Block Based Extra/Inter-Polating Prediction for Intra Coding" Corporate Research & Development Center, Toshiba Corporation, ICIP, Sep. 1, 2007, pp. VI 445-VI 448 (4 total pages).
F. Le Leannec et al. "Asymmetric Coding Units in QTBT" Joint Video Exploration Team (JVET) of ITU-T SG 16 WP 3 and ISO/IEC JTC 1/SC 29/WG 11, Chengdu China, Oct. 10, 2016, Document JVET-D0064, 10 pages.
Huang et al. "EE2.1: Quadtree plus binary tree structure integration with JEM tools" Joint ideo Exploration Team (JVET) of ITU-T SG 16 WP 3 and ISO/IEC JTC 1/SC 29/WG 11, Geneva Switzerland, May 26, 2016, Document: JVET-C0024; 5 pages.
Communication dated Jan. 15, 2021 by the European Patent Office in corresponding European Application No. 18863068.5.
Shunsuke Iwamura et al., "Direction-dependent scan order with JEM tools", Joint Video Exploration Team (JVET) of ITU-T SG 16 WP 3 and ISO/IEC JTC 1/SC 29/WG 11, JVET-C0069, 3rd Meeting, Geneva, CH, Jun. 1, 2016, 7 pages.
International Search Report (PCT/ISA/210) dated Jul. 12, 2018 issued by the International Searching Authority in International Application No. PCT/KR2018/003824.
Written Opinion (PCT/ISA/237) dated Jul. 12, 2018 issued by the International Searching Authority in International Application No. PCT/KR2018/003824.
Communication dated Jan. 12, 2022, issued by the Korean Intellectual Property Office in Korean Patent Application No. 10-2020-7004583.
Iwamura et al., "Direction-dependent sub-TU scan order on intra prediction," Joint Video Exploration Team (JVET) of ITU-T SG 16 WP 3 and ISO/IEC JTC 1/SC 29/WG 11, JVET-B0028, Feb. 2016, Total 4 pages.
"High efficiency video coding," H.265 (Apr. 2013), ITU-T, Series H: Audiovisual and Multimedia Systems, Infrastructure of audiovisual services—Coding of moving video, Jun. 2013, Total 317 pages.
Communication dated Jun. 24, 2022 by the Korean Intellectual Property Office in counterpart Korean Patent Application No. 10-2020-7004583.
Communication dated May 5, 2022 by the State Intellectual Property Office of P.R. China in counterpart Chinese Patent Application No. 201880062645.4.
Communication dated Nov. 11, 2022, issued by the European Patent Office in counterpart European Application No. 18863068.5.

FIG. 3
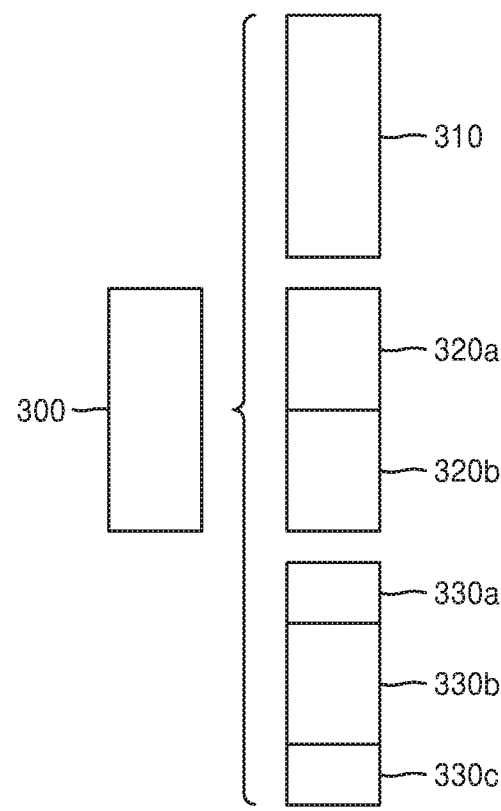
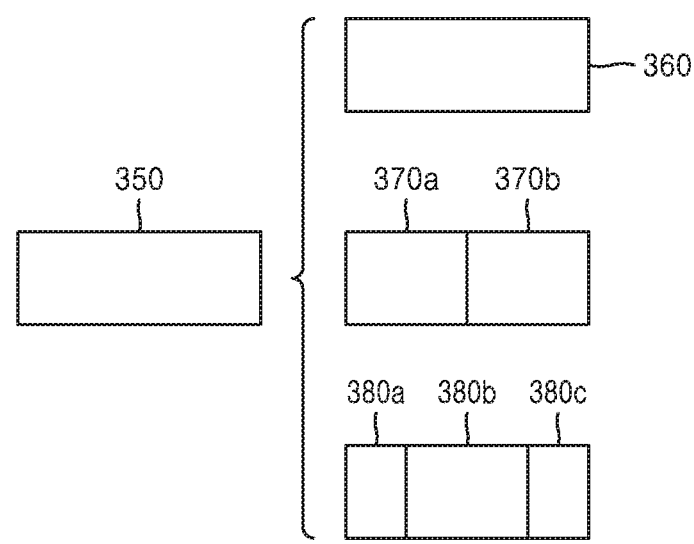

FIG. 12

| BLOCK SHAPE / DEPTH | 0: SQUARE | 1: NS_VER | 2: NS_HOR |
|---|---|---|---|
| DEPTH D | 1200 | 1210 | 1220 |
| DEPTH D+1 | 1202 | 1212 | 1222 |
| DEPTH D+2 | 1204 | 1214 | 1224 |
| ... | ... | ... | ... |

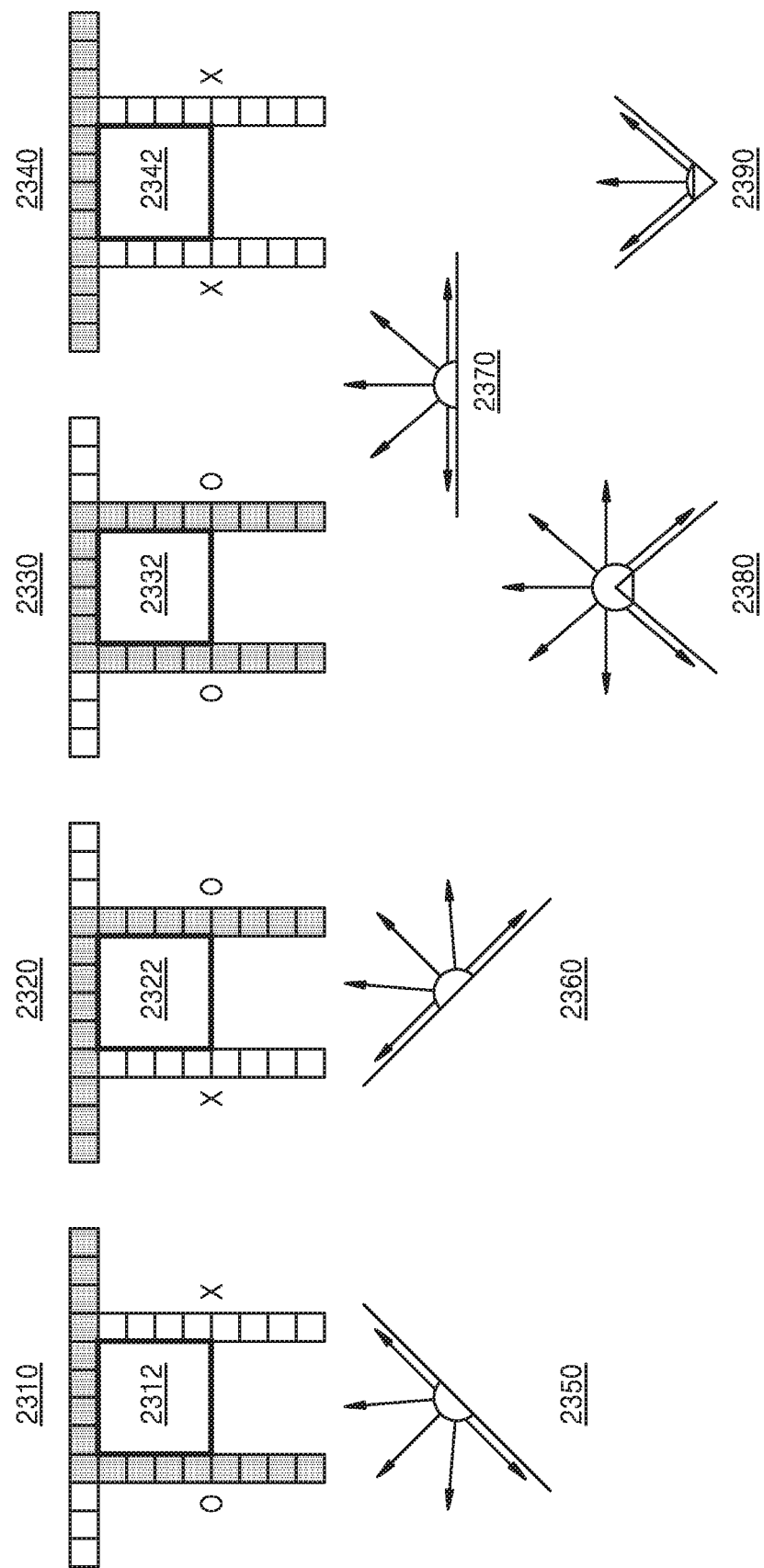

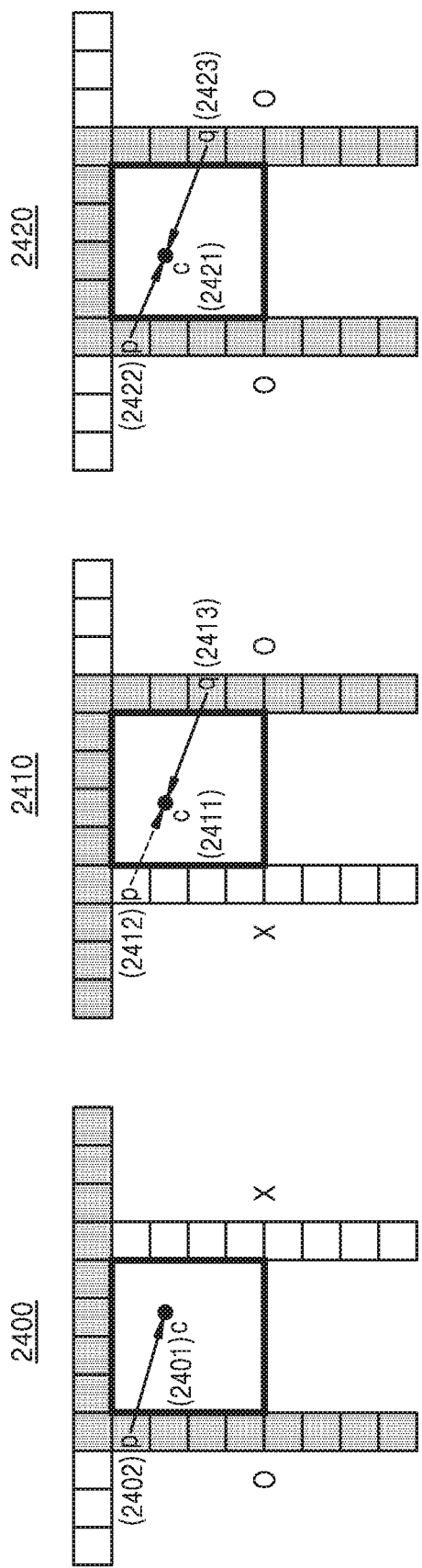

FIG. 33

| | Descriptor |
|---|---|
| split_unit( ) { | |
|    split_mode | ae(v) |
|    if( split_mode = = QUAD_SPLIT \|\| split_mode = = BI_VER_SPLIT | |
|       split_mode = = TRI_VER_SPLIT ) { | |
|       suco_info | ae(v) |
|    } | |
|    if( split_info = = QUAD_SPLIT ) { | |
|       if( suco_info = = 0 ) { | |
|          split_unit( sub_pos_0 ) | |
|          split_unit( sub_pos_1 ) | |
|          split_unit( sub_pos_2 ) | |
|          split_unit( sub_pos_3 ) | |
|       } | |
|       else { | |
|          split_unit( sub_pos_1 ) | |
|          split_unit( sub_pos_0 ) | |
|          split_unit( sub_pos_3 ) | |
|          split_unit( sub_pos_2 ) | |
|       } | |
|    } | |
|    else if( split_mode = = BI_VER_SPLIT ) { | |
|       if( suco_info = = 0 ) { | |
|          split_unit( sub_pos_0 ) | |
|          split_unit( sub_pos_1 ) | |
|       } | |
|       else { | |
|          split_unit( sub_pos_1 ) | |
|          split_unit( sub_pos_0 ) | |
|       } | |
|    } | |
|    else if( split_mode = = BI_HOR_SPLIT ) { | |
|       split_unit( sub_pos_0 ) | |
|       split_unit( sub_pos_1 ) | |
|    } | |
|    else if( split_mode = = TRI_VER_SPLIT ) { | |
|       if( suco_info = = 0 ) { | |
|          split_unit( sub_pos_0 ) | |
|          split_unit( sub_pos_1 ) | |
|          split_unit( sub_pos_2 ) | |
|       } | |
|       else { | |
|          split_unit( sub_pos_2 ) | |
|          split_unit( sub_pos_1 ) | |
|          split_unit( sub_pos_0 ) | |
|       } | |
|    } | |
|    else if( split_mode = = TRI_HOR_SPLIT ) { | |
|       split_unit( sub_pos_0 ) | |
|       split_unit( sub_pos_1 ) | |
|       split_unit( sub_pos_2 ) | |
|    } | |
|    else { // split_mode = = NO_SPLIT | |
|       coding_unit( ⋯ ) | |
|    } | |
| } | |

ENCODING AND DECODING METHOD AND DEVICE FOR DETERMINING A DECODING ORDER BETWEEN A LEFT AND A RIGHT LOWER BLOCKS

CROSS-REFERENCE TO RELATED APPLICATIONS

This is a National Stage of International Application of PCT/KR2018/003824 filed Mar. 30, 2018, claiming priority based on U.S. Provisional Application No. 62/564,660 filed on Sep. 28, 2017, the contents of all of which are incorporated herein by reference in their entirety.

TECHNICAL FIELD

The present disclosure relates to a video encoding method and decoding method and, more specifically, to a method of determining an encoding/decoding order of a block included in an image.

BACKGROUND ART

A large amount of data is required to encode a high-quality video. However, a bandwidth allowed for transmission of video data is limited, and thus, a data rate to be applied for transmission of video data may be limited. Thus, for efficient transmission of video data, there is a need for a method of encoding and decoding video data at a higher compression ratio while minimizing degradation of image quality.

Video data may be compressed by removing spatial redundancy and temporal redundancy between pixels. Generally, there are common features between adjacent pixels, and thus, encoding information is transmitted in a data unit composed of pixels to remove redundancy between adjacent pixels.

Pixel values of the pixels included in the data unit are not directly transmitted, but a method necessary to obtain the pixel values is transmitted. A prediction method of predicting a pixel value close to an original value is determined for each data unit, and encoding information regarding the prediction method is transmitted from an encoder to a decoder. In addition, because the predicted value is not exactly the same as the original value, residual data regarding the difference between the original value and the predicted value is transmitted from the encoder to the decoder.

As the accuracy of prediction increases, the amount of encoding information required to specify the prediction method increases, but the size of the residual data decreases. Therefore, a prediction method is determined considering the sizes of the encoding information and the residual data. In particular, data units split from a picture have various sizes. As the sizes of the data units increase, the accuracy of prediction is more likely to decrease, but the amount of encoding information decreases. Therefore, a block size is determined according to characteristics of the picture.

Prediction methods are split into intra prediction and inter prediction. Intra prediction is a method of predicting pixels of a block from adjacent pixels of the block. Inter prediction is a method of predicting pixels by referring to pixels of another picture referenced by a picture including a block. Therefore, spatial redundancy is removed by intra prediction, and temporal redundancy is removed by inter prediction.

As the number of prediction methods increases, the amount of encoding information to indicate the prediction method increases. Therefore, the encoding information applied to the block may also be predicted from another block to reduce the size of the encoding information.

Because loss of video data is allowed provided it is not recognized by human vision, the residual data may be lossy compressed by transformation and quantization to reduce the amount of residual data.

DESCRIPTION OF EMBODIMENTS

Technical Problem

Provided is a video encoding method of determining whether to split a current block and an encoding order of lower blocks and determining an encoding method according to whether adjacent blocks of the current block are encoded. In addition, provided is a video decoding method of splitting a current block, determining an encoding order of split lower blocks, and determining an encoding method according to whether adjacent blocks of the current block are encoded. Further, provided is a computer-readable recording medium having recorded thereon a program for executing, on a computer, a video encoding method and a video decoding method according to an embodiment of the present disclosure.

Solution to Problem

Provided is a video decoding method including obtaining, from a bitstream, split information indicating whether to split a current block, when the split information does not indicate to split the current block, decoding the current block according to encoding information of the current block, and, when the split information indicates to split the current block, splitting the current block into two or more lower blocks, obtaining, from the bitstream, encoding order information indicating an encoding order of the lower blocks of the current block, determining a decoding order of the lower blocks according to the encoding order information, and decoding the lower blocks according to the decoding order.

Provided is a video decoding device including a block splitter configured to split a current block into two or more lower blocks when split information indicating whether to split the current block indicates to split the current block, an encoding order determiner configured to determine a decoding order of the lower blocks according to encoding order information indicating an encoding order of the lower blocks when the current block is split into the lower blocks, a prediction method determiner configured to determine a prediction method of the current block when the split information indicates that the current block is not split, and a decoder configured to reconstruct the current block depending on a result of prediction according to the prediction method.

Provided is a video encoding method including splitting a current block into two or more lower blocks, determining whether to split the current block according a result of splitting the current block to generate split information indicating whether the current block is split, determining an encoding order of the lower blocks of the current block according to coding efficiency of the current block to obtain encoding order information indicating the encoding order of the lower blocks, and outputting a bitstream including the split information and the encoding order information.

Provided is a video encoding device including an encoding information generator configured to split a current block into two or more lower blocks, determine whether to split the current block according to a result of splitting the current block, generate split information indicating whether to split the current block, determine an encoding order of the lower blocks of the current block according to coding efficiency of the current block, and generate encoding order information indicating the encoding order of the lower blocks, and an output unit configured to output a bitstream including the split information and the encoding order information.

A non-transitory computer-recordable recording medium having recorded thereon a program for executing the video encoding method and the video decoding method.

The technical problems to be achieved by the disclosure are not limited to the technical features described above, and other technical problems may be inferred from embodiments below.

Advantageous Effects of Disclosure

Coding efficiency of an image may be enhanced by determining whether to split a current block and an encoding order of lower blocks and determining an encoding method of the lower blocks according to the encoding order of the lower blocks.

BRIEF DESCRIPTION OF DRAWINGS

FIG. 3 illustrates a process of determining at least one coding unit by splitting a non-square coding unit, according to an embodiment.

FIG. 12 illustrates a process of determining a depth of a coding unit as a shape and size of the coding unit change, when the coding unit is recursively split such that a plurality of coding units are determined, according to an embodiment.

FIG. 23 illustrates a range of an intra prediction direction according to whether an adjacent block is reconstructed.

FIG. 24 illustrates a method of determining a reference sample to be referenced by a current sample according to whether an adjacent block is reconstructed and an intra prediction direction.

FIG. 33 is a diagram for explaining a method of indicating splits of a current coding unit.

BEST MODE

Figure 1A:
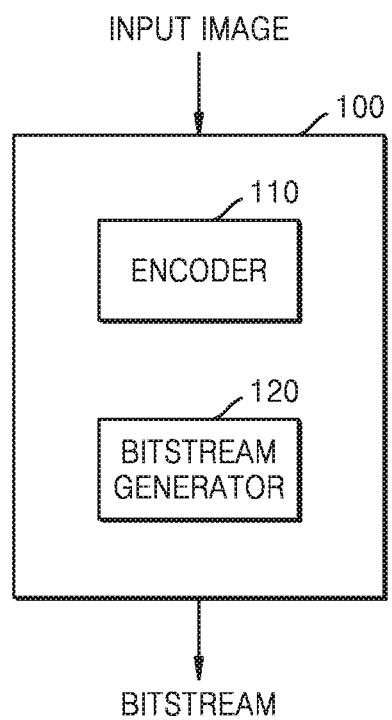
FIG. 1A illustrates a block diagram of an video encoding device based on a coding unit having a tree structure, according to an embodiment of the present disclosure.

Provided is a video decoding method including obtaining, from a bitstream, split information indicating whether to split a current block, when the split information does not indicate to split the current block, decoding the current block according to encoding information of the current block, and, when the split information indicates to split the current block, splitting the current block into two or more lower blocks, obtaining, from the bitstream, encoding order information indicating an encoding order of the lower blocks of the current block, determining a decoding order of the lower blocks according to the encoding order information, and decoding the lower blocks according to the decoding order.

MODE OF DISCLOSURE

Advantages and features of disclosed embodiments and a method of achieving the advantages and features will be apparent by referring to embodiments described below in connection with the accompanying drawings. However, the present disclosure is not restricted by these embodiments but can be implemented in many different forms, and the present embodiments are provided to complete the present disclosure and to allow those having ordinary skill in the art to understand the scope of the disclosure.

Terms used in the present specification will be briefly described, and the disclosed embodiments will be described in detail.

Although general terms being widely used in the present specification were selected as terminology used in the present specification while considering the functions of the disclosure, they may vary according to intentions of one of ordinary skill in the art, judicial precedents, the advent of new technologies, and the like. Terms arbitrarily selected by the applicant of the disclosure may also be used in a specific case. In this case, their meanings will be described in detail in the detailed description of the disclosure. Hence, the terms must be defined based on the meanings of the terms and the contents of the entire disclosure, not by simply stating the terms themselves.

It is to be understood that the singular forms "a," "an," and "the" include plural referents unless the context clearly dictates otherwise.

It will be understood that when a certain part "includes" a certain component, the part does not exclude another component but can further include another component, unless the context clearly dictates otherwise. In addition, terms such as "unit" used in the specification indicate software or a hardware component such as a field-programmable gate array (FPGA) or an application-specific integrated circuit (ASIC), and the "unit" performs certain functions. However, the "unit" is not limited to software or hardware. The "unit" may be formed so as to be in an addressable storage medium, or may be formed so as to operate one or more processors. Thus, for example, the term "unit" may refer to components, such as software components, object-oriented software components, class components, and task components, and may include processes, functions, attributes, procedures, subroutines, segments of program code, drivers, firmware, micro code, circuits, data, a database, data structures, tables, arrays, or variables. A function provided by the components and "units" may be associated with a smaller number of components and "units", or may be split into additional components and "units".

A "current block" means one of a coding unit, a prediction unit, and a transform unit, which are currently encoded or decoded. For convenience of description, when it is necessary to distinguish other types of blocks such as a prediction unit, a transform unit, and the like, a "current encoding block", a "current prediction block", and a "current transform block" may be used. In addition, a "lower block" means a data unit split from a "current block". An "upper block" means a data unit including a "current block".

Hereinafter, a "sample", which is data assigned to a sampling location of an image, means data that is to be processed. For example, pixel values in an image of a spatial domain and transformation coefficients on a transformation domain may be samples. A unit including at least one of such samples may be defined as a block.

Hereinafter, embodiments will be described in detail with reference to the accompanying drawings such that one of ordinary skill in the art may easily implement the embodiments. In the drawings, parts irrelevant to the description are omitted to clearly describe the embodiments.

FIG. 1A illustrates a block diagram of an image encoding device 100 based on a coding unit having a tree structure, according to an embodiment of the present disclosure.

The image encoding device 100 includes an encoder 110 and a bitstream generator 120.

The encoder 110 splits a picture or a slice included in the picture into a plurality of largest coding units according to a size of the largest coding unit. The largest coding unit, which is a data unit having a size of 32×32, 64×64, 128×128, 256×256, or the like, may be a square data unit having a horizontal and vertical size of squares of 2. The encoder 110 may provide the bitstream generator 120 with largest coding unit size information indicating the size of the largest coding unit. In addition, the bitstream generator 120 may include the largest coding unit size information in a bitstream.

The encoder 110 splits the largest coding unit to determine a coding unit. Whether to split the coding unit is determined according to whether splitting of the coding unit is efficient by rate-distortion optimization. In addition, split information indicating whether the coding unit is split may be generated. The split information may be expressed in the form of a flag.

The coding unit may be split in various ways. For example, a square coding unit may be split into four square coding units, the width and height of which are half those of the square coding unit. The square coding unit may be split into two rectangular coding units each having a width half that of the square coding unit. The square coding unit may be split into two rectangular coding units each having a height half that of the square coding unit. The square coding unit may be split into three coding units by splitting its width and height in a ratio of 1:2:1.

A rectangular coding unit having a width twice its height may be split into two square coding units. The rectangular coding unit having the width twice its height may be split into two rectangular coding units each having a width four times its height. The rectangular coding unit having the width twice its height may be split into two rectangular coding units and one square coding unit by splitting its width in a ratio of 1:2:1.

Equally, a rectangular coding unit having a height twice its width may be split into two square coding units. In addition, the rectangular coding unit having a height twice its width may be split into two rectangular coding units each having a height four times its width. Equally, the rectangular coding unit having the height twice its width may be split into two rectangular coding units and one square coding unit by splitting its height in a ratio of 1:2:1.

When two or more splitting methods are usable by the image encoding device 100, information about splitting methods applicable to a coding unit among the splitting methods usable by the image encoding device 100 may be determined for each picture. Thus, it may be determined that only specific splitting methods are used for each picture. When the image encoding device 100 uses only one splitting method, information about splitting methods applicable to the coding unit is not separately determined.

A coding unit having a specific size may be split by using a specific splitting method. For example, when the size of the coding unit is 256×265, the coding unit may be set to be split into only four square coding units having its half width and half height.

When split information of the coding unit indicates that the coding unit is to be split, split shape information indicating a splitting method of the coding unit may be generated. When there is only one splitting method applicable to a picture to which the coding unit belongs, split shape information may not be generated. When the splitting method is adaptively determined based on encoding information around the coding unit, split shape information may not be generated.

As described above, according to a maximum size of the coding unit, image data of a current picture is split into largest coding units. In addition, each largest coding unit may include coding units hierarchically split from the largest coding unit. Shapes and locations of lower coding units may be determined according to a split shape of an upper coding unit. Also, a minimum size of a coding unit that restricts splitting of the coding unit may be preset.

The encoder 110 compares coding efficiency when the coding unit is hierarchically split with coding efficiency when the coding unit is not split. The encoder 110 determines whether to split the coding unit according to a result of the comparison. When it is determined that splitting of the coding unit is more efficient, the encoder 110 hierarchically splits the coding unit. When it is determined that it is more efficient not to split the coding unit according to the result of the comparison, the encoder 110 does not split the coding unit. Whether to split the coding unit may be determined independently of whether to split other adjacent coding units.

A finally split coding unit may be predicted by intra prediction or inter prediction. Intra prediction is a method of predicting samples of a prediction unit by using reference samples around the prediction unit. Inter prediction is a method of predicting samples of a prediction unit by obtaining a reference sample from a reference picture referenced by a current picture.

For intra prediction, the encoder 110 may select the most efficient intra prediction method by applying a plurality of intra prediction methods to the prediction unit. The intra prediction method includes a discrete cosine (DC) mode, a planar mode, and a directional mode such as a vertical mode and a horizontal mode.

The intra prediction may be performed on each prediction unit when a reconstructed sample around a coding unit is used as a reference sample. However, when a reconstructed sample in a coding unit is used as a reference sample, reconstruction of the reference sample in the coding unit has to precede prediction, and thus, a prediction order of the prediction unit may be dependent on a transformation order of a transform unit. Therefore, when the reconstructed sample in the coding unit is used as the reference sample, only an intra prediction method for transform units corresponding to the prediction unit is determined with respect to the prediction unit, and substantial intra prediction may be performed on each transform unit.

The encoder 110 may select the most efficient inter prediction method by determining an optimal motion vector and reference picture. For inter prediction, the encoder 110 may determine a plurality of motion vector candidates from among coding units spatially and temporally neighboring to a current coding unit and may determine, as a motion vector, the most efficient motion vector from among the plurality of motion vector candidates. Equally, the encoder 110 may determine a plurality of reference picture candidates from among the coding units spatially and temporally neighboring to the current coding unit and may determine the most efficient reference picture from among the plurality of reference picture candidates. According to an embodiment, the reference picture may be determined from among a predetermined list of reference pictures with respect to the current picture. According to an embodiment, for accuracy of prediction, the encoder 110 may determine the most efficient motion vector from among the plurality of motion vector candidates as a prediction motion vector and may correct the prediction motion vector to determine the motion vector. The inter prediction may be parallel performed on each prediction unit in the coding unit.

The encoder 110 may reconstruct the coding unit by obtaining only information indicating a motion vector and a reference picture according to a skip mode. In the skip mode, all encoding information including a residual signal is omitted except for the information indicating the motion vector and the reference picture. Because the residual signal is omitted, the skip mode may be used when accuracy of prediction is very high.

A partition mode used according to a prediction method of a prediction unit may be limited. For example, only a partition mode for prediction units having a size of 2N×2N or N×N may be applied to intra prediction, whereas a partition mode for prediction units having a size of 2N×2N, 2N×N, N×2N, or N×N may be applied to inter prediction. In addition, only a partition mode for a prediction unit having a size of 2N×2N may be applied to a skip mode in inter prediction. A partition mode allowed for each prediction method in the image encoding device 100 may be changed according to coding efficiency.

The image encoding device 100 may perform transformation based on the coding unit. The image encoding device 100 may transform residual data, which is a difference value between an original value and a prediction value with respect to pixels included in the coding unit, through a predetermined process. For example, the image encoding device 100 may lossy compress the residual data through quantization and discrete cosine transform (DCT)/discrete sine transform (DST). Alternatively, the image encoding device 100 may lossless compress the residual data without quantization.

As a result, the encoder 110 determines a prediction method that is most efficient for the current coding unit from among a plurality of intra prediction methods and a plurality of inter prediction methods. Also, the encoder 110 determines a prediction method of the current coding unit according to coding efficiency based on a result of prediction. Equally, the encoder 110 may determine a transformation method according to coding efficiency according to a result of transformation. The coding efficiency of the coding unit is finally determined according to a method of determining the most efficient prediction method and transformation method of the coding unit. The encoder 110 determines a hierarchical structure of a largest coding unit according to coding efficiency of a finally split coding unit.

The encoder 110 may measure coding efficiency of the coding unit, prediction efficiency of prediction methods, and the like by using Lagrangian multiplier-based rate-distortion optimization.

The encoder 110 may generate split information indicating whether to split the coding unit, based on the hierarchical structure of the determined largest coding unit. In addition, the encoder 110 may generate partition mode information for determination of the prediction unit and transform unit split information for determination of the transform unit, with respect to a split coding unit. When there are two or more splitting methods of coding units, the encoder 110 may generate split shape information indicating a splitting method together with split information. The encoder 110 may generate information about a prediction method and a transformation method used in the prediction unit and the transform unit.

The bitstream generator 120 may output pieces of information generated by the encoder 110 in a form of a bitstream according to the hierarchical structure of the largest coding unit.

According to an embodiment, a method of determining the coding unit, the prediction unit, and the transform unit according to a tree structure of the largest coding unit will be described in detail with reference to FIGS. 3 through 12.

Figure 1B:
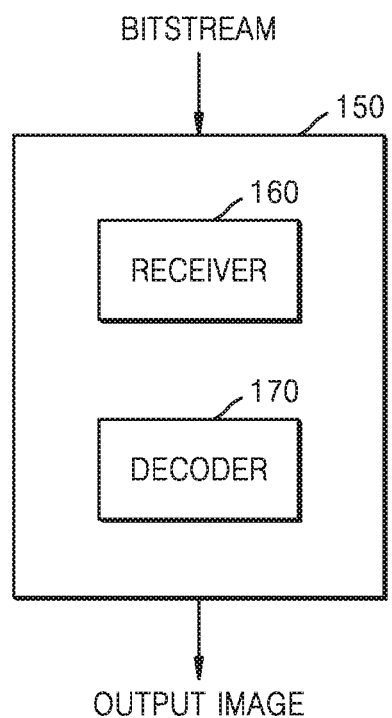
FIG. 1B illustrates a block diagram of a video decoding device based on a coding unit having a tree structure, according to an embodiment.

FIG. 1B illustrates a block diagram of an image decoding device 150 based on a coding unit having a tree structure, according to an embodiment.

The image decoding device 150 includes a receiver 160 and a decoder 170.

According to an embodiment, definitions of various terms, such as a coding unit, a prediction unit, a transform unit, and various pieces of split information, for decoding operations of the image decoding device 150 are the same as those described above with reference to FIG. 1 and the image encoding device 100. In addition, because the purpose of the image decoding device 150 is to reconstruct image data, various encoding methods used in the image encoding device 100 may be applied to the image decoding device 150.

The receiver 160 receives and parses a bitstream of an encoded video. The decoder 170 extracts, from the parsed bitstream, information required for decoding for each largest coding unit. The decoder 170 may extract information about a maximum size of a coding unit of a current picture from a header, a sequence parameter set, or a picture parameter set with respect to the current picture.

In addition, the decoder 170 extracts, from the parsed bitstream, split information about coding units having a tree structure for each largest coding unit. The extracted split information is output to the decoder 170. The decoder 170 may determine a tree structure of the largest coding unit by splitting the largest coding unit based on the extracted split information.

The split information extracted by the decoder 170 is split information about a tree structure determined to have a minimum encoding error by the image encoding device 100. Accordingly, the image decoding device 150 may decode data according to an encoding method that generates a minimum encoding error to reconstruct an image.

The decoder 170 may extract split information about a data unit such as a prediction unit and a transform unit included in the coding unit. For example, the decoder 170 may extract information about the most efficient partition mode with respect to the prediction unit. The decoder 170 may extract transformation split information about the most efficient tree structure with respect to the transform unit.

In addition, the decoder 170 may obtain information about the most efficient prediction method with respect to prediction units split from the coding unit. The decoder 170 may obtain information about the most efficient transformation method with respect to transform units split from the coding unit.

The decoder 170 extracts information from the bitstream according to a method of constructing a bitstream, performed by the bitstream generator 120 of the image encoding device 100.

The decoder 170 may split the largest coding unit into coding units having the most efficient tree structure based on the split information. Also, the decoder 170 may split the coding unit into prediction units according to the information about the partition mode. The decoder 170 may split the coding unit into transform units according to the transformation split information.

The decoder 170 may predict the prediction unit according to the information about the prediction method. The decoder 170 may inversely quantize and inversely transform residual data corresponding to a difference between an original value and a prediction value of a pixel, according to information about a transformation method of a transform unit. In addition, the decoder 170 may reconstruct pixels of the coding unit according to a result of predicting the prediction unit and a result of transforming the transform unit.

Figure 2:
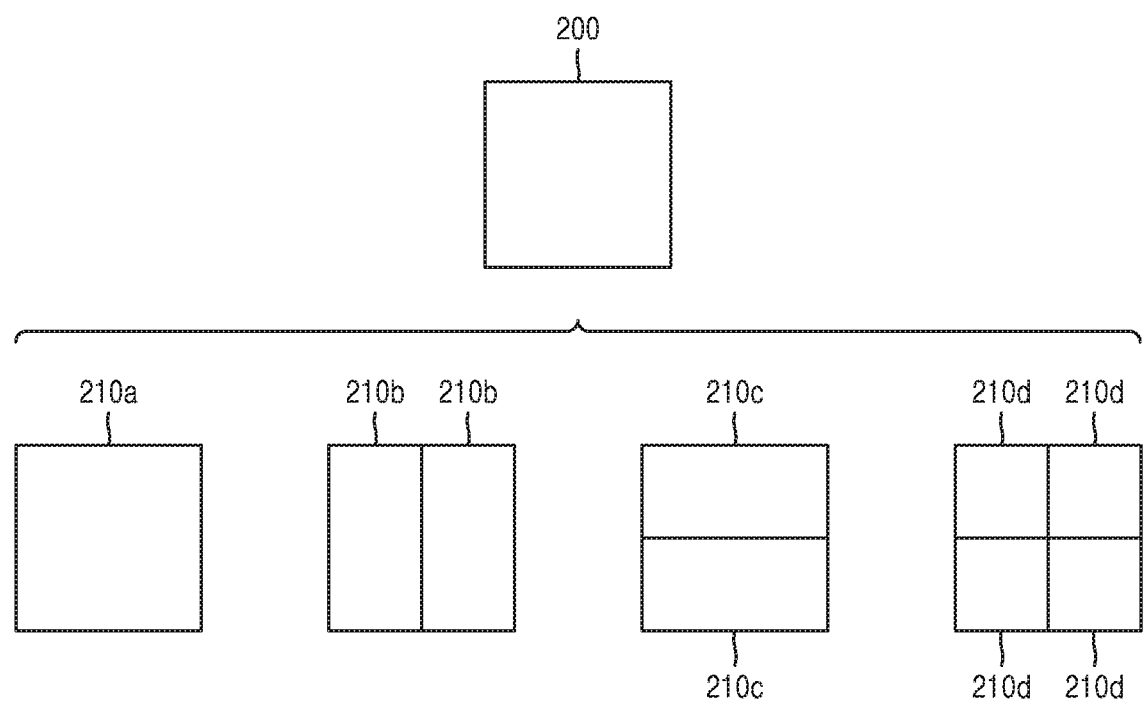
FIG. 2 illustrates a process of determining at least one coding unit by splitting a current coding unit, according to an embodiment.

FIG. 2 illustrates a process of determining at least one coding unit by splitting a current coding unit, performed by the image decoding device 150, according to an embodiment.

According to an embodiment, the image decoding device 150 may determine a shape of a coding unit by using block shape information, and may determine a splitting method of the coding unit by using split shape information. That is, a coding unit splitting method indicated by the split shape information may be determined based on a block shape indicated by the block shape information used by the image decoding device 150.

According to an embodiment, the image decoding device 150 may use the block shape information indicating that the current coding unit has a square shape. For example, the image decoding device 150 may determine whether not to split a square coding unit, whether to vertically split the square coding unit, whether to horizontally split the square coding unit, or whether to split the square coding unit into four coding units, based on the split shape information. Referring to FIG. 2, when the block shape information of a current coding unit 200 indicates a square shape, a decoder 170 may determine that a coding unit 210a having the same size as the current coding unit 200 is not split, based on the split shape information indicating not to perform splitting, or may determine coding units 210b, 210c, or 210d split based on the split shape information indicating a predetermined splitting method.

Referring to FIG. 2, according to an embodiment, the image decoding device 150 may determine two coding units 210b obtained by splitting the current coding unit 200 in a vertical direction, based on the split shape information indicating to perform splitting in a vertical direction. The image decoding device 150 may determine two coding units 210c obtained by splitting the current coding unit 200 in a horizontal direction, based on the split shape information indicating to perform splitting in a horizontal direction. The image decoding device 150 may determine four coding units 210d obtained by splitting the current coding unit 200 in vertical and horizontal directions, based on the split shape information indicating to perform splitting in vertical and horizontal directions. However, splitting methods of the square coding unit are not limited to the above-described methods, and the split shape information may indicate various methods. Predetermined splitting methods of splitting the square coding unit will be described in detail below in relation to various embodiments.

FIG. 3 illustrates a process, performed by the image decoding device 150, of determining at least one coding unit by splitting a non-square coding unit, according to an embodiment.

According to an embodiment, the image decoding device 150 may use block shape information indicating that a current coding unit has a non-square shape. The image decoding device 150 may determine whether not to split the non-square current coding unit or whether to split the non-square current coding unit by using a predetermined splitting method, based on split shape information. Referring to FIG. 3, when the block shape information of a current coding unit 300 or 350 indicates a non-square shape, the image decoding device 150 may determine that a coding unit 310 or 360 having the same size as the current coding unit 300 or 350 is not split, based on the split shape information indicating not to perform splitting, or determine coding units 320a and 320b, 330a to 330c, 370a and 370b, or 380a to 380c split based on the split shape information indicating a predetermined splitting method. Predetermined splitting methods of splitting a non-square coding unit will be described in detail below in relation to various embodiments.

According to an embodiment, the image decoding device 150 may determine a splitting method of a coding unit by using the split shape information and, in this case, the split shape information may indicate the number of one or more coding units generated by splitting a coding unit. Referring to FIG. 3, when the split shape information indicates to split the current coding unit 300 or 350 into two coding units, the image decoding device 150 may determine two coding units 320a and 320b, or 370a and 370b included in the current coding unit 300 or 350, by splitting the current coding unit 300 or 350 based on the split shape information.

According to an embodiment, when the image decoding device 150 splits the non-square current coding unit 300 or 350 based on the split shape information, the location of a long side of the non-square current coding unit 300 or 350 may be considered. For example, the image decoding device 150 may determine a plurality of coding units by splitting a long side of the current coding unit 300 or 350, in consideration of the shape of the current coding unit 300 or 350.

According to an embodiment, when the split shape information indicates to split a coding unit into an odd number of blocks, the image decoding device 150 may determine an odd number of coding units included in the current coding unit 300 or 350. For example, when the split shape information indicates to split the current coding unit 300 or 350 into three coding units, the image decoding device 150 may split the current coding unit 300 or 350 into three coding units 330a, 330b, and 330c, or 380a, 380b, and 380c. According to an embodiment, the image decoding device 150 may determine an odd number of coding units included in the current coding unit 300 or 350, and not all the determined coding units may have the same size. For example, a predetermined coding unit 330b or 380b from among the determined odd number of coding units 330a, 330b, and 330c, or 380a, 380b, and 380c may have a size different from the size of the other coding units 330a and 330c, or 380a and 380c. That is, coding units which may be determined by splitting the current coding unit 300 or 350 may have multiple sizes.

According to an embodiment, when the split shape information indicates to split a coding unit into an odd number of blocks, the image decoding device 150 may determine an odd number of coding units included in the current coding unit 300 or 350, and may put a predetermined restriction on at least one coding unit from among the odd number of coding units generated by splitting the current coding unit 300 or 350. Referring to FIG. 3, the image decoding device 150 may allow a decoding method of the coding unit 330b or 380b to be different from that of the other coding units 330a and 330c, or 380a and 380c, wherein the coding unit 330b or 380b is at a center location from among the three coding units 330a, 330b, and 330c, or 380a, 380b, and 380c generated by splitting the current coding unit 300 or 350. For example, the image decoding device 150 may restrict the coding unit 330b or 380b at the center location to be no longer split or to be split only a predetermined number of times, unlike the other coding units 330a and 330c, or 380a and 380c.

Figure 4:
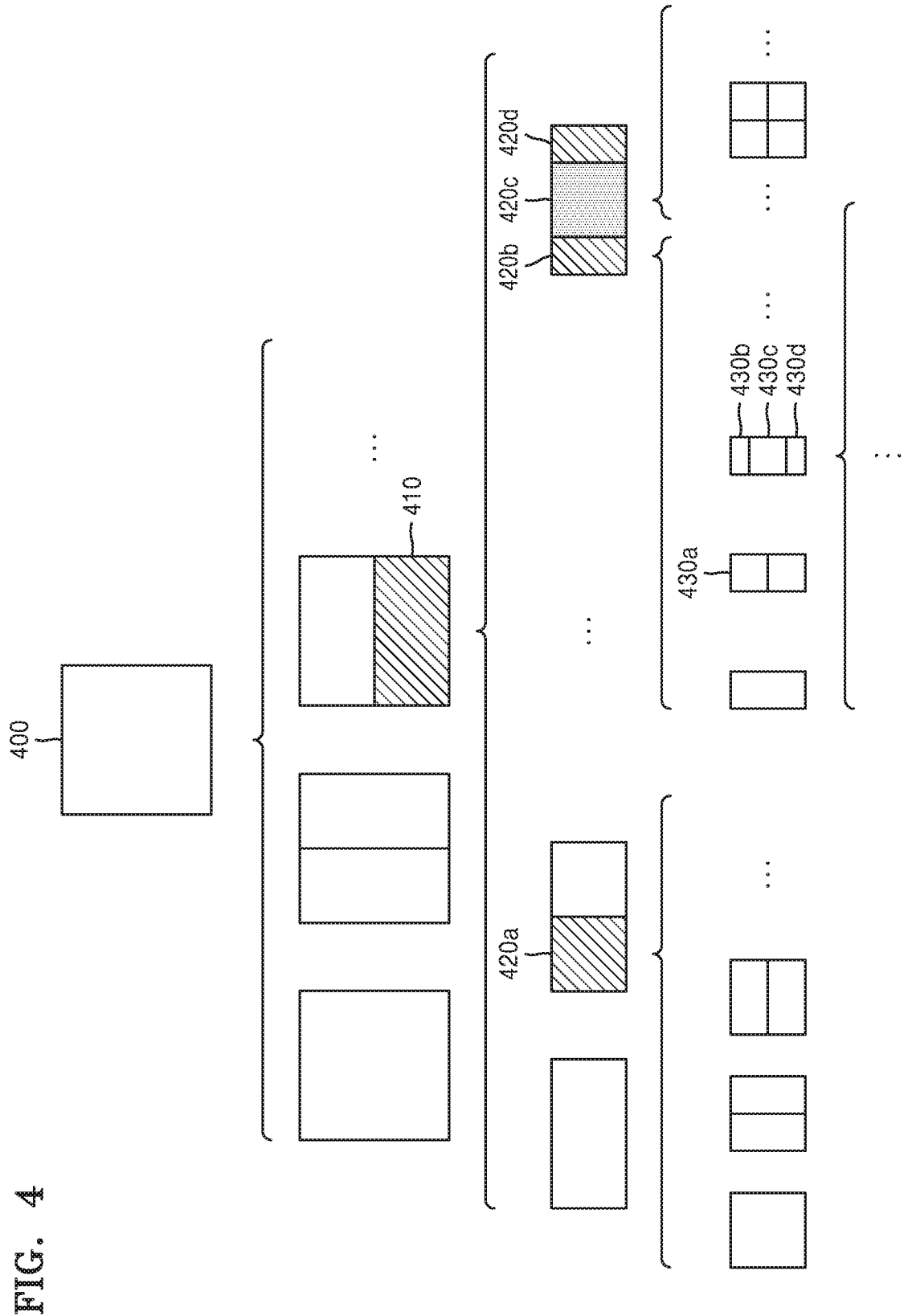
FIG. 4 illustrates a process of splitting a coding unit based on at least one of block shape information and split shape information, according to an embodiment.

FIG. 4 illustrates a process, performed by the image decoding device 150, of splitting a coding unit based on at least one of block shape information and split shape information, according to an embodiment.

According to an embodiment, the image decoding device 150 may determine to split or not to split a square first coding unit 400 into coding units, based on at least one of the block shape information and the split shape information. According to an embodiment, when the split shape information indicates to split the first coding unit 400 in a horizontal direction, the image decoding device 150 may determine a second coding unit 410 by splitting the first coding unit 400 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding device 150 may determine to split or not to split the determined second coding unit 410 into coding units, based on at least one of the block shape information and the split shape information. Referring to FIG. 4, the image decoding device 150 may or may not split the non-square second coding unit 410, which is determined by splitting the first coding unit 400, into one or more third coding units 420a, or 420b, 420c, and 420d based on at least one of the block shape information and the split shape information. The image decoding device 150 may obtain at least one of the block shape information and the split shape information, and determine a plurality of various-shaped second coding units (e.g., 410) by splitting the first coding unit 400, based on the obtained at least one of the block shape information and the split shape information, and the second coding unit 410 may be split by using the splitting method of the first coding unit 400, based on at least one of the block shape information and the split shape information. According to an embodiment, when the first coding unit 400 is split into the second coding units 410 based on at least one of the block shape information and the split shape information of the first coding unit 400, the second coding unit 410 may also be split into the third coding units 420a, or 420b, 420c, and 420d based on at least one of the block shape information and the split shape information of the second coding unit 410. That is, a coding unit may be recursively split based on at least one of the block shape information and the split shape information of each coding unit. A method that may be used to recursively split a coding unit will be described below in relation to various embodiments.

According to an embodiment, the image decoding device 150 may determine to split each of the third coding units 420a, or 420b, 420c, and 420d into coding units or not to split the second coding unit 410, based on at least one of the block shape information and the split shape information. According to an embodiment, the image decoding device 150 may split the non-square second coding unit 410 into the odd number of third coding units 420b, 420c, and 420d. The image decoding device 150 may put a predetermined restriction on a predetermined third coding unit from among the odd number of third coding units 420b, 420c, and 420d. For example, the image decoding device 150 may restrict the third coding unit 420c at a center location from among the odd number of third coding units 420b, 420c, and 420d to be no longer split or to be split a settable number of times. Referring to FIG. 4, the image decoding device 150 may restrict the third coding unit 420c, which is at the center location from among the odd number of third coding units 420b, 420c, and 420d included in the non-square second coding unit 410, to be no longer split, to be split by using a predetermined splitting method (e.g., split into only four coding units or split by using a splitting method of the second coding unit 410), or to be split only a predetermined number of times (e.g., split only n times (where n>0)). However, the restrictions on the third coding unit 420c at the center location are not limited to the above-described examples, and may include various restrictions for decoding the third coding unit 420c at the center location differently from the other third coding units 420b and 420d.

According to an embodiment, the image decoding device 150 may obtain at least one of the block shape information and the split shape information, which is used to split a current coding unit, from a predetermined location in the current coding unit.

According to an embodiment, when the current coding unit is split into a predetermined number of coding units, the image decoding device 150 may select one of the coding units. Various methods may be used to select one of a plurality of coding units, as will be described below in relation to various embodiments.

According to an embodiment, the image decoding device 150 may split the current coding unit into a plurality of coding units, and may determine a coding unit at a predetermined location.

Figure 5:
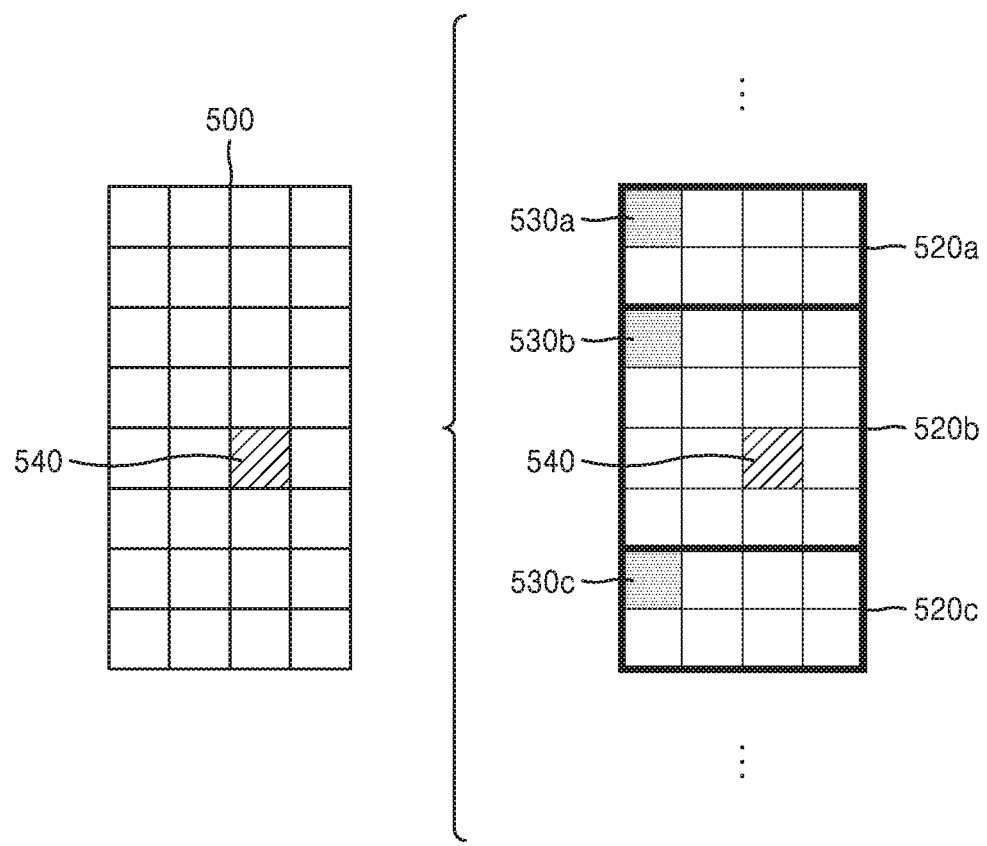
FIG. 5 illustrates a method of determining a predetermined coding unit from among an odd number of coding units, according to an embodiment.

FIG. 5 illustrates a method, performed by the image decoding device 150, of determining a coding unit of a predetermined location from among an odd number of coding units, according to an embodiment.

According to an embodiment, the image decoding device 150 may use information indicating locations of the odd number of coding units, to determine a coding unit at a center location from among the odd number of coding units. Referring to FIG. 5, the image decoding device 150 may determine an odd number of coding units 520a, 520b, and 520c by splitting a current coding unit 500. The image decoding device 150 may determine a coding unit 520b at a center location by using information about locations of the odd number of coding units 520a, 520b, and 520c. For example, the image decoding device 150 may determine the coding unit 520b of the center location by determining the locations of the coding units 520a, 520b, and 520c based on information indicating locations of predetermined samples included in the coding units 520a, 520b, and 520c. In detail, the image decoding device 150 may determine the coding unit 520b at the center location by determining the locations of the coding units 520a, 520b, and 520c based on information indicating locations of top left samples 530a, 530b, and 530c of the coding units 520a, 520b, and 520c.

According to an embodiment, the information indicating the locations of the top left samples 530a, 530b, and 530c, which are included in the coding units 520a, 520b, and 520c, respectively, may include information about locations or coordinates of the coding units 520a, 520b, and 520c in a picture. According to an embodiment, the information indicating the locations of the top left samples 530a, 530b, and 530c, which are included in the coding units 520a, 520b, and 520c, respectively, may include information indicating widths or heights of the coding units 520a, 520b, and 520c included in the current coding unit 500, and the widths or heights may correspond to information indicating differences between the coordinates of the coding units 520a, 520b, and 520c in the picture. That is, the image decoding device 150 may determine the coding unit 520b at the center location by directly using the information about the locations or coordinates of the coding units 520a, 520b, and 520c in the picture, or by using the information about the widths or heights of the coding units, which correspond to the difference values between the coordinates.

According to an embodiment, information indicating the location of the top left sample 530a of the upper coding unit 520a may include coordinates (xa, ya), information indicating the location of the top left sample 530b of the middle coding unit 520b may include coordinates (xb, yb), and information indicating the location of the top left sample 530c of the lower coding unit 520c may include coordinates (xc, yc). The image decoding device 150 may determine the middle coding unit 520b by using the coordinates of the top left samples 530a, 530b, and 530c which are included in the coding units 520a, 520b, and 520c, respectively. For example, when the coordinates of the top left samples 530a, 530b, and 530c are sorted in an ascending or descending order, the coding unit 520b including the coordinates (xb, yb) of the sample 530b at a center location may be determined as a coding unit at a center location from among the coding units 520a, 520b, and 520c determined by splitting the current coding unit 500. However, the coordinates indicating the locations of the top left samples 530a, 530b, and 530c may include coordinates indicating absolute locations in the picture, or may use coordinates (dxb, dyb) indicating a relative location of the top left sample 530b of the middle coding unit 520b and coordinates (dxc, dyc) indicating a relative location of the top left sample 530c of the lower coding unit 520c with reference to the location of the top left sample 530a of the upper coding unit 520a. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding device 150 may split the current coding unit 500 into a plurality of coding units 520a, 520b, and 520c, and may select one of the coding units 520a, 520b, and 520c based on a predetermined criterion. For example, the image decoding device 150 may select the coding unit 520b, which has a size different from that of the others, from among the coding units 520a, 520b, and 520c.

According to an embodiment, the image decoding device 150 may determine the widths or heights of the coding units 520*a*, 520*b*, and 520*c* by using the coordinates (xa, ya) indicating the location of the top left sample 530*a* of the upper coding unit 520*a*, the coordinates (xb, yb) indicating the location of the top left sample 530*b* of the middle coding unit 520*b*, and the coordinates (xc, yc) indicating the location of the top left sample 530*c* of the lower coding unit 520*c*. The image decoding device 150 may determine the respective sizes of the coding units 520*a*, 520*b*, and 520*c* by using the coordinates (xa, ya), (xb, yb), and (xc, yc) indicating the locations of the coding units 520*a*, 520*b*, and 520*c*.

According to an embodiment, the image decoding device 150 may determine the width of the upper coding unit 520*a* to be xb-xa and determine the height thereof to be yb-ya. According to an embodiment, the image decoding device 150 may determine the width of the middle coding unit 520*b* to be xc-xb and determine the height thereof to be yc-yb. According to an embodiment, the image decoding device 150 may determine the width or height of the lower coding unit 520*c* by using the width or height of the current coding unit 500 or the widths or heights of the upper and middle coding units 520*a* and 520*b*. The image decoding device 150 may determine a coding unit, which has a size different from that of the others, based on the determined widths and heights of the coding units 520*a* to 520*c*. Referring to FIG. 5, the image decoding device 150 may determine the middle coding unit 520*b*, which has a size different from the size of the upper and lower coding units 520*a* and 520*c*, as the coding unit of the predetermined location. However, the above-described method, performed by the image decoding device 150, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the image decoding device 150 may select a coding unit at a predetermined location from among an odd number of coding units determined by splitting the current coding unit, considering the shape of the current coding unit. For example, when the current coding unit has a non-square shape, a width of which is longer than a height, the image decoding device 150 may determine the coding unit at the predetermined location in a horizontal direction. That is, the image decoding device 150 may determine one of coding units at different locations in a horizontal direction and put a restriction on the coding unit. When the current coding unit has a non-square shape, a height of which is longer than a width, the image decoding device 150 may determine the coding unit at the predetermined location in a vertical direction. That is, the image decoding device 150 may determine one of coding units at different locations in a vertical direction and may put a restriction on the coding unit.

According to an embodiment, the image decoding device 150 may use information indicating respective locations of an even number of coding units, to determine the coding unit at the predetermined location from among the even number of coding units. The image decoding device 150 may determine an even number of coding units by splitting the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 5, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding device 150 may use at least one of block shape information and split shape information, which is stored in a sample included in a coding unit at a center location, in a splitting operation to determine the coding unit at the center location from among the plurality of coding units determined by splitting the current coding unit.

Referring to FIG. 5, the image decoding device 150 may split the current coding unit 500 into a plurality of coding units 520*a*, 520*b*, and 520*c* based on at least one of the block shape information and the split shape information, and may determine a coding unit 520*b* at a center location from among the plurality of the coding units 520*a*, 520*b*, and 520*c*. Furthermore, the image decoding device 150 may determine the coding unit 520*b* at the center location, in consideration of a location from which at least one of the block shape information and the split shape information is obtained. That is, at least one of the block shape information and the split shape information of the current coding unit 500 may be obtained from the sample 540 at a center location of the current coding unit 500 and, when the current coding unit 500 is split into the plurality of coding units 520*a*, 520*b*, and 520*c* based on at least one of the block shape information and the split shape information, the coding unit 520*b* including the sample 540 may be determined as the coding unit at the center location. However, information used to determine the coding unit at the center location is not limited to at least one of the block shape information and the split shape information, and various types of information may be used to determine the coding unit at the center location.

According to an embodiment, predetermined information for identifying the coding unit at the predetermined location may be obtained from a predetermined sample included in a coding unit to be determined. Referring to FIG. 5, the image decoding device 150 may use at least one of the block shape information and the split shape information, which is obtained from a sample at a predetermined location in the current coding unit 500 (e.g., a sample at a center location of the current coding unit 500) to determine a coding unit at a predetermined location from among the plurality of the coding units 520*a*, 520*b*, and 520*c* determined by splitting the current coding unit 500 (e.g., a coding unit at a center location from among a plurality of split coding units). That is, the image decoding device 150 may determine the sample at the predetermined location by considering a block shape of the current coding unit 500, determine the coding unit 520*b* including a sample, from which predetermined information (e.g., at least one of the block shape information and the split shape information) may be obtained, from among the plurality of coding units 520*a*, 520*b*, and 520*c* determined by splitting the current coding unit 500, and may put a predetermined restriction on the coding unit 520*b*. Referring to FIG. 5, according to an embodiment, the image decoding device 150 may determine the sample 540 at the center location of the current coding unit 500 as the sample from which the predetermined information may be obtained, and may put a predetermined restriction on the coding unit 520*b* including the sample 540, in a decoding operation. However, the location of the sample from which the predetermined information may be obtained is not limited to the above-described location, and may include arbitrary locations of samples included in the coding unit 520*b* to be determined for a restriction.

According to an embodiment, the location of the sample from which the predetermined information may be obtained may be determined based on the shape of the current coding unit 500. According to an embodiment, the block shape information may indicate whether the current coding unit has a square or non-square shape, and the location of the sample from which the predetermined information may be obtained may be determined based on the shape. For example, the image decoding device 150 may determine a sample located on a boundary for splitting at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding device 150 may determine one of samples adjacent to a boundary for splitting a long side of the current coding unit in half, as the sample from which the predetermined information may be obtained.

According to an embodiment, when the current coding unit is split into a plurality of coding units, the image decoding device 150 may use at least one of the block shape information and the split shape information to determine a coding unit at a predetermined location from among the plurality of coding units. According to an embodiment, the image decoding device 150 may obtain at least one of the block shape information and the split shape information from a sample at a predetermined location in a coding unit, and split the plurality of coding units, which are generated by splitting the current coding unit, by using at least one of the split shape information and the block shape information, which is obtained from the sample of the predetermined location in each of the plurality of coding units. That is, a coding unit may be recursively split based on at least one of the block shape information and the split shape information, which is obtained from the sample at the predetermined location in each coding unit. An operation of recursively splitting a coding unit has been described above in relation to FIG. 4, and thus detailed descriptions thereof will not be provided here.

According to an embodiment, the image decoding device 150 may determine one or more coding units by splitting the current coding unit, and may determine an order of decoding the one or more coding units, based on a predetermined block (e.g., the current coding unit).

Figure 6:
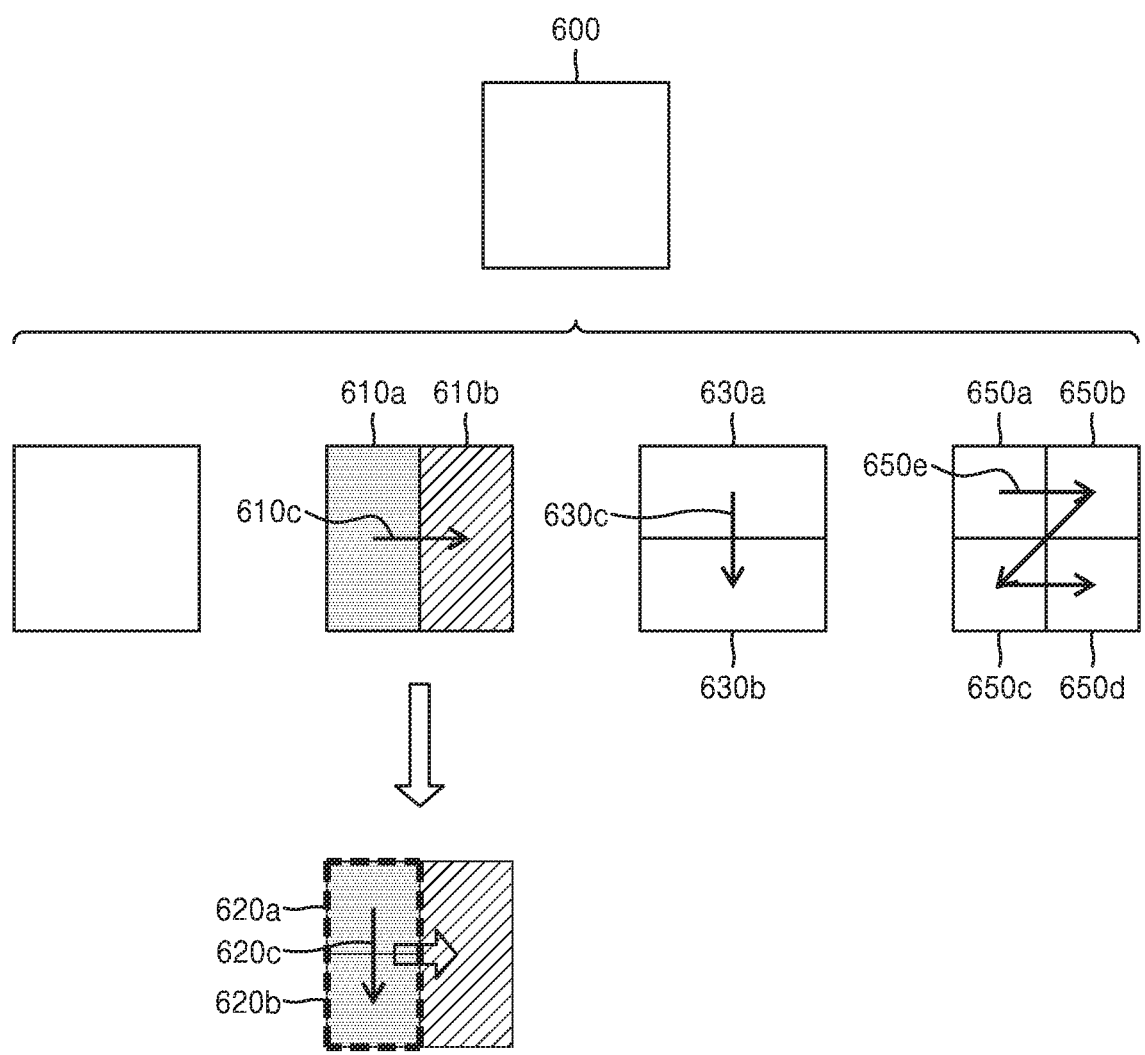
FIG. 6 illustrates an order of processing a plurality of coding units when the plurality of coding units are determined by splitting a current coding unit, according to an embodiment.

FIG. 6 illustrates an order of processing a plurality of coding units when the image decoding device 150 determines the plurality of coding units by splitting a current coding unit, according to an embodiment.

According to an embodiment, the image decoding device 150 may determine second coding units 610*a* and 610*b* by splitting a first coding unit 600 in a vertical direction, determine second coding units 630*a* and 630*b* by splitting the first coding unit 600 in a horizontal direction, or determine second coding units 650*a* to 650*d* by splitting the first coding unit 600 in vertical and horizontal directions, based on block shape information and split shape information.

Referring to FIG. 6, the image decoding device 150 may determine to process the second coding units 610*a* and 610*b*, which are determined by splitting the first coding unit 600 in a vertical direction, in a horizontal direction order 610*c*. The image decoding device 150 may determine to process the second coding units 630*a* and 630*b*, which are determined by splitting the first coding unit 600 in a horizontal direction, in a vertical direction order 630*c*. The image decoding device 150 may determine to process the second coding units 650*a* to 650*d*, which are determined by splitting the first coding unit 600 in vertical and horizontal directions, in a predetermined order for processing coding units in a row and then processing coding units in a next row (e.g., in a raster scan order or Z-scan order 650*e*).

According to an embodiment, the image decoding device 150 may recursively split coding units. Referring to FIG. 6, the image decoding device 150 may determine a plurality of coding units 610*a*, 610*b*, 630*a*, 630*b*, 650*a*, 650*b*, 650*c*, and 650*d* by splitting the first coding unit 600, and may recursively split each of the determined plurality of coding units 610*a*, 610*b*, 630*a*, 630*b*, 650*a*, 650*b*, 650*c*, and 650*d*. A splitting method of the plurality of coding units 610*a*, 610*b*, 630*a*, 630*b*, 650*a*, 650*b*, 650*c*, and 650*d* may correspond to a splitting method of the first coding unit 600. As such, each of the plurality of coding units 610*a*, 610*b*, 630*a*, 630*b*, 650*a*, 650*b*, 650*c*, and 650*d* may be independently split into a plurality of coding units. Referring to FIG. 6, the image decoding device 150 may determine the second coding units 610*a* and 610*b* by splitting the first coding unit 600 in a vertical direction, and may determine to independently split or not to split each of the second coding units 610*a* and 610*b*.

According to an embodiment, the image decoding device 150 may determine third coding units 620*a* and 620*b* by splitting the left second coding unit 610*a* in a horizontal direction, and may not split the right second coding unit 610*b*.

According to an embodiment, a processing order of coding units may be determined based on an operation of splitting a coding unit. In other words, a processing order of split coding units may be determined based on a processing order of coding units immediately before being split. The image decoding device 150 may determine a processing order of the third coding units 620*a* and 620*b* determined by splitting the left second coding unit 610*a*, independently of the right second coding unit 610*b*. Because the third coding units 620*a* and 620*b* are determined by splitting the left second coding unit 610*a* in a horizontal direction, the third coding units 620*a* and 620*b* may be processed in a vertical direction order 620*c*. Because the left and right second coding units 610*a* and 610*b* are processed in the horizontal direction order 610*c*, the right second coding unit 610*b* may be processed after the third coding units 620*a* and 620*b* included in the left second coding unit 610*a* are processed in the vertical direction order 620*c*. An operation of determining a processing order of coding units based on a coding unit before being split is not limited to the above-described example, and various methods may be used to independently process coding units, which are split and determined to various shapes, in a predetermined order.

Figure 7:
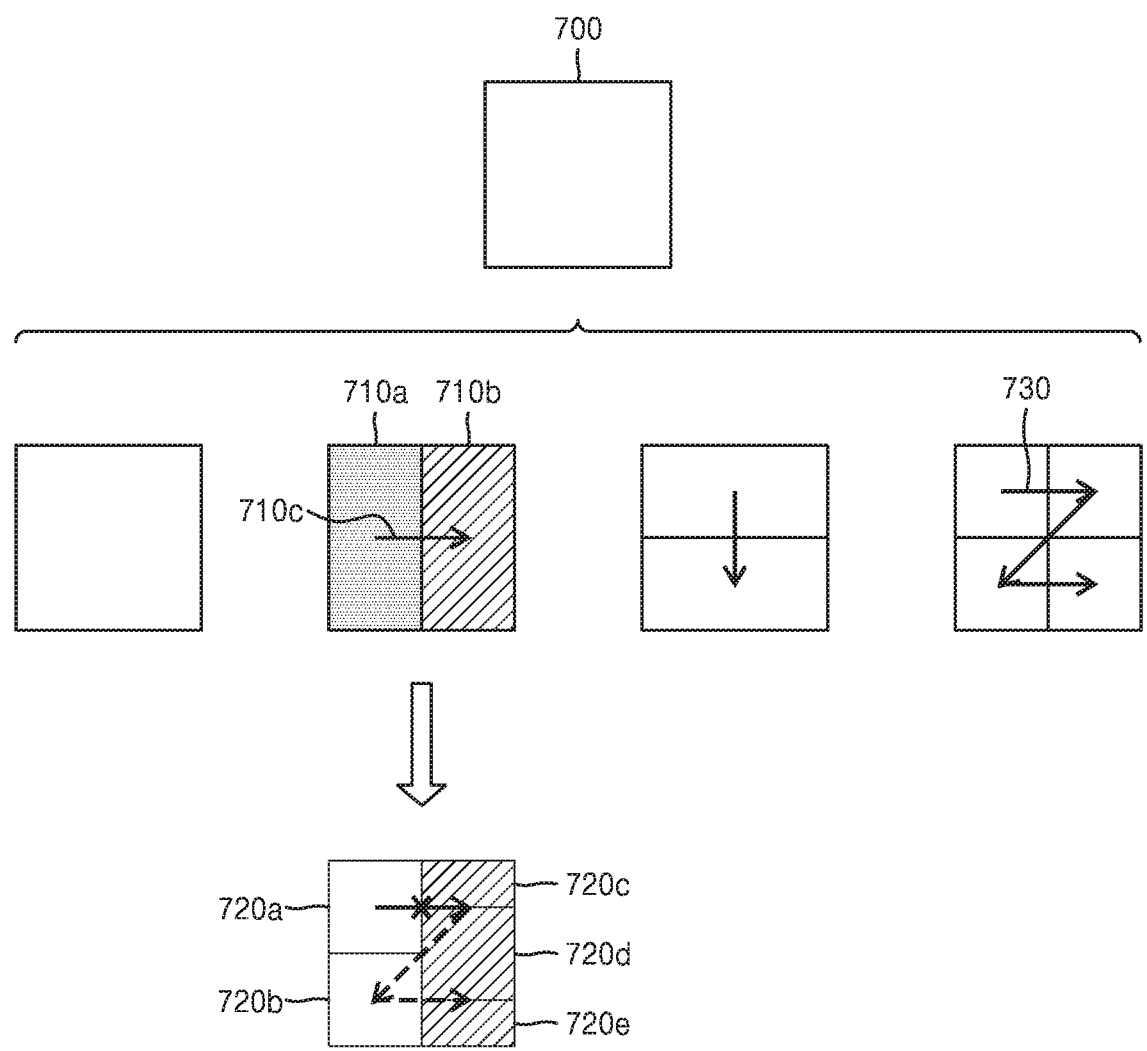
FIG. 7 illustrates a process of determining that a current coding unit is to be split into an odd number of coding units, when the coding units are not processable in a predetermined order, according to an embodiment.

FIG. 7 illustrates a process, performed by the image decoding device 150, of determining that a current coding unit is to be split into an odd number of coding units, when the coding units are not processable in a predetermined order, according to an embodiment.

According to an embodiment, the image decoding device 150 may determine whether the current coding unit is split into an odd number of coding units, based on obtained block shape information and split shape information. Referring to FIG. 7, a square first coding unit 700 may be split into non-square second coding units 710a and 710b, and the second coding units 710a and 710b may be independently split into third coding units 720a and 720b, and 720c to 720e. According to an embodiment, the image decoding device 150 may determine a plurality of third coding units 720a and 720b by splitting the left second coding unit 710a in a horizontal direction, and may split the right second coding unit 710b into an odd number of third coding units 720c to 720e.

According to an embodiment, the image decoding device 150 may determine whether any coding unit is split into an odd number of coding units, by determining whether the third coding units 720a and 720b, and 720c to 720e are processable in a predetermined order. Referring to FIG. 7, the image decoding device 150 may determine the third coding units 720a and 720b, and 720c to 720e by recursively splitting the first coding unit 700. The image decoding device 150 may determine whether any of the first coding unit 700, the second coding units 710a and 710b, and the third coding units 720a and 720b, and 720c to 720e are split into an odd number of coding units, based on at least one of the block shape information and the split shape information. For example, the right second coding unit 710b may be split into an odd number of third coding units 720c, 720d, and 720e. A processing order of a plurality of coding units included in the first coding unit 700 may be a predetermined order (e.g., a Z-scan order 730), and the image decoding device 150 may decide whether the third coding units 720c, 720d, and 720e, which are determined by splitting the right second coding unit 710b into an odd number of coding units, satisfy a condition for processing in the predetermined order.

According to an embodiment, the image decoding device 150 may determine whether the third coding units 720a and 720b, and 720c, 720d, and 720e included in the first coding unit 700 satisfy the condition for processing in the predetermined order, and the condition relates to whether at least one of a width and height of the second coding units 710a and 710b is split in half along a boundary of the third coding units 720a and 720b, and 720c, 720d, and 720e. For example, the third coding units 720a and 720b determined by splitting the height of the non-square left second coding unit 710a in half satisfy the condition. However, because boundaries of the third coding units 720c, 720d, and 720e determined by splitting the right second coding unit 710b into three coding units do not split the width or height of the right second coding unit 710b in half, it may be determined that the third coding units 720c, 720d, and 720e do not satisfy the condition. When the condition is not satisfied as described above, the image decoding device 150 may decide disconnection of a scan order, and determine that the right second coding unit 710b is split into an odd number of coding units, based on a result of the decision. According to an embodiment, when a coding unit is split into an odd number of coding units, the image decoding device 150 may put a predetermined restriction on a coding unit at a predetermined location from among the split coding units. The restriction or the predetermined location has been described above in relation to various embodiments, and thus, detailed descriptions thereof will not be provided here.

Figure 8:
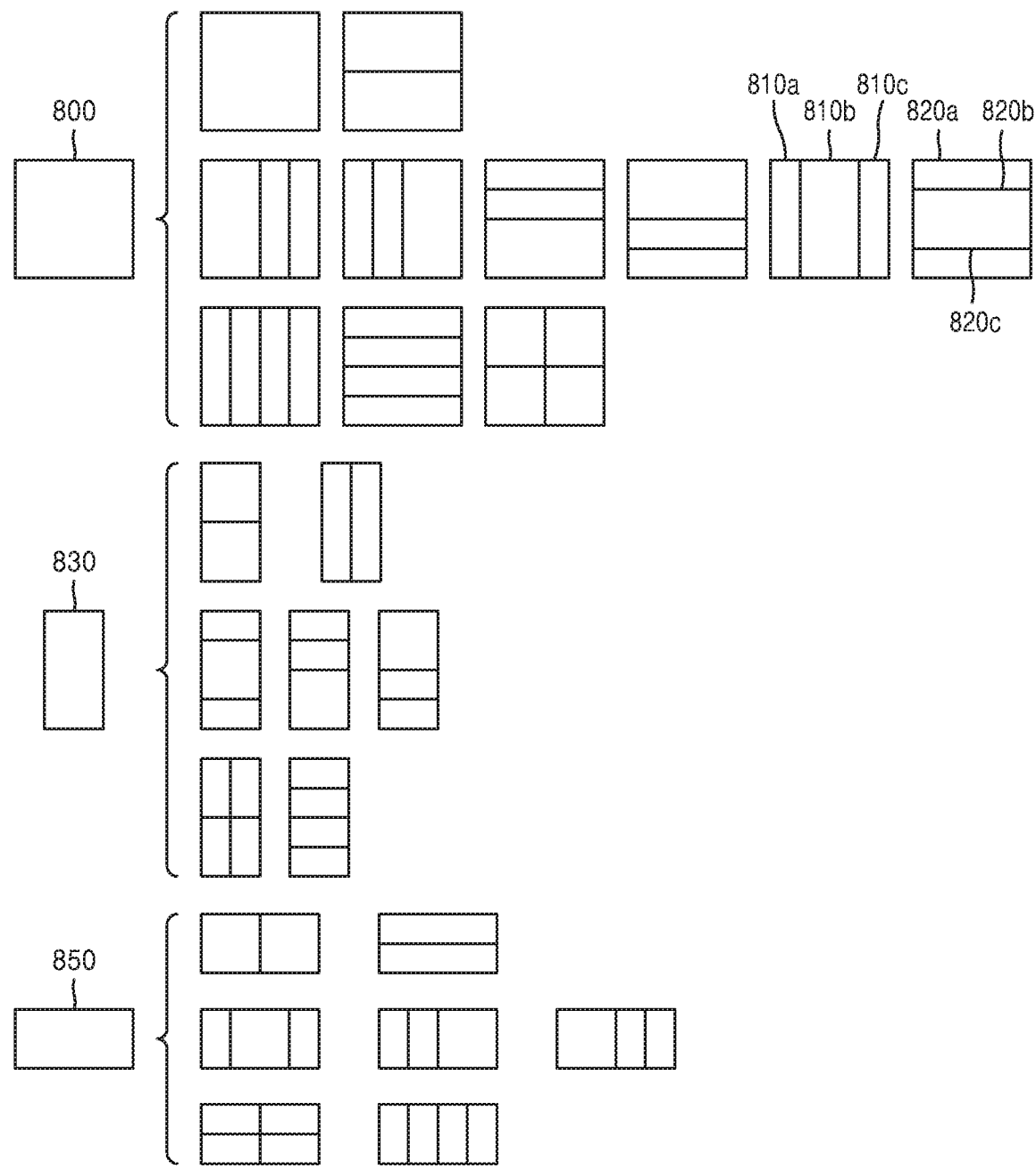
FIG. 8 illustrates a process of determining at least one coding unit by splitting a first coding unit, according to an embodiment.

FIG. 8 illustrates a process, performed by the image decoding device 150, of determining at least one coding unit by splitting a first coding unit 800, according to an embodiment. According to an embodiment, the image decoding device 150 may split the first coding unit 800, based on at least one of block shape information and split shape information, which is obtained by the receiver 160. The square first coding unit 800 may be split into four square coding units, or may be split into a plurality of non-square coding units. For example, referring to FIG. 8, when the block shape information indicates that the first coding unit 800 has a square shape and the split shape information indicates to split the first coding unit 800 into non-square coding units, the image decoding device 150 may split the first coding unit 800 into a plurality of non-square coding units. In detail, when the split shape information indicates to determine an odd number of coding units by splitting the first coding unit 800 in a horizontal direction or a vertical direction, the image decoding device 150 may split the square first coding unit 800 into an odd number of coding units, e.g., second coding units 810a, 810b, and 810c determined by splitting the square first coding unit 800 in a vertical direction or second coding units 820a, 820b, and 820c determined by splitting the square first coding unit 800 in a horizontal direction.

According to an embodiment, the image decoding device 150 may determine whether the second coding units 810a, 810b, 810c, 820a, 820b, and 820c included in the first coding unit 800 satisfy a condition for processing in a predetermined order, and the condition relates to whether at least one of a width and height of the first coding unit 800 is split in half along a boundary of the second coding units 810a, 810b, 810c, 820a, 820b, and 820c. Referring to FIG. 8, because boundaries of the second coding units 810a, 810b, and 810c determined by splitting the square first coding unit 800 in a vertical direction do not split the height of the first coding unit 800 in half, it may be determined that the first coding unit 800 does not satisfy the condition for processing in the predetermined order. In addition, because boundaries of the second coding units 820a, 820b, and 820c determined by splitting the square first coding unit 800 in a horizontal direction do not split the height of the first coding unit 800 in half, it may be determined that the first coding unit 800 does not satisfy the condition for processing in the predetermined order. When the condition is not satisfied as described above, the image decoding device 150 may decide disconnection of a scan order and may determine that the first coding unit 800 is split into an odd number of coding units, based on a result of the decision. According to an embodiment, when a coding unit is split into an odd number of coding units, the image decoding device 150 may put a predetermined restriction on a coding unit at a predetermined location from among the split coding units. The restriction or the predetermined location has been described above in relation to various embodiments, and thus, detailed descriptions thereof will not be provided here.

According to an embodiment, the image decoding device 150 may determine various-shaped coding units by splitting a first coding unit.

Referring to FIG. 8, the image decoding device 150 may split the square first coding unit 800 or a non-square first coding unit 830 or 850 into various-shaped coding units.

Figure 9:
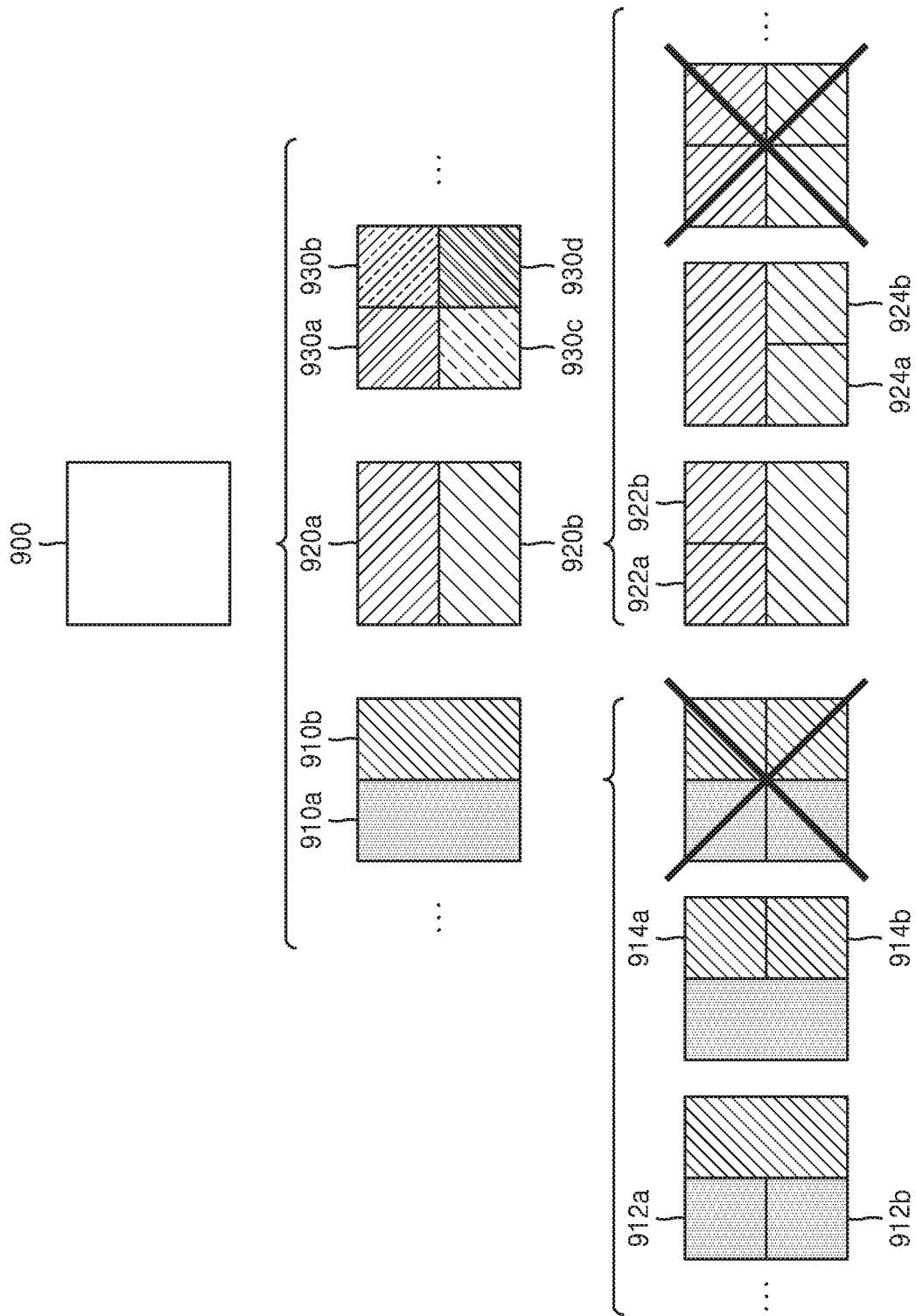
FIG. 9 illustrates that a shape into which a second coding unit is splittable is restricted when the second coding unit having a non-square shape, which is determined by splitting a first coding unit, satisfies a predetermined condition, according to an embodiment.

FIG. 9 illustrates that a shape into which a second coding unit is splittable by the image decoding device 150 is restricted when the second coding unit having a non-square shape, which is determined by splitting a first coding unit 900, satisfies a predetermined condition, according to an embodiment.

According to an embodiment, the image decoding device 150 may determine to split the square first coding unit 900 into non-square second coding units 910*a*, 910*b*, 920*a*, and 920*b*, based on at least one of block shape information and split shape information, which is obtained by the receiver 160. The second coding units 910*a*, 910*b*, 920*a*, and 920*b* may be independently split. As such, the image decoding device 150 may determine to split or not to split the first coding unit 900 into a plurality of coding units, based on at least one of the block shape information and the split shape information of each of the second coding units 910*a*, 910*b*, 920*a*, and 920*b*. According to an embodiment, the image decoding device 150 may determine third coding units 912*a* and 912*b* by splitting the non-square left second coding unit 910*a*, which is determined by splitting the first coding unit 900 in a vertical direction, in a horizontal direction. However, when the left second coding unit 910*a* is split in a horizontal direction, the image decoding device 150 may restrict the right second coding unit 910*b* to not be split in a horizontal direction in which the left second coding unit 910*a* is split. When third coding units 914*a* and 914*b* are determined by splitting the right second coding unit 910*b* in a same direction, because the left and right second coding units 910*a* and 910*b* are independently split in a horizontal direction, the third coding units 912*a*, 912*b*, 914*a*, and 914*b* may be determined. However, this case serves equally as a case in which the image decoding device 150 splits the first coding unit 900 into four square second coding units 930*a*, 930*b*, 930*c*, and 930*d*, based on at least one of the block shape information and the split shape information, and may be inefficient in terms of image decoding.

According to an embodiment, the image decoding device 150 may determine third coding units 922*a*, 922*b*, 924*a*, and 924*b* by splitting the non-square second coding unit 920*a* or 920*b*, which is determined by splitting the first coding unit 900 in a horizontal direction, in a vertical direction. However, when a second coding unit (e.g., the upper second coding unit 920*a*) is split in a vertical direction, for the above-described reason, the image decoding device 150 may restrict the other second coding unit (e.g., the lower second coding unit 920*b*) to not be split in a vertical direction in which the upper second coding unit 920*a* is split.

Figure 10:
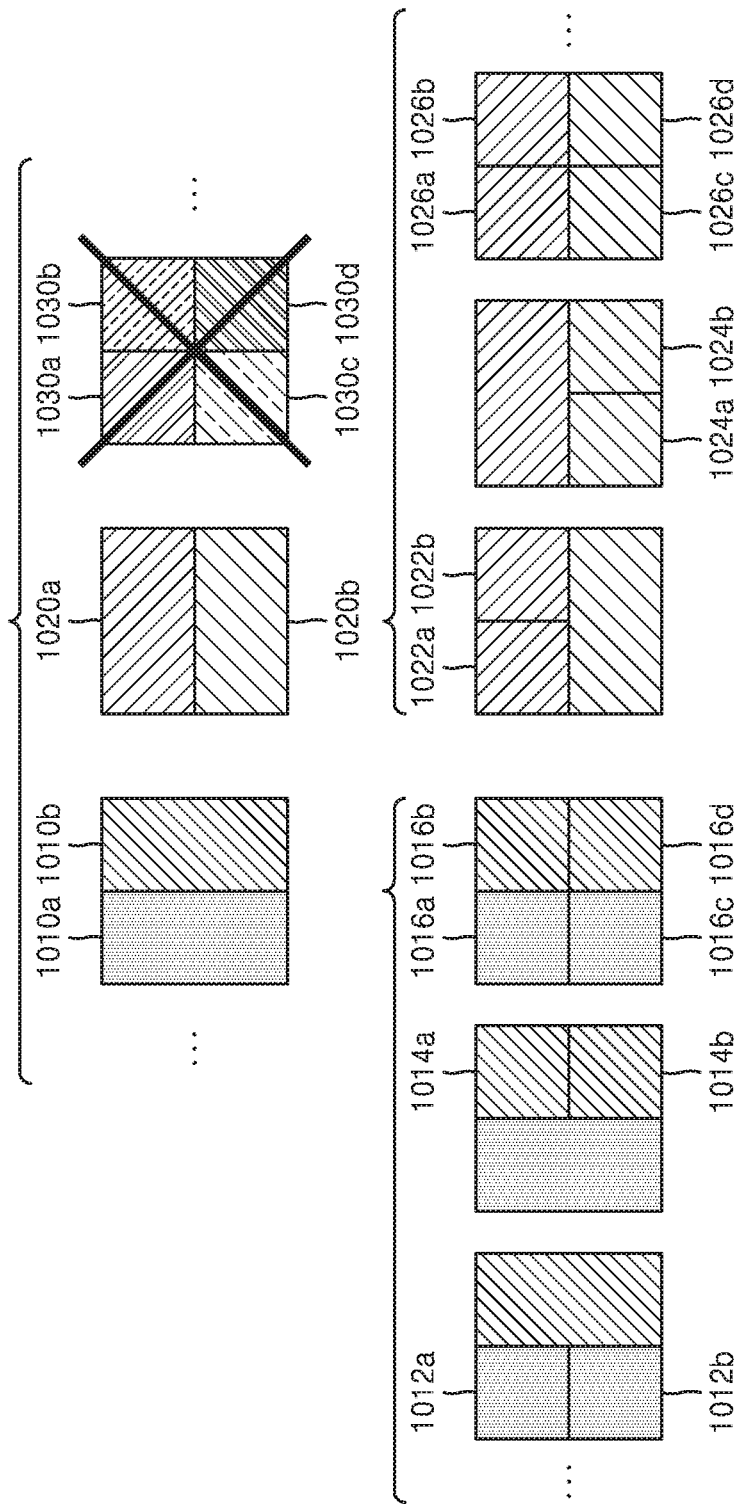
FIG. 10 illustrates a process of splitting a square coding unit when split shape information indicates that the square coding unit is not to be split into four square coding units, according to an embodiment.

FIG. 10 illustrates a process, performed by the image decoding device 150, of splitting a square coding unit when split shape information indicates that the square coding unit is not to be split into four square coding units, according to an embodiment.

According to an embodiment, the image decoding device 150 may determine second coding units 1010*a*, 1010*b*, 1020*a*, 1020*b*, etc. by splitting a first coding unit 1000, based on at least one of block shape information and split shape information. The split shape information may include information about various methods of splitting a coding unit but, the information about various splitting methods may not include information for splitting a coding unit into four square coding units. According to such split shape information, the image decoding device 150 may not split the square first coding unit 1000 into four square second coding units 1030*a*, 1030*b*, 1030*c*, and 1030*d*. The image decoding device 150 may determine the non-square second coding units 1010*a*, 1010*b*, 1020*a*, 1020*b*, etc., based on the split shape information.

According to an embodiment, the image decoding device 150 may independently split the non-square second coding units 1010*a*, 1010*b*, 1020*a*, 1020*b*, etc. Each of the second coding units 1010*a*, 1010*b*, 1020*a*, 1020*b*, etc. may be recursively split in a predetermined order, and this splitting method may correspond to a method of splitting the first coding unit 1000, based on at least one of the block shape information and the split shape information.

For example, the image decoding device 150 may determine square third coding units 1012*a* and 1012*b* by splitting the left second coding unit 1010*a* in a horizontal direction, and may determine square third coding units 1014*a* and 1014*b* by splitting the right second coding unit 1010*b* in a horizontal direction. Furthermore, the image decoding device 150 may determine square third coding units 1016*a*, 1016*b*, 1016*c*, and 1016*d* by splitting both of the left and right second coding units 1010*a* and 1010*b* in a horizontal direction. In this case, coding units having the same shape as the four square second coding units 1030*a*, 1030*b*, 1030*c*, and 1030*d* split from the first coding unit 1000 may be determined.

As another example, the image decoding device 150 may determine square third coding units 1022*a* and 1022*b* by splitting the upper second coding unit 1020*a* in a vertical direction, and may determine square third coding units 1024*a* and 1024*b* by splitting the lower second coding unit 1020*b* in a vertical direction. Furthermore, the image decoding device 150 may determine square third coding units 1026*a*, 1026*b*, 1026*c*, and 1026*d* by splitting both of the upper and lower second coding units 1020*a* and 1020*b* in a vertical direction. In this case, coding units having the same shape as the four square second coding units 1030*a*, 1030*b*, 1030*c*, and 1030*d* split from the first coding unit 1000 may be determined.

Figure 11:
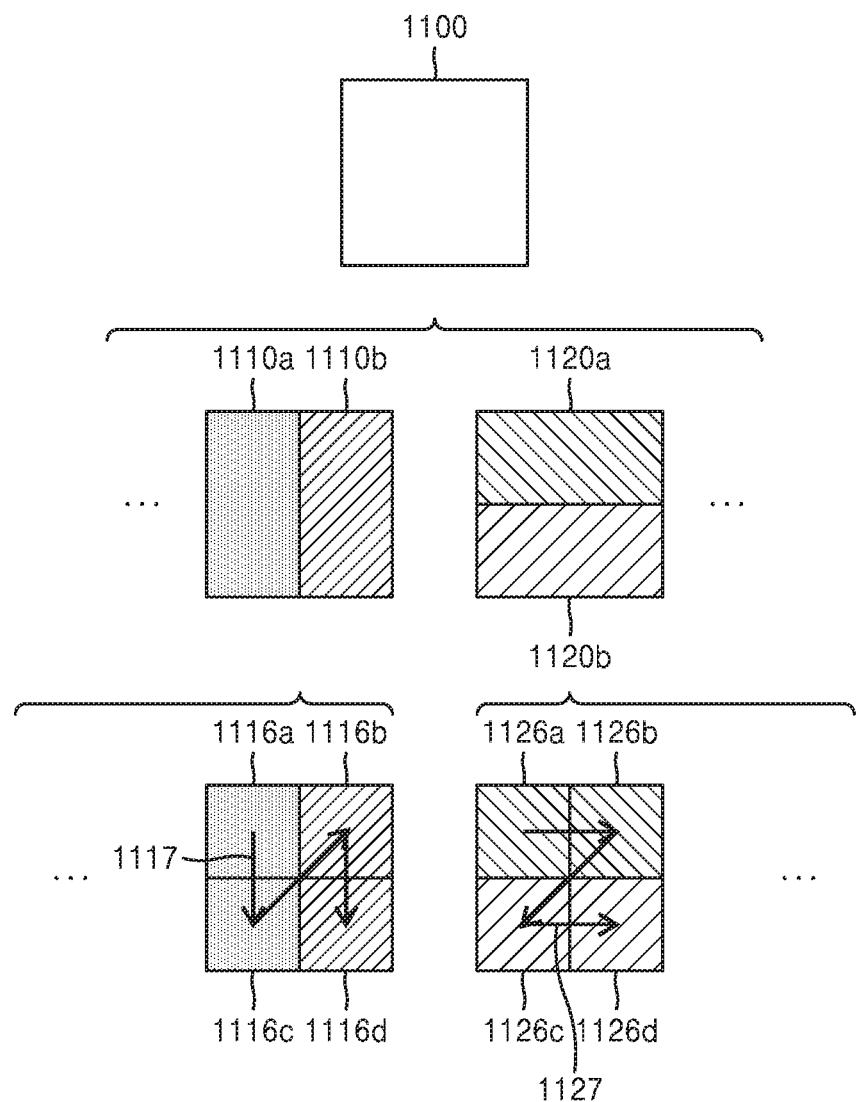
FIG. 11 illustrates that a processing order between a plurality of coding units may be changed depending on a process of splitting a coding unit, according to an embodiment.

FIG. 11 illustrates that a processing order between a plurality of coding units may be changed depending on a process of splitting a coding unit, according to an embodiment.

According to an embodiment, the image decoding device 150 may split a first coding unit 1100, based on block shape information and split shape information. When the block shape information indicates a square shape and the split shape information indicates to split the first coding unit 1100 in at least one of horizontal and vertical directions, the image decoding device 150 may determine second coding units 1910*a*, 1110*b*, 1120*a*, and 1120*b* by splitting the first coding unit 1100. Referring to FIG. 11, the non-square second coding units 1110*a*, 1110*b*, 1120*a*, and 1120*b* determined by splitting the first coding unit 1100 in only a horizontal direction or vertical direction may be independently split based on the block shape information and the split shape information of each coding unit. For example, the image decoding device 150 may determine third coding units 1116*a*, 1116*b*, 1116*c*, and 1116*d* by splitting the second coding units 1110*a* and 1110*b*, which are generated by splitting the first coding unit 1900 in a vertical direction, in a horizontal direction, and may determine third coding units 1126*a*, 1126*b*, 1126*c*, and 1126*d* by splitting the second coding units 1120*a* and 1120*b*, which are generated by splitting the first coding unit 1100 in a horizontal direction, in a vertical direction. An operation of splitting the second coding units 1110*a*, 1110*b*, 1120*a*, and 1120*b* has been described above in relation to FIG. 9, and thus detailed descriptions thereof will not be provided herein.

According to an embodiment, the image decoding device 150 may process coding units in a predetermined order. An operation of processing coding units in a predetermined order has been described above in relation to FIG. 6, and thus detailed descriptions thereof will not be provided herein. Referring to FIG. 11, the image decoding device 150 may determine four square third coding units 1116a, 1116b, 1116c, and 1116d, and 1126a, 1126b, 1126c, and 1126d by splitting the square first coding unit 1100. According to an embodiment, the image decoding device 150 may determine processing orders of the third coding units 1116a, 1116b, 1116c, and 1116d, and 1126a, 1126b, 1126c, and 1126d based on a splitting method of the first coding unit 1100.

According to an embodiment, the image decoding device 150 may determine the third coding units 1116a, 1116b, 1116c, and 1116d by splitting the second coding units 1110a and 1110b generated by splitting the first coding unit 1100 in a vertical direction, in a horizontal direction, and may process the third coding units 1116a, 1116b, 1116c, and 1116d in a processing order 1117 for initially processing the third coding units 1116a and 1116c, which are included in the left second coding unit 1110a, in a vertical direction and then processing the third coding unit 1116b and 1116d, which are included in the right second coding unit 1110b, in a vertical direction.

According to an embodiment, the image decoding device 150 may determine the third coding units 1126a, 1126b, 1126c, and 1126d by splitting the second coding units 1120a and 1120b generated by splitting the first coding unit 1100 in a horizontal direction, in a vertical direction, and may process the third coding units 1126a, 1126b, 1126c, and 1126d in a processing order 1127 for initially processing the third coding units 1126a and 1126b, which are included in the upper second coding unit 1120a, in a horizontal direction and then processing the third coding unit 1126c and 1126d, which are included in the lower second coding unit 1120b, in a horizontal direction.

Referring to FIG. 11, the square third coding units 1116a, 1116b, 1116c, and 1116d, and 1126a, 1126b, 1126c, and 1126d may be determined by splitting the second coding units 1110a, 1110b, 1120a, and 1120b, respectively. Although the second coding units 1110a and 1110b are determined by splitting the first coding unit 1100 in a vertical direction differently from the second coding units 1120a and 1120b which are determined by splitting the first coding unit 1100 in a horizontal direction, the third coding units 1116a, 1116b, 1116c, and 1116d, and 1126a, 1126b, 1126c, and 1126d split therefrom eventually show same-shaped coding units split from the first coding unit 1100. As such, by recursively splitting a coding unit in different manners based on at least one of the block shape information and the split shape information, the image decoding device 150 may process a plurality of coding units in different orders even when the coding units are eventually determined to be the same shape.

FIG. 12 illustrates a process of determining a depth of a coding unit as a shape and size of the coding unit change, when the coding unit is recursively split such that a plurality of coding units are determined, according to an embodiment.

According to an embodiment, the image decoding device 150 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding device 150 may determine that a depth of the current coding unit is increased from a depth of the coding unit before being split, by n. In the following description, a coding unit having an increased depth is expressed as a coding unit of a deeper depth.

Referring to FIG. 12, according to an embodiment, the image decoding device 150 may determine a second coding unit 1202 and a third coding unit 1204 of deeper depths by splitting a square first coding unit 1200 based on block shape information indicating a square shape (for example, the block shape information may be expressed as '0: SQUARE'). Assuming that the size of the square first coding unit 1200 is 2N×2N, the second coding unit 1202 determined by splitting a width and height of the first coding unit 1200 to ½ may have a size of N×N. Furthermore, the third coding unit 1204 determined by splitting a width and height of the second coding unit 1202 to ½ may have a size of N/2×N/2. In this case, a width and height of the third coding unit 1204 are ½ times those of the first coding unit 1200. When a depth of the first coding unit 1200 is D, a depth of the second coding unit 1202, the width and height of which are ½ times those of the first coding unit 1200, may be D+1, and a depth of the third coding unit 1204, the width and height of which are ½ times those of the first coding unit 1200, may be D+2.

According to an embodiment, the image decoding device 150 may determine a second coding unit 1212 or 1222 and a third coding unit 1214 or 1224 of deeper depths by splitting a non-square first coding unit 1210 or 1220 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding device 150 may determine a second coding unit 1202, 1212, or 1222 by splitting at least one of a width and height of the first coding unit 1210 having a size of N×2N. That is, the image decoding device 150 may determine the second coding unit 1202 having a size of N×N or the second coding unit 1222 having a size of N×N/2 by splitting the first coding unit 1210 in a horizontal direction, or may determine the second coding unit 1212 having a size of N/2×N by splitting the first coding unit 1210 in horizontal and vertical directions.

According to an embodiment, the image decoding device 150 may determine the second coding unit 1202, 1212, or 1222 by splitting at least one of a width and height of the first coding unit 1220 having a size of 2N×N. That is, the image decoding device 150 may determine the second coding unit 1202 having a size of N×N or the second coding unit 1212 having a size of N/2×N by splitting the first coding unit 1220 in a vertical direction, or may determine the second coding unit 1222 having a size of N×N/2 by splitting the first coding unit 1220 in horizontal and vertical directions.

According to an embodiment, the image decoding device 150 may determine a third coding unit 1204, 1214, or 1224 by splitting at least one of a width and height of the second coding unit 1202 having a size of N×N. That is, the image decoding device 150 may determine the third coding unit 1204 having a size of N/2×N/2, the third coding unit 1214 having a size of N/2×N/2, or the third coding unit 1224 having a size of N/2×N/2 by splitting the second coding unit 1202 in vertical and horizontal directions.

According to an embodiment, the image decoding device 150 may determine the third coding unit 1204, 1214, or 1224 by splitting at least one of a width and height of the second coding unit 1212 having a size of N/2×N. That is, the image decoding device 150 may determine the third coding unit 1204 having a size of N/2×N/2 or the third coding unit 1224 having a size of N/2×N/2 by splitting the second coding unit 1212 in a horizontal direction, or may determine the third coding unit 1214 having a size of N/2×N/2 by splitting the second coding unit 1212 in vertical and horizontal directions.

According to an embodiment, the image decoding device 150 may determine the third coding unit 1204, 1214, or 1224 by splitting at least one of a width and height of the second coding unit 1222 having a size of N×N/2. That is, the image decoding device 150 may determine the third coding unit 1204 having a size of N/2×N/2 or the third coding unit 1214 having a size of N/2×N/2 by splitting the second coding unit 1222 in a vertical direction, or may determine the third coding unit 1224 having a size of N/2×N/2 by splitting the second coding unit 1222 in vertical and horizontal directions.

According to an embodiment, the image decoding device 150 may split the square coding unit 1200, 1202, or 1204 in a horizontal or vertical direction. For example, the image decoding device 150 may determine the first coding unit 1210 having a size of N×2N by splitting the first coding unit 1200 having a size of 2N×2N in a vertical direction, or may determine the first coding unit 1220 having a size of 2N×N by splitting the first coding unit 1200 in a horizontal direction. According to an embodiment, when a depth is determined based on the length of the longest side of a coding unit, a depth of a coding unit determined by splitting the first coding unit 1200, 1202 or 1204 having a size of 2N×2N in a horizontal or vertical direction may be the same as the depth of the first coding unit 1200, 1202 or 1204.

According to an embodiment, a width and height of the third coding unit 1214 or 1224 may be ½ times those of the first coding unit 1210 or 1220. When a depth of the first coding unit 1210 or 1220 is D, a depth of the second coding unit 1212 or 1222, the width and height of which are ½ times those of the first coding unit 1210 or 1220, may be D+1, and a depth of the third coding unit 1214 or 1224, the width and height of which are ½ times those of the first coding unit 1210 or 1220, may be D+2.

Figure 13:
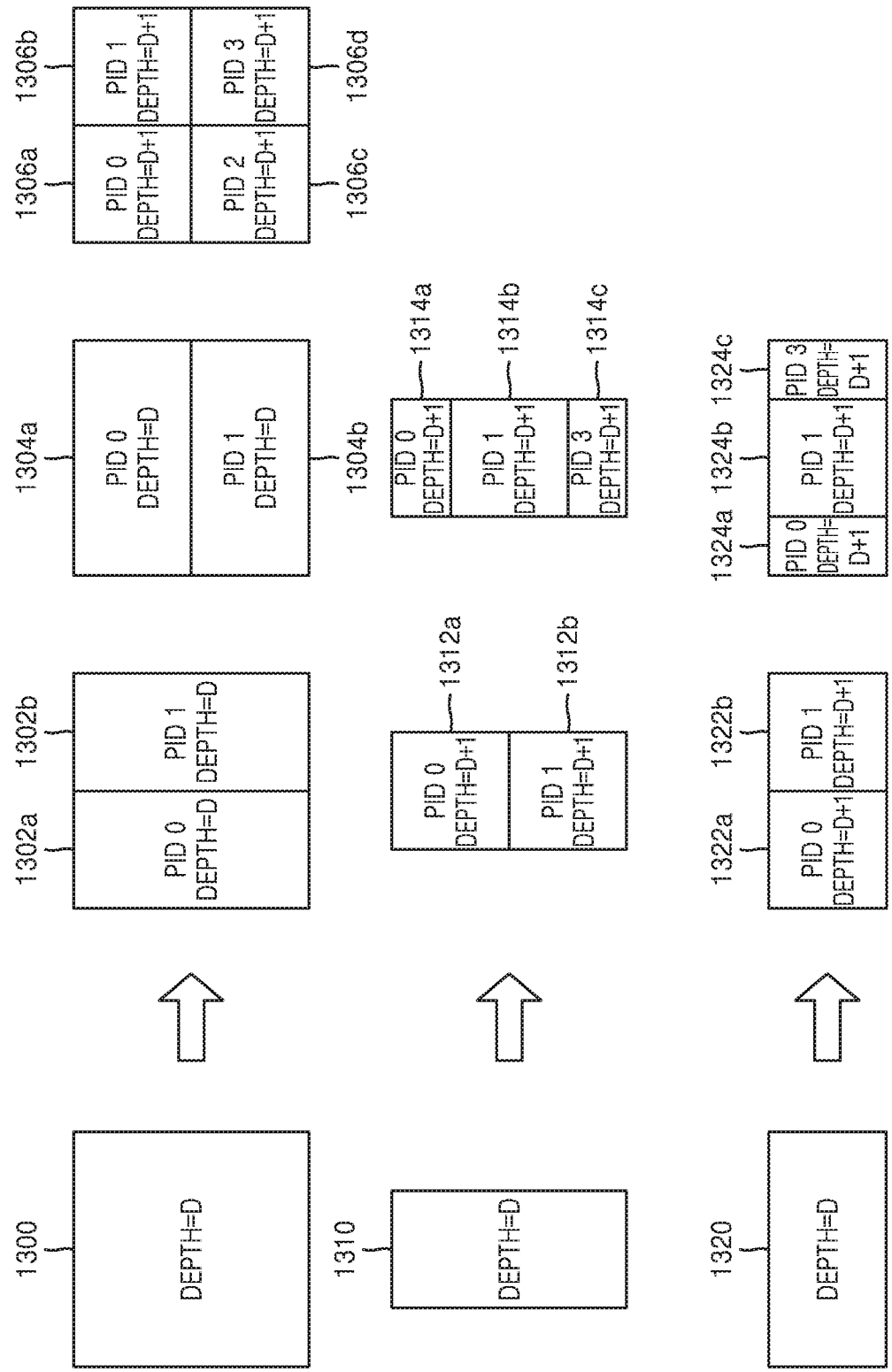
FIG. 13 illustrates depths that are determinable based on shapes and sizes of coding units, and part indexes (PIDs) that are for distinguishing the coding units, according to an embodiment.

FIG. 13 illustrates depths that are determinable based on shapes and sizes of coding units, and part indexes (PIDs) that are for distinguishing the coding units, according to an embodiment.

According to an embodiment, the image decoding device 150 may determine various-shape second coding units by splitting a square first coding unit 1300. Referring to FIG. 13, the image decoding device 150 may determine second coding units 1302a and 1302b, 1304a and 1304b, and 1306a, 1306b, 1306c, and 1306d by splitting the first coding unit 1300 in at least one of vertical and horizontal directions based on split shape information. That is, the image decoding device 150 may determine the second coding units 1302a and 1302b, 1304a and 1304b, and 1306a, 1306b, 1306c, and 1306d, based on the split shape information of the first coding unit 1300.

According to an embodiment, a depth of the second coding units 1302a and 1302b, 1304a and 1304b, and 1306a, 1306b, 1306c, and 1306d, which are determined based on the split shape information of the square first coding unit 1300, may be determined based on the length of a long side thereof. For example, because the length of a side of the square first coding unit 1300 equals the length of a long side of the non-square second coding units 1302a and 1302b, and 1304a and 1304b, the first coding unit 1300 and the non-square second coding units 1302a and 1302b, and 1304a and 1304b may have the same depth, e.g., D. However, when the image decoding device 150 splits the first coding unit 1300 into the four square second coding units 1306a, 1306b, 1306c, and 1306d based on the split shape information, because the length of a side of the square second coding units 1306a, 1306b, 1306c, and 1306d is ½ times the length of a side of the first coding unit 1300, a depth of the second coding units 1306a, 1306b, 1306c, and 1306d may be D+1 which is deeper than the depth D of the first coding unit 1300 by 1.

According to an embodiment, the image decoding device 150 may determine a plurality of second coding units 1312a and 1312b, and 1314a, 1314b, and 1314c by splitting a first coding unit 1310, a height of which is longer than a width, in a horizontal direction based on the split shape information. According to an embodiment, the image decoding device 150 may determine a plurality of second coding units 1322a and 1322b, and 1324a, 1324b, and 1324c by splitting a first coding unit 1320, a width of which is longer than a height, in a vertical direction based on the split shape information.

According to an embodiment, a depth of the second coding units 1312a and 1312b, 1314a, 1314b, and 1314c, 1322a and 1322b, and 1324a, 1324b, and 1324c, which are determined based on the split shape information of the non-square first coding unit 1310 or 1320, may be determined based on the length of a long side thereof. For example, because the length of a side of the square second coding units 1312a and 1312b is ½ times the length of a long side of the first coding unit 1310 having a non-square shape, a height of which is longer than a width, a depth of the square second coding units 1312a and 1312b is D+1 which is deeper than the depth D of the non-square first coding unit 1310 by 1.

Furthermore, the image decoding device 150 may split the non-square first coding unit 1310 into an odd number of second coding units 1314a, 1314b, and 1314c based on the split shape information. The odd number of second coding units 1314a, 1314b, and 1314c may include the non-square second coding units 1314a and 1314c and the square second coding unit 1314b. In this case, because the length of a long side of the non-square second coding units 1314a and 1314c and the length of a side of the square second coding unit 1314b are ½ times the length of a long side of the first coding unit 1310, a depth of the second coding units 1314a, 1314b, and 1314c may be D+1 which is deeper than the depth D of the non-square first coding unit 1310 by 1. The image decoding device 150 may determine depths of coding units split from the first coding unit 1320 having a non-square shape, a width of which is longer than a height, by using the above-described method of determining depths of coding units split from the first coding unit 1310.

According to an embodiment, the image decoding device 150 may determine PIDs for identifying split coding units, based on a size ratio between the coding units when an odd number of split coding units do not have equal sizes. Referring to FIG. 13, a coding unit 1314b of a center location among an odd number of split coding units 1314a, 1314b, and 1314c may have a width equal to that of the other coding units 1314a and 1314c and a height which is two times that of the other coding units 1314a and 1314c. That is, in this case, the coding unit 1314b at the center location may include two of the other coding unit 1314a or 1314c. Therefore, when a PID of the coding unit 1314b at the center location is 1 based on a scan order, a PID of the coding unit 1314c located next to the coding unit 1314b may be increased by 2 and thus may be 3. That is, discontinuity in PID values may be present. According to an embodiment, the image decoding device 150 may determine whether an odd number of split coding units do not have equal sizes, based on whether discontinuity is present in PIDs for identifying the split coding units.

According to an embodiment, the image decoding device 150 may determine whether to use a specific splitting method, based on PID values for identifying a plurality of coding units determined by splitting a current coding unit. Referring to FIG. 13, the image decoding device 150 may determine an even number of coding units 1312*a* and 1312*b* or an odd number of coding units 1314*a*, 1314*b*, and 1314*c* by splitting the first coding unit 1310 having a rectangular shape, a height of which is longer than a width. The image decoding device 150 may use PIDs to identify respective coding units. According to an embodiment, the PID may be obtained from a sample of a predetermined location of each coding unit (e.g., a top left sample).

According to an embodiment, the image decoding device 150 may determine a coding unit at a predetermined location from among the split coding units, by using the PIDs for distinguishing the coding units. According to an embodiment, when the split shape information of the first coding unit 1310 having a rectangular shape, a height of which is longer than a width, indicates to split a coding unit into three coding units, the image decoding device 150 may split the first coding unit 1310 into three coding units 1314*a*, 1314*b*, and 1314*c*. The image decoding device 150 may assign a PID to each of the three coding units 1314*a*, 1314*b*, and 1314*c*. The image decoding device 150 may compare PIDs of an odd number of split coding units to determine a coding unit at a center location from among the coding units. The image decoding device 150 may determine the coding unit 1314*b* having a PID corresponding to a middle value among the PIDs of the coding units, as the coding unit at the center location from among the coding units determined by splitting the first coding unit 1310. According to an embodiment, the image decoding device 150 may determine PIDs for distinguishing split coding units, based on a size ratio between the coding units when the split coding units do not have equal sizes. Referring to FIG. 13, the coding unit 1314*b* generated by splitting the first coding unit 1310 may have a width equal to that of the other coding units 1314*a* and 1314*c* and a height which is two times that of the other coding units 1314*a* and 1314*c*. In this case, when the PID of the coding unit 1314*b* at the center location is 1, the PID of the coding unit 1314*c* located next to the coding unit 1314*b* may be increased by 2 and thus may be 3. When the PID is not uniformly increased as described above, the image decoding device 150 may determine that a coding unit is split into a plurality of coding units including a coding unit having a size different from that of the other coding units. According to an embodiment, when the split shape information indicates to split a coding unit into an odd number of coding units, the image decoding device 150 may split a current coding unit in such a manner that a coding unit of a predetermined location among an odd number of coding units (e.g., a coding unit of a centre location) has a size different from that of the other coding units. In this case, the image decoding device 150 may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding device 150 may use a predetermined data unit where a coding unit starts to be recursively split.

Figure 14:
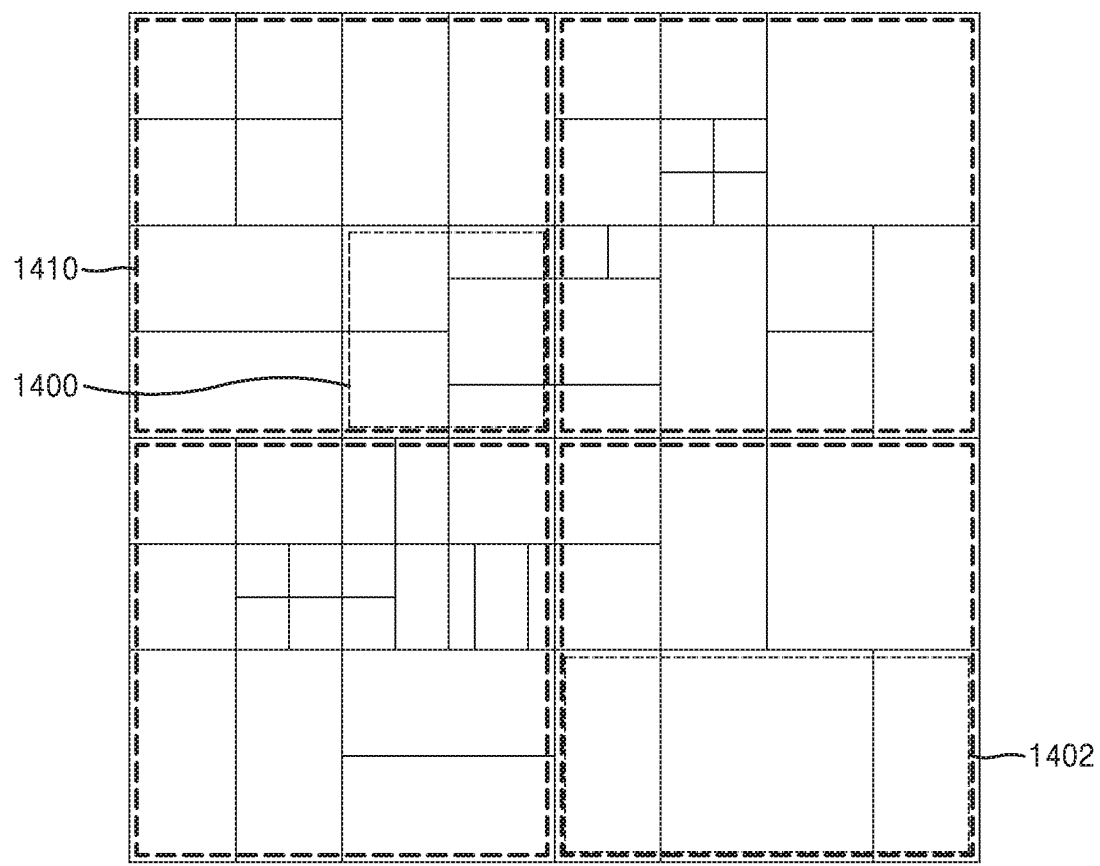
FIG. 14 illustrates that a plurality of coding units are determined based on a plurality of predetermined data units included in a picture, according to an embodiment.

FIG. 14 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding device 150 may split the current picture into a plurality of reference data units. According to an embodiment, the image decoding device 150 may split the plurality of reference data units, which are split from the current picture, by using split information about each reference data unit. The operation of splitting the reference data unit may correspond to a splitting operation using a quadtree structure.

According to an embodiment, the image decoding device 150 may previously determine the minimum size allowed for the reference data units included in the current picture. Accordingly, the image decoding device 150 may determine various reference data units having sizes equal to or greater than the minimum size, and may determine one or more coding units by using the block shape information and the split shape information with reference to the determined reference data unit.

Referring to FIG. 14, the image decoding device 150 may use a square reference coding unit 1400 or a non-square reference coding unit 1402. According to an embodiment, the shape and size of reference coding units may be determined based on various data units capable of including one or more reference coding units (e.g., sequences, pictures, slices, slice segments, largest coding units, or the like).

According to an embodiment, the receiver 160 of the image decoding device 150 may obtain, from a bitstream, at least one of reference coding unit shape information and reference coding unit size information with respect to each of the various data units. An operation of splitting the square reference coding unit 1400 into one or more coding units has been described above in relation to the operation of splitting the current coding unit 1000 of FIG. 10, and an operation of splitting the non-square reference coding unit 1402 into one or more coding units has been described above in relation to the operation of splitting the current coding unit 1100 of FIG. 11. Thus, detailed descriptions thereof will not be provided herein.

According to an embodiment, the image decoding device 150 may use a PID for identifying the size and shape of reference coding units, to determine the size and shape of reference coding units according to some data units previously determined based on a predetermined condition. That is, the receiver 160 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The image decoding device 150 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding device 150 may determine at least one of the size and shape of reference coding units included in a data unit serving as a unit for obtaining the PID, by selecting the previously determined at least one of the size and shape of reference coding units based on the PID.

According to an embodiment, the image decoding device 150 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding device 150 may determine the reference coding units by splitting the largest coding unit n times based on a quadtree structure, and may split the reference coding unit based on at least one of the block shape information and the split shape information according to various embodiments.

Figure 15:
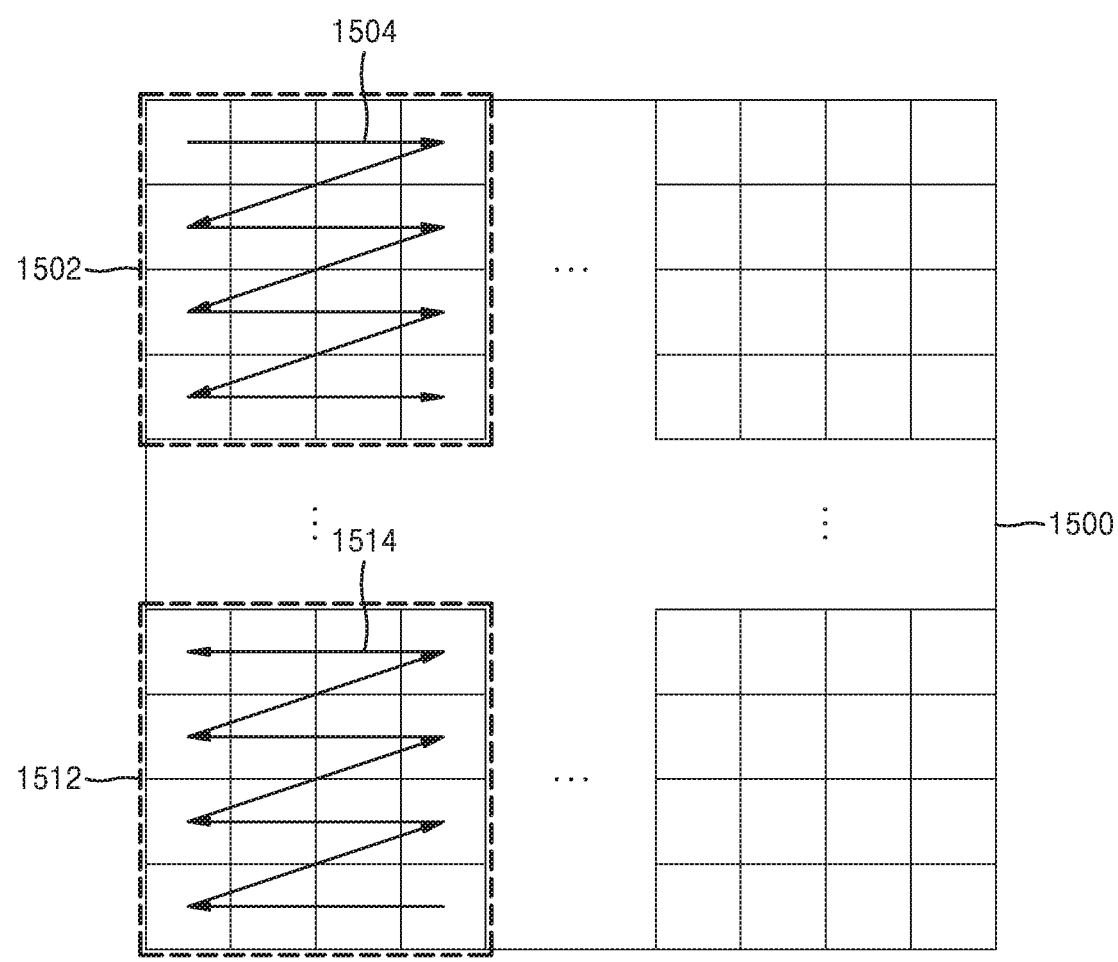
FIG. 15 illustrates a processing block serving as a unit for determining a determination order of reference coding units included in a picture, according to an embodiment.

FIG. 15 illustrates a processing block serving as a unit for determining a determination order of reference coding units included in a picture 1500, according to an embodiment.

According to an embodiment, the image decoding device 150 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan, Z-scan, N-scan, up-right diagonal scan, horizontal scan, and vertical scan, but is not limited to the above-mentioned scan orders.

According to an embodiment, the image decoding device 150 may obtain processing block size information and may determine the size of one or more processing blocks included in the picture. The image decoding device 150 may obtain the processing block size information from a bitstream and may determine the size of one or more processing blocks included in the picture. The size of processing blocks may be a predetermined size of data units, which is indicated by the processing block size information.

According to an embodiment, the receiver 160 of the image decoding device 150 may obtain the processing block size information from the bitstream according to each specific data unit. For example, the processing block size information may be obtained from the bitstream in a data unit such as an image, sequence, picture, slice, or slice segment. That is, the receiver 160 may obtain the processing block size information from the bitstream according to each of the various data units, and the image decoding device 150 may determine the size of one or more processing blocks, which are split from the picture, by using the obtained processing block size information. The size of the processing blocks may be integer times that of the reference coding units.

According to an embodiment, the image decoding device 150 may determine the size of processing blocks 1502 and 1512 included in the picture 1500. For example, the image decoding device 150 may determine the size of processing blocks based on the processing block size information obtained from the bitstream. Referring to FIG. 15, according to an embodiment, the image decoding device 150 may determine a width of the processing blocks 1502 and 1512 to be four times the width of the reference coding units, and may determine a height of the processing blocks 1502 and 1512 to be four times the height of the reference coding units. The image decoding device 150 may determine a determination order of one or more reference coding units in one or more processing blocks.

According to an embodiment, the image decoding device 150 may determine the processing blocks 1502 and 1512, which are included in the picture 1500, based on the size of processing blocks, and may determine a determination order of one or more reference coding units in the processing blocks 1502 and 1512. According to an embodiment, determination of reference coding units may include determination of the size of the reference coding units.

According to an embodiment, the image decoding device 150 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding device 150 may obtain, from the bitstream, the determination order information of reference coding units according to each specific data unit. For example, the receiver 160 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding device 150 may determine one or more reference coding units based on the determined determination order.

According to an embodiment, the receiver 160 may obtain the determination order information of reference coding units from the bitstream as information related to the processing blocks 1502 and 1512, and the image decoding device 150 may determine a determination order of one or more reference coding units included in the processing blocks 1502 and 1512 and determine one or more reference coding units, which are included in the picture 1500, based on the determination order. Referring to FIG. 15, the image decoding device 150 may determine determination orders 1504 and 1514 of one or more reference coding units in the processing blocks 1502 and 1512, respectively. For example, when the determination order information of reference coding units is obtained with respect to each processing block, different types of the determination order information of reference coding units may be obtained for the processing blocks 1502 and 1512. When the determination order 1504 of reference coding units in the processing block 1502 is a raster scan order, reference coding units included in the processing block 1502 may be determined according to a raster scan order. On the contrary, when the determination order 1514 of reference coding units in the other processing block 1512 is a backward raster scan order, reference coding units included in the processing block 1512 may be determined according to the backward raster scan order. In FIGS. 1 through 15, a method of splitting an image into largest coding units and splitting the largest coding unit into coding units having a hierarchical tree structure is described. In FIGS. 16 through 25, in what encoding order coding units determined by splitting a coding unit are to be encoded or decoded will be described.

Figure 16:
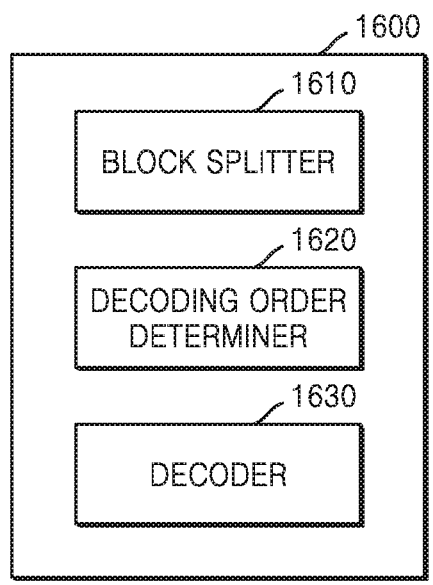
FIG. 16 illustrates a video decoding device regarding splitting of a current block and determination of an encoding order of split lower blocks, according to an embodiment.

FIG. 16 illustrates a video decoding device 1600 regarding splitting of a current block and determination of an encoding order of split lower blocks, according to an embodiment.

The video decoding device 1600 includes a block splitter 1610, a decoding order determiner 1620, and a decoder 1630. In FIG. 16, although the block splitter 1610, the decoding order determiner 1620, and the decoder 1630 are illustrated as separate constituent units, the block splitter 1610, the decoding order determiner 1620, and the decoder 1630 may be combined to be implemented as one constituent unit, according to an embodiment.

In FIG. 16, although the block splitter 1610, the decoding order determiner 1620, and the decoder 1630 are illustrated as being included in one device, devices that perform respective functions of the block splitter 1610, the decoding order determiner 1620, and the decoder 1630 may not necessarily be physically adjacent to each other. Accordingly, the block splitter 1610, the decoding order determiner 1620, and the decoder 1630 may be distributed, according to an embodiment.

The block splitter 1610, the decoding order determiner 1620, and the decoder 1630 may be implemented by one processor, according to an embodiment. In addition, the block splitter 1610, the decoding order determiner 1620, and the decoder 1630 may be implemented by a plurality of processors, according to an embodiment.

Functions performed by the block splitter 1610, the decoding order determiner 1620, and the decoder 1630 of FIG. 16 may be performed by the decoder 170 of FIG. 2.

The block splitter 1610 may obtain split information indicating whether to split a current block. The split information indicates whether to split the current block into two or more smaller blocks. When the split information indicates to split the current block, the block splitter 1610 splits the current block into two or more lower blocks.

The current block may be split into various shapes according to a shape thereof. For example, when the current block is square, the current block may be split into four lower blocks having a square shape according to the split information.

When two or more splitting methods are allowed for the shape of the current block, the block splitter 1610 may select a splitting method according to the split shape information. Therefore, when the split information indicates to split the current block, the block splitter 1610 may obtain split shape information indicating a splitting method of the current block. In addition, the block splitter 1610 may split the current block according to the splitting method indicated by the split shape information. For example, when the current block has a square shape having a size of 2N×2N, the split shape information may indicate a splitting method applied to the current block from among a quad split, a vertical binary split, a horizontal binary split, a vertical tri split, and a horizontal tri split. The quad split is a method of splitting the current block into four blocks having a size of N×N. The vertical binary split is a method of splitting the current block into blocks having a size of 2N×N. The horizontal binary split is a method of splitting the current block into blocks having a size of N×2N. The horizontal tri split means a method of splitting a block having a size of 2N×2N into three blocks having the same width and a height ratio of 1:2:1. The vertical tri split means a method of splitting a block having a size of 2N×2N into three blocks having the same height and a width ratio of 1:2:1. In addition, the current block may be split by one of various horizontal splitting methods or vertical splitting methods.

When the current block is a rectangle having a size of 2N×N, which is elongated in a vertical direction, the split shape information may indicate a splitting method applied to the current block from among the quad split and the horizontal tri split. The quad split is a method of splitting the current block into two blocks having a size of N×N. The horizontal tri split means a method of splitting a block having a size of 2N×N into three blocks having the same width and a height ratio of 1:2:1. In addition, the current block may be split by one of various horizontal splitting methods or vertical splitting methods.

When the current block is a rectangle having a size of N×2N, which is elongated in a horizontal direction, the split shape information may indicate a splitting method applied to the current block from among the quad split and the vertical tri split. The quad split is a method of splitting the current block into two blocks having a size of N×N. The vertical tri split means a method of splitting a block having a size of N×2N into three blocks having the same height and a width ratio of 1:2:1. In addition, the current block may be split by one of various horizontal splitting methods or vertical splitting methods.

In addition to the above splitting methods, a method of splitting the current block at an asymmetric ratio, a method of splitting the current block into a triangular shape, and a method of splitting the current block into other geometric shapes may be used for splitting the current block into square and rectangular sizes.

According to an embodiment, the split information may indicate a split shape of the current block. For example, the split information may indicate one of a vertical binary split, a horizontal binary split, a vertical tri split, a horizontal tri split, and no split. When the split information indicates no split, the current block is not split. Therefore, the block splitter 1610 may parse the split information to determine whether the current block is split and determine a split shape of the current block. In FIG. 33, various embodiments in which the split information indicates whether the current block is split and a split shape of the current block will be described.

The decoding order determiner 1620 may obtain encoding order information indicating an encoding order of lower blocks. The encoding order information indicates an encoding order of two or more lower blocks included in the current block. A data amount of the encoding order information is determined according to the number of lower blocks and an encoding order determination method.

For example, when there are two lower blocks, the encoding order information may be determined to indicate a lower block that is first encoded from among the two lower blocks. Therefore, the encoding order information may have a shape of a flag having a data amount of 1 bit.

The decoding order determiner 1620 may determine whether to obtain encoding order information according to a type of a slice including the current block. When the slice is a P slice or a B slice, the decoding order determiner 1620 may obtain, from the bitstream, encoding order information about the current block. When the slice is an I slice, the decoding order determiner 1620 may obtain, from the bitstream, the encoding order information about the current block only when the current block is a luma block.

The decoding order determiner 1620 may determine whether to obtain the encoding order information according to a size of the current block. The encoding order information is predetermined according to a minimum value and a maximum value of a size of a block being obtained. When a smaller value between a height and a width of the current block is greater than or equal to the minimum value of the size of the block and a larger value between the height and the width of the current block is less than or equal to the maximum value of the size of the block, the decoding order determiner 1620 may obtain, from the bitstream, the encoding order information of the current block.

The decoding order determiner 1620 may determine whether to obtain the encoding order information according to a split shape of the current block. When the current block is quad split, vertically binary split, or vertically tri split, the decoding order determiner 1620 may obtain the encoding order information of the current block from the bitstream. However, when the current block is horizontally binary split or vertically tri split, the encoding order information is not obtained.

The decoding order determiner 1620 may determine whether to obtain the encoding order information according to a shape of the current block. For example, when the width of the current block is greater than the size of the current block, the decoding order determiner 1620 may obtain the encoding order information of the current block from the bitstream. According to an embodiment, even when the width of the current block is the same as the size of the current block, the encoding order information may be obtained.

The encoding order information indicates an encoding order of lower blocks in terms of encoding. In terms of decoding, a decoding order and an encoding order are determined to be the same, and thus, the encoding order and the decoding order may be used interchangeably. Therefore, in the present specification, the encoding order and the decoding order are interpreted as being substantially the same.

However, when there are four lower blocks, the number of cases in the encoding order of the lower blocks is 4!=24. Therefore, in order to indicate 24 encoding orders, a data amount of 5 bits is required. That is, as the number of lower blocks increases, the number of cases in the encoding order increases. Therefore, in order to reduce the data amount of the encoding order information, an encoding order determining method of determining the encoding order by determining whether an encoding order of some lower block pairs is swapped in a predetermined basic encoding order may be used. Encoding order information indicating whether the encoding order of the lower block pairs is swapped indicates whether the encoding order is in a forward or reverse direction with respect to a basic encoding order.

Figure 18A:
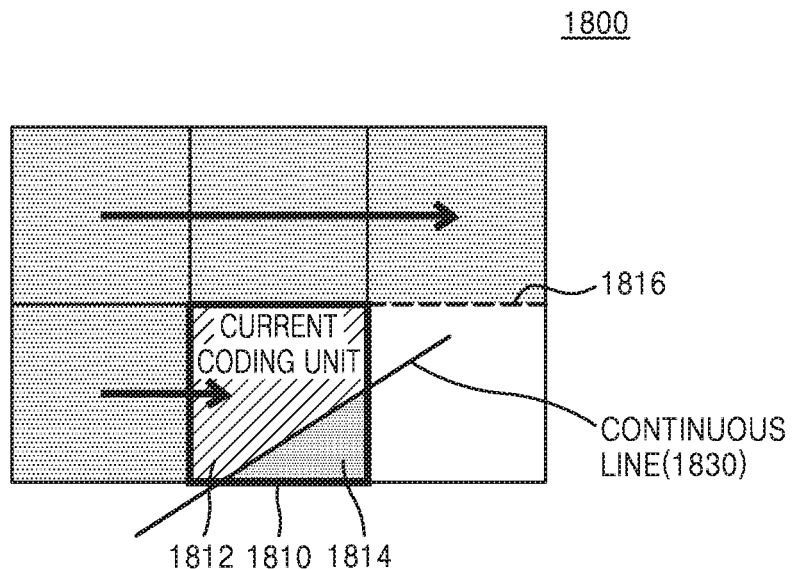
FIGS. 18A and 18B illustrate a case in which a coding unit is encoded in a forward direction and a case in which a coding unit is encoded in a reverse direction, respectively.
Figure 18B:
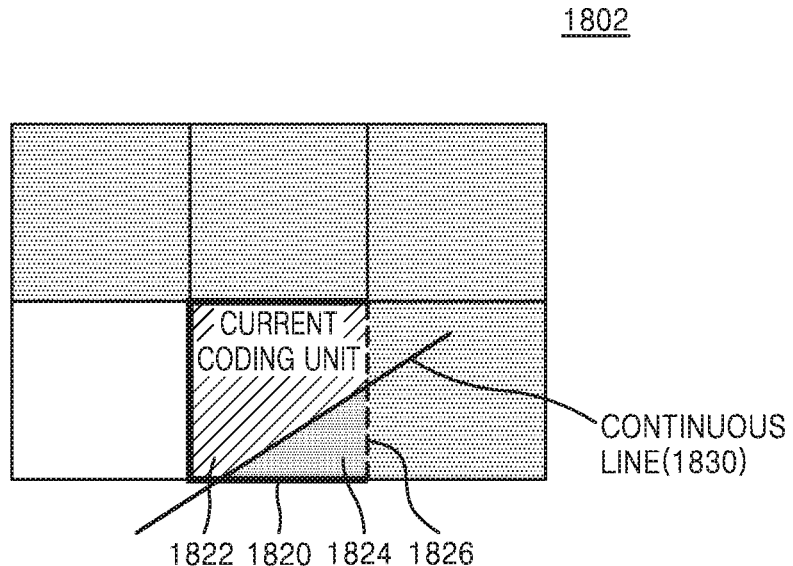

A current picture in which the current block is included is encoded and decoded according to the basic encoding order. All blocks and pixels encoded and decoded in the current picture are encoded and decoded according to the basic encoding order at the same level. Therefore, lower blocks at the same level split from the current block are also encoded and decoded according to the basic encoding order. An embodiment of the basic encoding order is illustrated in FIGS. 18A through 18B, which will be described at a later time.

Therefore, when a lower block pair is encoded according to the basic encoding order, the lower block pair is encoded in a forward direction. Conversely, when a lower block pair is encoded in a reverse order of the basic encoding order, the lower block pair is encoded in a reverse direction.

For example, when two lower blocks are horizontally adjacent to each other and are encoded in a forward direction, the encoding order information may be determined such that a lower-right level block is first decoded. Conversely, when two horizontally adjacent lower blocks are encoded in a reverse direction, the encoding order information may be determined such that a lower-right level block is first decoded.

Likewise, when two lower blocks are vertically adjacent to each other and are encoded in a forward direction, the encoding order information may be determined such that an upper lower block is first decoded. Conversely, when two vertically adjacent lower blocks are encoded in a reverse direction, the encoding order information may be determined such that a lower lower block is first decoded.

When the encoding order information indicates only the encoding order of the lower block pairs, the encoding order information has a data amount of 1 bit. The encoding order information having a data amount of 1 bit may be defined as an encoding order flag.

Decoding order determiner 1620 may obtain encoding order information from the bitstream. The encoding order information may be located after split information in the bitstream.

The decoding order determiner 1620 may implicitly determine the encoding order information according to a surrounding environment of the current block. The encoding order information may be determined according to whether adjacent blocks adjacent to the current block are encoded. For example, the decoding order determiner 1620 may determine that a lower block having a large number of adjacent blocks that are first decoded from among lower blocks is first decoded.

Figure 17A:
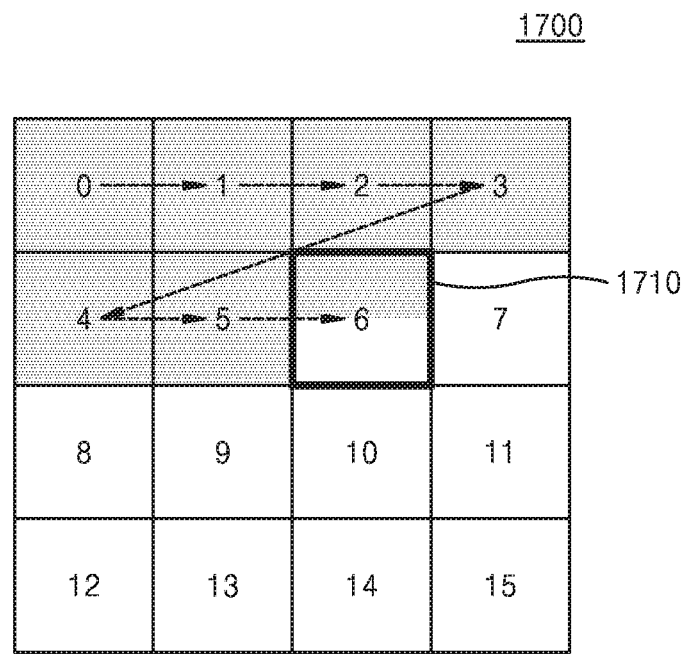
FIGS. 17A through 17C illustrate a basic encoding order, according to an embodiment.
Figure 17B:
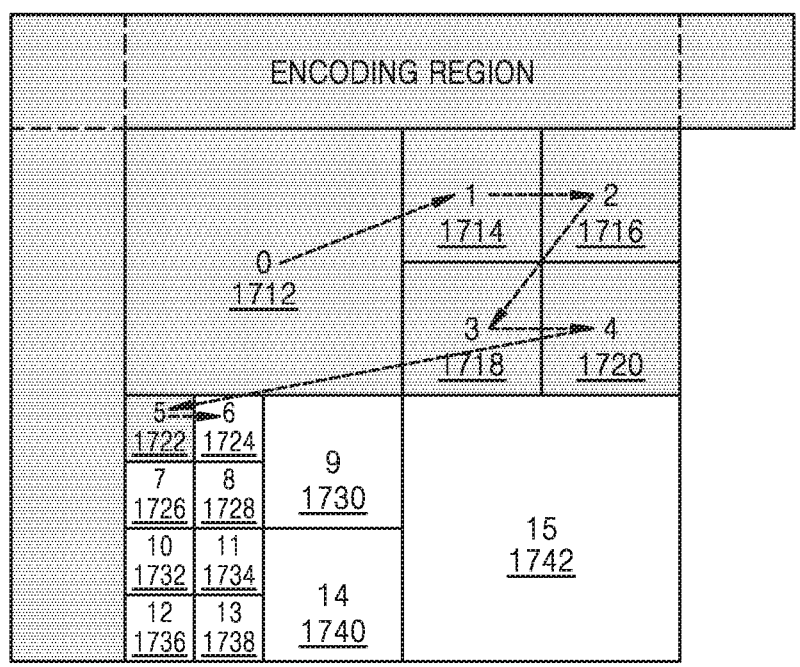
Figure 17C:
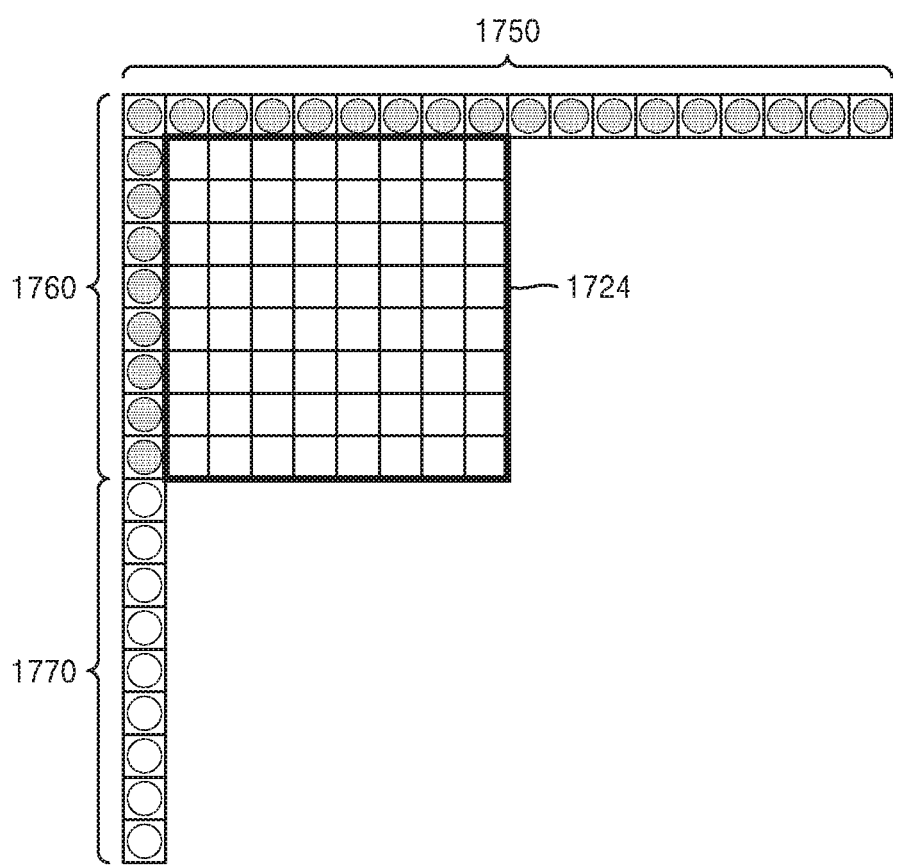

With regard to the decoding order determiner 1620, a basic encoding order according to an embodiment is described with reference to FIGS. 17A to 17C. The basic encoding order of FIGS. 17A to 17C is a Z encoding order. According to the Z encoding order, when data units are encoded from left to right and all data units of a current row are encoded, data units included in a row below the current row are encoded from left to right. The above-described Z encoding order is referred to as a raster scan order.

FIG. 17A illustrates encoding orders of largest coding units included in a current picture 1700 according to the Z encoding order. Indices of 0 to 15 are set in the largest coding units according to the Z encoding order. Largest coding units of a first row, in which indices of 0 to 3 are set according to the Z encoding order, are first encoded, and largest coding units of a second row, in which indices of 4 to 7 are set, are encoded from left to right. The largest coding units are also internally encoded according to the Z encoding order.

FIG. 17B illustrates an encoding order of a largest coding unit 1710 having an index of 6 from among the largest coding units included in the current picture 1700. Indices of 0 to 15 are set in coding units having a final depth, which are completely split according to the Z encoding order. The Z encoding order is applied to data units having the same depth. In addition, a subsequent coding unit having a depth of n is not encoded until all lower coding units of a coding unit having the depth of n are encoded. For example, a coding unit having an index of 15 is not encoded until all coding units having indices of 5 to 14 are encoded. The coding units are also internally encoded according to the Z encoding order.

FIG. 17C illustrates a reference sample referenced by a coding unit 1724 having an index of 6 from among the coding units included in the largest coding unit 1710. Only a coding unit 1712 having an index of 0 and a coding unit 1722 having an index of 5 are reconstructed around the coding unit 1724 having the index of 6 that is currently encoded. Therefore, for the coding unit 1724, only a pixel 1750 of the coding unit 1712 and a pixel 1760 of the coding unit 1722 may be used as reference samples.

The Z encoding order of FIGS. 17A to 17C may be applied in different directions based on data units. For example, the Z encoding order may be changed to encode data units in the same row from right to left. In addition, the Z encoding order may be changed such that all data units in the current row are encoded and then data units included in a row above the current row are encoded. The Z encoding order may be changed such that data units in the same column are encoded from top to bottom, all data units in the current column are encoded, and then data units in a right column of the current column are encoded.

With regard to the decoding order determiner 1620, FIGS. 18A and 18B illustrate a case 1800 where a coding unit 1810 is encoded in a forward direction and a case 1802 where a coding unit 1820 is encoded in a reverse direction, respectively. Advantages obtained by changing the encoding order according to FIGS. 18A and 18B will be described.

Coding units 1810 and 1820 of FIGS. 18A and 18B are predicted according to an intra mode using neighboring samples in an upper-right direction. A continuous line 1830 of FIGS. 18A and 18B is pixels having a predetermined value arranged in a straight line in an original image. Therefore, when the current coding unit is predicted in a direction of the continuous line 1830, the prediction accuracy of coding units 1810 and 1820 may be improved.

In the case 1800 where the coding unit 1810 is encoded in a forward direction, a left coding unit, an upper coding unit, and a upper-right coding unit of the current coding unit 1810 are reconstructed prior to the current coding unit 1810. Accordingly, the current coding unit 1810 refers to pixels or encoding information of the left coding unit, the upper coding unit, and the upper-right coding unit. For example, pixels 1816 located at a lower corner of the upper-right coding unit are used for prediction of the current coding unit 1810. Because the pixels 1816 may be spatially separated from the current coding unit 1810, the prediction accuracy of a portion 1814 of the current coding unit 1810 may be low.

However, because a right coding unit, the upper coding unit, and an upper-left coding unit of the current coding unit 1810 are reconstructed prior to the current coding unit 1820 in the case 1802 where the current coding unit 1820 is encoded in a reverse direction, pixels 1826 located at a left corner of the right coding unit may be used for prediction of the current coding unit 1820 in intra prediction. Because the pixels 1826 are adjacent to the current coding unit 1820, the prediction accuracy of a portion 1824 of the current coding unit 1820 may be improved compared to the prediction accuracy of the portion 1814 of the current coding unit 1810.

As in the embodiment of intra prediction described with reference to FIGS. 18A and 18B, there are many cases that can improve the prediction accuracy by obtaining encoding information from a block located in a reverse direction with respect to inter prediction. When the current coding unit and the right coding unit of the current coding unit are coding units for the same object, motion information of the current coding unit may be similar to that of the right coding unit. Accordingly, by deriving the motion information of the current coding unit from the motion information of the right coding unit, coding efficiency may be increased.

The encoding order information may be set to be the same as encoding order information applied to an upper block of a current block. For example, when the current block is a block for prediction or a block for transformation, the decoding order determiner 1620 may apply, to the current block, encoding order information applied to a coding unit including the current block. As another example, when the current block is a coding unit, the decoding order determiner 1620 may apply, to the current block, encoding order information applied to a coding unit of a depth deeper than that of the current block.

When two or more encoding order flags are required for the current block, the decoding order determiner 1620 may obtain only one encoding order flag from the bitstream and determine the remaining encoding order flags as a predetermined value based on the encoding order flag obtained from the bitstream.

Figure 19:
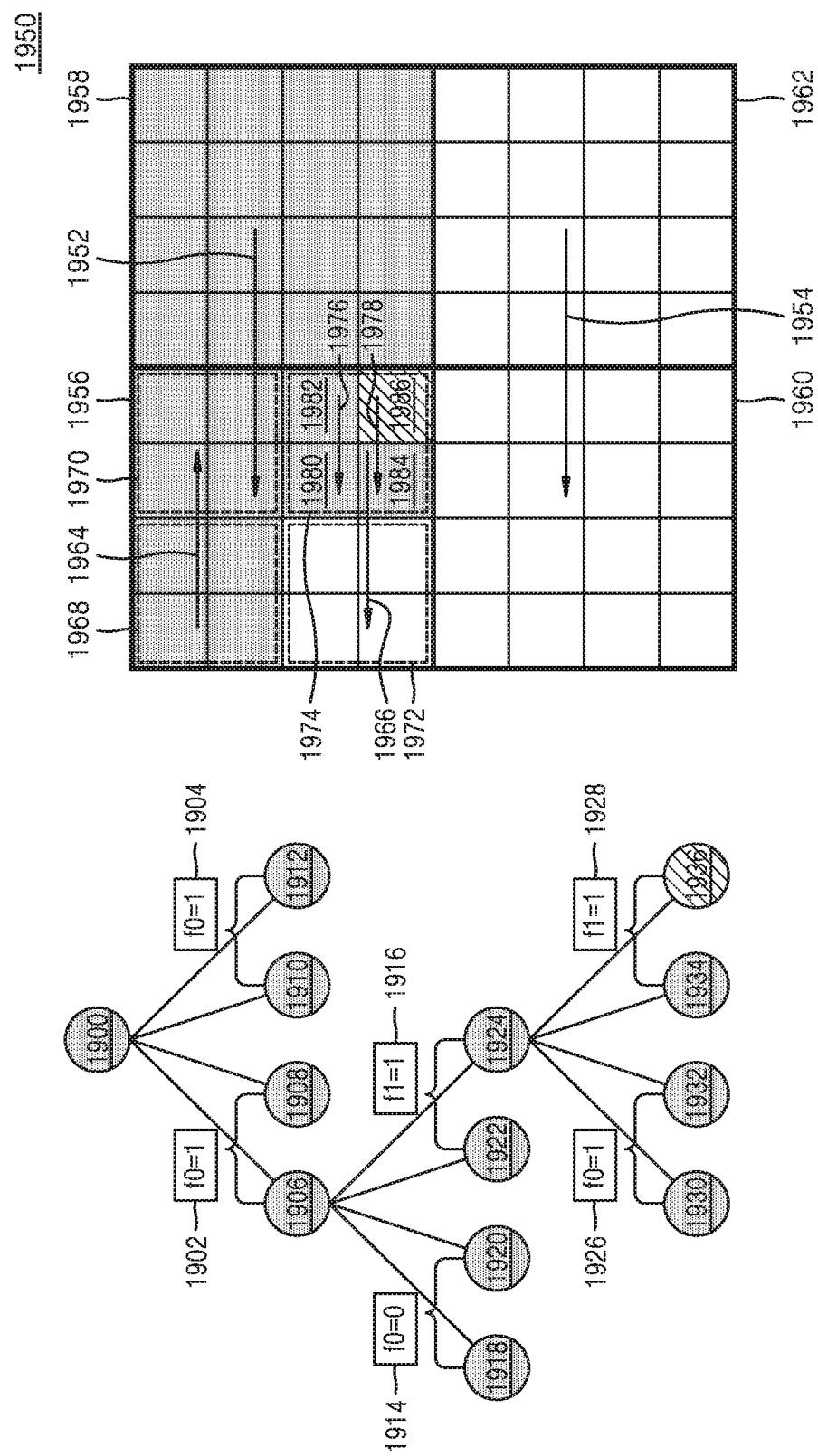
FIG. 19 illustrates a tree structure of a largest coding unit for describing an encoding order of the largest coding unit and coding units included in the largest coding unit.

With regard to determination of an encoding order by the decoding order determiner 1620, FIG. 19 illustrates a tree structure of a largest coding unit for describing an encoding order of the largest coding unit and coding units included in the largest coding unit.

A largest coding unit 1950 is split into a plurality of coding units 1956, 1958, 1960, 1962, 1968, 1970, 1972, 1974, 1980, 1982, 1984, and 1986. The largest coding unit 1950 corresponds to an uppermost node 1900 having a tree structure. The plurality of coding units 1956, 1958, 1960, 1962, 1968, 1970, 1972, 1974, 1980, 1982, 1984, and 1986 correspond to a plurality of nodes 1906, 1908, 1910, 1912, 1918, 1920, 1922, 1924, 1930, 1932, 1934, and 1936, respectively. In a tree structure, upper encoding order flags 1902, 1914, and 1926 indicating an encoding order correspond to arrows 1952, 1964, and 1976, and upper encoding order flags 1904, 1916, and 1928 correspond to arrows 1954, 1966, and 1978.

The upper encoding order flag indicates an encoding order of two coding units located at the top from among four coding units split from one coding unit. When the upper encoding order flag is 0, encoding is performed in a forward direction. Conversely, when the upper encoding order flag is 1, encoding is performed in a reverse direction.

Equally, a lower encoding order flag indicates an encoding order of two coding units located at the bottom from among the four coding units split from one coding unit. When the lower encoding order flag is 0, encoding is performed in a forward direction. Conversely, when the lower encoding order flag is 1, encoding is performed in a reverse direction.

For example, because the upper encoding order flag 1914 is 0, an encoding order between the coding units 1968 and 1970 is determined from left to right, which is a forward direction. Because the lower encoding order flag 1916 is 1, an encoding order between the coding units 1972 and 1974 is determined from right to left, which is a reverse direction.

According to an embodiment, the upper encoding order flag and the lower encoding order flag may be set to have the same value. For example, when the upper encoding order flag 1902 is determined as 1, the lower encoding order flag 1904 corresponding to the upper encoding order flag 1902 may also be determined as 1. Because values of the upper encoding order flag and the lower encoding order flag are determined as 1 bit, an information amount of the encoding order information is reduced.

According to an embodiment, the upper encoding order flag and the lower encoding order flag of the current coding unit may be determined with reference to at least one of an upper encoding order flag and a lower encoding order flag applied to a coding unit greater than the current coding unit. For example, an upper encoding order flag 1926 and a lower encoding order flag 1928 applied to the coding units 1980, 1982, 1984, and 1986 may be determined based on a lower encoding order flag 1916 applied to the coding units 1972 and 1974. Accordingly, the upper encoding order flag 1926 and the lower encoding order flag 1928 may be determined to have the same value as the lower encoding order flag 1916. Because values of the upper encoding order flag and the lower encoding order flag are determined from an upper coding unit of the current coding unit, encoding order information is not obtained from the bitstream. Therefore, an information amount of the encoding order information is reduced.

According to an embodiment, it may be determined whether an encoding order flag of a block is obtained according to a depth or a size of the block. For example, an encoding order flag may be obtained only for blocks having a predetermined size, and an encoding order flag may not be obtained for blocks having other sizes. When the current block is greater than the block having the predetermined size, the encoding order may be determined in a forward direction without obtaining the encoding order flag. When the current block is smaller than the block having the predetermined size, the encoding order may be determined according to an upper block of the current block without obtaining the encoding order flag. A size of the block from which the encoding order flag is obtained may be arbitrarily determined. For example, the size of the block from which the encoding order flag is obtained may be determined as 16×16 and 32×32.

Figure 20:
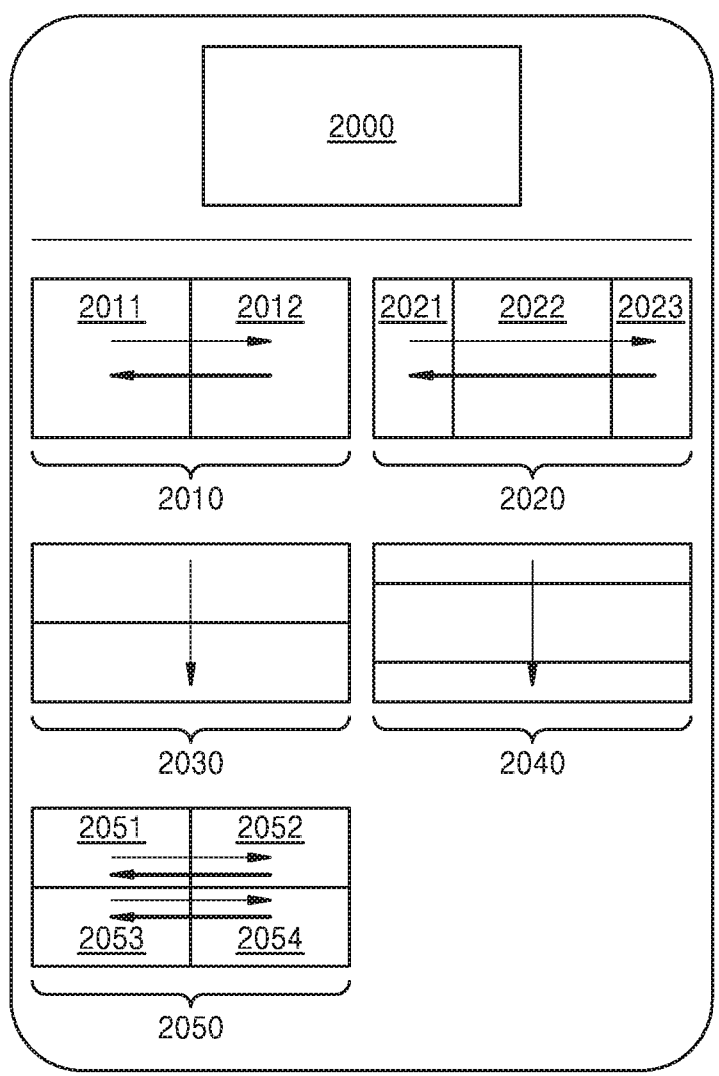
FIG. 20 illustrates a method of determining an encoding order of two or more split blocks according to an encoding order flag.

With regard to determination of an encoding order by the decoding order determiner 1620, FIG. 20 illustrates how an encoding order of two or more split blocks is determined according to an encoding order flag. An upper block 2000 located at the top in FIG. 20 is rectangular. Whether an encoding order flag of the upper block 2000 is obtained according to a height and a width of the upper block 2000 may be determined.

For example, when a greater value of a height value and a width value of the upper block 2000 is smaller than a maximum split unit coding order (SUCO) size value, the encoding order flag of the upper block 2000 may be obtained. Also, when a smaller value of the height value and the width value of the upper block 2000 is greater than a minimum SUCO size value, the encoding order flag of the upper block 2000 may be obtained. When both of the above two conditions are satisfied, the encoding order flag of the upper block 2000 may be obtained.

A first embodiment 2010 of FIG. 20 illustrates a method of determining an encoding order of two blocks that are generated by being vertically split. When an encoding order of left and right blocks 2011 and 2012 is determined to be forward, the left block 2011 is encoded prior to the right block 2012. Conversely, when the encoding order of the left and right blocks 2011 and 2012 is determined to be reverse, the right block 2012 is encoded prior to the left block 2011.

A second embodiment 2020 of FIG. 20 illustrates a method of determining an encoding order of three blocks generated by being vertically split. When an encoding order of left, center, and right blocks 2021, 2022, and 2023 is determined to be forward, the left block 2021, the center block 2022, and the right block 2023 are encoded in order. Conversely, when the encoding order of the left, center, and right blocks 2021, 2022, and 2023 is determined to be reverse, the right block 2023, the center block 2022, and the left block 2021 are encoded in order.

In a third embodiment 2030 and a fourth embodiment 2040 of FIG. 20, two blocks generated by being horizontally split and three blocks generated by being horizontally split are illustrated, respectively. In the third and fourth embodiments 2030 and 2040 in which the block is horizontally split, the encoding order is always determined to be forward.

A fifth embodiment 2050 of FIG. 20 illustrates a method of determining an encoding order of four blocks generated by being vertically and horizontally split. According to the fifth embodiment 2050, when an encoding order of upper-left, upper-right, lower-right, and lower-right blocks 2051, 2052, 2053, and 2054 is determined to be forward, the upper-left block 2051, the upper-right block 2052, the lower-left block 2053, and the lower-right block 2054 are encoded in order. Conversely, when the encoding order of the upper-left, upper-right, lower-right, and lower-right blocks 2051, 2052, 2053, and 2054 is determined to be reverse, the upper-right block 2052, the upper-left block 2051, the lower-right block 2054, and the lower-left block 2053 are encoded in order. In the fifth embodiment 2050, the encoding orders of the upper blocks 2051 and 2052 and the lower blocks 2053 and 2054 are displayed to be the same, but they may be set differently.

Figure 21:
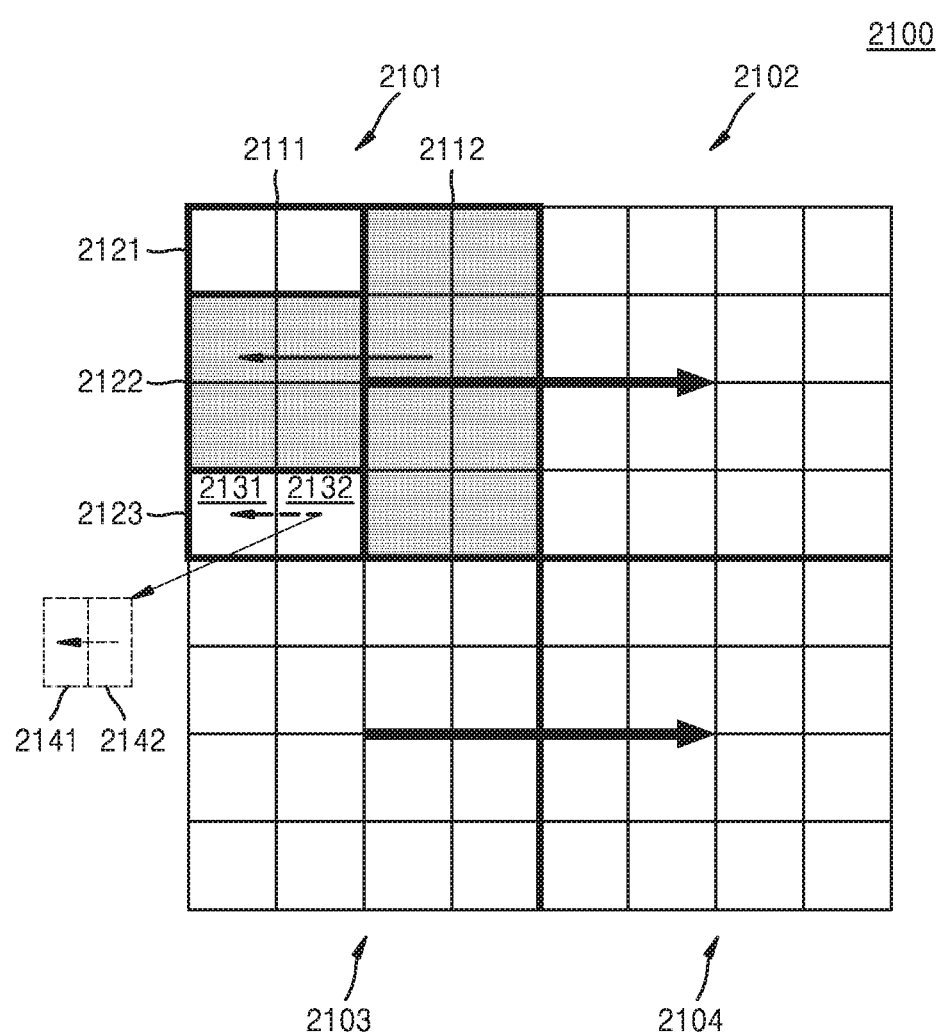
FIG. 21 illustrates an embodiment in which an encoding order of lower blocks is determined according to an encoding order of upper blocks.

FIG. 21 illustrates a method in which an encoding order of lower blocks is determined according to an encoding order of upper blocks. According to an embodiment of FIG. 21, an encoding order flag may be obtained only for blocks having a predetermined size. An encoding order of blocks having sizes smaller than the predetermined size is determined to be the same as the encoding order of the upper blocks.

In the embodiment of FIG. 21, an encoding order flag is set to be obtained for blocks having a size of 32×32 or greater and a size of 128×128 or smaller. Accordingly, an encoding order flag of a block 2100 having the size of 128×128, which is vertically and horizontally split, is obtained. In FIG. 21, the encoding order flag of the block 2100 indicates an encoding order in a forward direction. Accordingly, a left block is decoded prior to a right block. Therefore, blocks 2101, 2102, 2103, and 2104 are decoded in order.

The block 2101 having a size of 64×64 is vertically split to generate two blocks 2111 and 2112 having a size of 64×32. An encoding order flag of the blocks 2111 and 2112 is obtained. In FIG. 21, because an encoding order flag of the block 2101 indicates a reverse direction, the block 2112 is decoded prior to the block 2111.

The block 2111 having a size of 64×32 is horizontally tri split, and thus, a block 2121 having a size of 16×32 at the top, a block 2122 having a size of 32×32 at the center, and a block 2123 having a size of 16×32 at the bottom are generated. In FIG. 21, because a vertical decoding order transition does not occur, an encoding order flag of the block 2111 is not obtained. Accordingly, the blocks 2121, 2122, and 2123 are decoded in order from top to bottom.

The block 2123 having a size of 16×32 is vertically split to generate two blocks 2131 and 2132 having a size of 16×16. Because the size of the block 2123 is smaller than 32×32, which is the minimum size at which the encoding order flag is obtained, an encoding order flag of the block 2123 is not obtained. Accordingly, the encoding order of the block 2123 is determined to be reverse in the same manner as the block 2101, which is an upper block of the block 2123, is decoded. Therefore, the block 2132 is decoded prior to the block 2131.

The block 2132 having a size of 16×16 is vertically split to generate two blocks 2141 and 2142 having a size of 16×8. Because the size of the block 2132 is smaller than 32×32, which is the minimum size at which the encoding order flag is obtained, an encoding order flag of the block 2132 is not obtained, as in the block 2123. Accordingly, the encoding order of the block 2132 is determined to be reverse in the same manner as the block 2123, which is an upper block of the block 2132. Therefore, the block 2142 is decoded prior to the block 2141.

A block size at which the encoding order flag is obtained, described in FIG. 21, may be changed. For example, a maximum size of a block at which the encoding order flag is obtained may be changed to 256×256 or 64×64, and the minimum size of a block at which the encoding order flag is obtained may be changed to 64×64 or 16×16.

Also, in FIG. 21, the encoding order may be switched only in a horizontal direction, but in some embodiments, the encoding order may be switched in a vertical direction. When the decoding order may be switched in a vertical direction, whether to switch the decoding order may also be determined according to the encoding order flag in the case of the block 2111.

The decoding order determiner 1620 may determine encoding order change allowance information with respect to an upper data unit of the current block. The encoding order change allowance information indicates whether a change of the encoding order is allowed for blocks included in the upper data unit of the current block. When the encoding order change allowance information does not allow the change of the encoding order, all blocks of the upper data unit are decoded according to the basic encoding order. When the encoding order change allowance information indicates that the encoding order information of the current block is encoded, the decoding order determiner 1620 may obtain the encoding order information.

The encoding order change allowance information may be included in a sequence header, a slice header, or the like. When there are two or more types of encoding order information, encoding order change allowance information for each encoding order information may be split and stored in different headers.

The encoding order change allowance information may indicate a depth or a block size at which encoding order information is provided. For example, the decoding order determiner 1620 may obtain the encoding order information only when a depth of the current block is included in depths indicated by the encoding order change allowance information. As another example, the decoding order determiner 1620 may obtain the encoding order information only when the a block size of the current block is a block size indicated by the encoding order change allowance information.

When split information does not indicate to split the current block, the decoder 1630 may determine a prediction method of the current block based on encoding information of the current block and whether adjacent blocks of the current block are decoded.

The encoding information of the current block may indicate how the current block is predicted. In detail, the encoding information may indicate one of a plurality of intra prediction modes and a plurality of inter prediction modes. The intra prediction modes that may be applied to the current block may include a directional mode, a DC mode, a planar mode, a multi-parameter intra prediction (MPI) mode, a linear-model (LM) chroma mode, a most probable chroma (MPC) mode, etc. The inter prediction modes that may be applied to the current block may include a merge mode, an advanced motion vector prediction (AMVP) mode, an inter skip mode, an overlapped block motion compensation (OBMC) mode, a sub-block motion vector prediction (MVP) mode, an affine motion compensation (MC) mode, a frame rate up conversion (FRUC) mode, etc. Therefore, the decoder 1630 may determine a prediction mode to be applied to the current block based on the encoding information of the current block.

A reference block and a reference sample referred to for prediction of the current block may be determined according to whether adjacent blocks of the current block are decoded. According to the raster scan described with reference to FIGS. 17A through 17C, only left, upper, upper-left, upper-right, and lower-left blocks of the current block may be decoded prior to the current block. However, when an encoding tree block to which the current block belongs is encoded by the decoding order determiner 1620 based on an encoding order different from that of the raster scan, a right block and a lower-right block of the current block may be decoded prior to the current block. Therefore, the decoder 1630 may determine the reference block and the reference sample referred to for the prediction of the current block according to whether the left, upper, upper-left, upper-right, lower-left, right, and lower-right blocks of the current block are decoded.

When the current block is intra predicted, the decoder 1630 may determine reference samples to be referenced by the current block, according to whether the adjacent blocks of the current block are decoded. In the intra prediction mode, prediction values of samples of a current block are determined with reference to sample values of samples adjacent to the current block. Therefore, only adjacent blocks, which have been decoded prior to the current blocks and may be referenced by the current block, from among the adjacent blocks of the current block, may be used for prediction of the current block.

For example, when the blocks are encoded according to a forward direction of the raster scan described with reference to FIGS. 17A to 17C, reference samples of the upper, left, upper-left, lower-left, and upper-right blocks of the current block may be used for prediction of a current sample. Conversely, when the blocks are encoded according to a reverse direction of the raster scan, the reference samples of the upper, right, upper-right, lower-right, and upper-left blocks of the current block may be used for prediction of the current sample.

The decoder 1630 may predict the current block based on the prediction mode and may decode the current block based on a result of the prediction of the current block.

When the split information does not indicate to split the current block, the decoder 1630 may obtain, from a bitstream, a final block flag indicating whether the current block is the last block of an encoding tree block including the current block.

The decoder 1630 may entropy decode a syntax element obtained from the bitstream according to a context of the adjacent block. For example, a skip flag indicating whether the current block is encoded in the skip mode may be entropy encoded according to contexts of adjacent blocks of the current block. Therefore, the skip flag may be entropy encoded considering a context of whether the right block of the current block is decoded. Accordingly, a syntax element that is entropy encoded according to the contexts of the adjacent blocks of the current block as in the skip flag may be entropy encoded considering whether the right block of the current block is decoded.

Therefore, the decoder 1630 may entropy decode the syntax elements that are entropy encoded according to the contexts of the adjacent blocks of the current block, considering whether the right block of the current block is decoded. Other syntax elements not described herein may likewise be entropy decoded based on the right block of the current block.

The decoder 1630 may inversely quantize and inversely transform residual data obtained from the bitstream. The decoder 1630 may reconstruct the current block by using the inversely quantized and inversely transformed residual data and the result of the prediction of the current block.

In FIGS. 22 to 29B, various embodiments of a prediction method, an entropy decoding method, and an in-loop filtering method according to an encoding order of a current block performed by the decoder 1630 and whether an adjacent block of the current block is reconstructed will be described.

Figure 22:
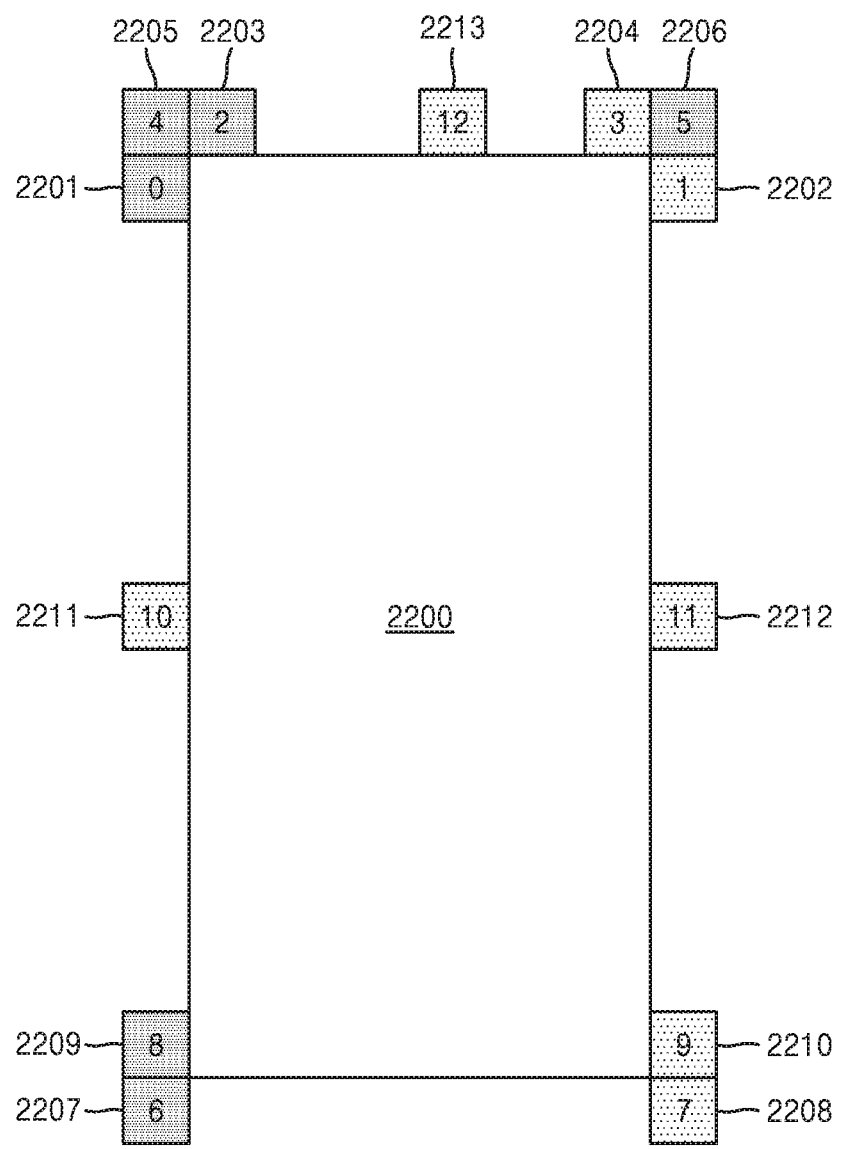
FIG. 22 illustrates a method of generating a motion vector predictor candidate list in inter prediction and a method of generating a most probable mode (MPM) list in intra prediction.

FIG. 22 illustrates a method of generating a motion vector predictor candidate list in inter prediction and a method of generating a most probable mode (MPM) list in intra prediction.

In the inter prediction, a motion vector indicating a spatial displacement between the current block and the reference block is required. Accordingly, the decoder 1630 may obtain a motion vector applied to an adjacent block by scanning the adjacent blocks. The decoder 1630 obtains a motion vector predictor candidate list including motion vector predictor candidates determined based on the motion vector applied to the adjacent block. When switching of the decoding order is allowed, the right block of the current block may be first reconstructed, and thus, the decoder 1630 may construct a motion vector predictor candidate list by scanning the right block of the current block. The following embodiment will be described considering whether the right block of the current block is reconstructed.

According to an embodiment, a motion vector predictor candidate list may be constructed by scanning the adjacent blocks of the current block according to a distance of a reference location from the center of the current block. For example, an adjacent block corresponding to a reference location of 10 2211, which is the closest to the center of the current block 2200, and an adjacent block corresponding to a reference location of 11 2212 may be first scanned. In addition, an adjacent block corresponding to a reference location of 12 2213, which is second closest to the center of the current block 2200, may be scanned. Until the motion vector predictor candidate list is completed, adjacent blocks may be scanned in the order in which the reference location is close to the center of the current block 2200.

According to an embodiment, all the adjacent blocks of the current block are scanned, and the motion vector predictor candidate list may be constructed according to a result of the scanning.

According to an embodiment, the motion vector predictor candidate list may be constructed by scanning the adjacent blocks of the current block 2200 until the motion vector predictor candidate list is completed in the order of serial numbers assigned to the reference locations. For example, the motion vector predictor candidate list may be constructed by scanning the adjacent blocks in order from a reference location of 0 2201 to the reference location of 12 2213.

According to an embodiment, a scan order of the adjacent blocks may be determined according to whether the adjacent blocks are reconstructed based on the decoding order. For example, when neither a right block or a left block of the current block 2200 is reconstructed, the adjacent blocks may be scanned in the order of a reference location of 2 2203, a reference location of 3 2204, a reference location of 4 2205, a reference location of 5 2206, and the reference location of 12 2213. In addition, when only the left block of the current block 2200 is reconstructed according to the decoding order, the adjacent blocks may be scanned in the order of the reference location of 0 2201, the reference location of 2 2203, the reference location of 5 2206, a reference location of 6 2207, a reference location of 8 2209, the reference location of 4 2205, and the reference location of 10 2211. When only the right block of the current block 2200 is reconstructed according to the decoding order, the adjacent blocks may be scanned in the order of a reference location of 1 2202, the reference location of 3 2204, the reference location of 4 2205, a reference location of 7 2208, a reference location of 9 2210, the reference location of 5 2206, and the reference location of 12 2213. When both the left and right blocks of the current block 2200 are reconstructed according to the decoding order, the adjacent blocks may be scanned in the order of the reference location of 0 2201, the reference location of 1 2202, the reference location of 2 2203, the reference location of 3 2204, the reference location of 4 2205, the reference location of 5 2206, the reference location of 6 2207 or the reference location of 8 2209, and the reference location of 7 2208 or the reference location of 9 2210. By scanning adjacent blocks according to the scan order, motion vectors of the adjacent blocks may be obtained, and a motion vector predictor candidate list may be constructed according to the motion vectors of the adjacent blocks.

According to an embodiment, an adjacent block corresponding to a specific reference location based on a shape of the current block may not be scanned. When the width of the current block is greater than the height thereof, the reference location of 12 2213 is scanned, but the reference location of 10 2211 and the reference location 2212 of 11 are not scanned. Conversely, when the height of the current block is greater than the width thereof, the reference location of 10 2211 and the reference location of 11 2212 are scanned, but the reference location of 12 2213 is not scanned. For example, because the height of the current block 2200 is greater than the width thereof, the reference location of 10

2211 and the reference location of 11 2212 may be scanned, whereas the reference location of 12 2213 may not be scanned.

A size of the motion vector predictor candidate list may be determined according to whether the adjacent blocks are reconstructed. For example, the number of adjacent blocks reconstructed by inter prediction with respect to all reference locations around the current block 2200 may be determined, and the size of the motion vector predictor candidate list may be determined according to the number of inter predicted adjacent blocks. In the intra prediction, in order to reduce the size of intra prediction mode information indicating the intra prediction mode of the current block, the decoder 1630 may determine, as an MPM list, candidate intra prediction modes highly likely to be selected as an intra prediction mode of the current block. The decoder 1630 may obtain an intra mode of the adjacent block by scanning the adjacent block. The decoder 1630 may determine the candidate intra prediction modes included in the MPM list from the intra prediction mode of the adjacent block of the current block. Accordingly, the decoder 1630 may determine the MPM list by scanning the adjacent blocks of the current block according to a predetermined scan order.

According to an embodiment, the MPM list may be constructed by scanning the adjacent blocks of the current block according to the distance of the reference location from the center of the current block. For example, the adjacent block corresponding to the reference location of 10 2211, which is the closest to the center of the current block 2200, and the adjacent block corresponding to the reference location of 11 2212 may be first scanned. In addition, the adjacent block corresponding to the reference location of 12 2213, which is second closest to the center of the current block 2200, may be scanned. Until the motion vector predictor candidate list is completed, the adjacent blocks may be scanned in the order in which the reference location is close to the center of the current block 2200.

According to an embodiment, all the adjacent blocks of the current block are scanned, and the MPM list may be constructed according to a result of the scanning.

According to an embodiment, the MPM list may be constructed by scanning the adjacent blocks of the current block 2200 until the MPM list is completed in the order of the serial numbers assigned to the reference locations. For example, when there are two candidate intra prediction modes included in the MPM list, the adjacent blocks may be scanned in the order of the reference location of 0 2201, the reference location of 1 2202, the reference location of 2 2203, and the reference location of 3 2204. When there are three or more candidate intra prediction modes included in the MPM list, the MPM list may be constructed by scanning the adjacent blocks in order from the reference location of 0 2201 to the reference location of 12 2213.

According to an embodiment, when a left adjacent block or an upper adjacent block is not reconstructed or is reconstructed through inter prediction, an intra prediction mode obtained from a right adjacent block may be assumed to be an intra prediction mode of the left adjacent block or the upper adjacent block.

According to an embodiment, the scan order of the adjacent blocks may be determined according to whether the adjacent blocks are reconstructed based on the decoding order. For example, when neither a right block or a left block of the current block 2200 is reconstructed according to the decoding order, the adjacent blocks may be scanned in the order of the reference location of 2 2203, the reference location of 3 2204, the reference location of 4 2205, the reference location of 5 2206, and the reference location of 12 2213. In addition, when only the left block of the current block 2200 is reconstructed according to the decoding order, the adjacent blocks may be scanned in the order of the reference location of 0 2201, the reference location of 2 2203, the reference location of 5 2206, the reference location of 6 2207, the reference location of 8 2209, the reference location of 4 2205, and the reference location of 10 2211. When only the right block of the current block 2200 is reconstructed according to the decoding order, the adjacent blocks may be scanned in the order of the reference location of 1 2202, the reference location of 3 2204, the reference location of 4 2205, the reference location of 7 2208, the reference location of 9 2210, the reference location of 5 2206, and the reference location of 12 2213. When both the left and right blocks of the current block 2200 are reconstructed according to the decoding order, the adjacent blocks may be scanned in the order of the reference location of 0 2201, the reference location of 1 2202, the reference location of 2 2203, the reference location of 3 2204, the reference location of 4 2205, the reference location of 5 2206, the reference location of 6 2207 or the reference location of 8 2209, and the reference location of 7 2208 or the reference location of 9 2210. By scanning adjacent blocks according to the scan order, intra prediction modes of the adjacent blocks may be obtained, and an MPM list may be constructed according to the intra prediction modes of the adjacent blocks.

According to an embodiment, an adjacent block corresponding to a specific reference location based on the shape of the current block may not be scanned. When the width of the current block is greater than the height thereof, the reference location of 12 2213 is scanned, but the reference location of 10 2211 and the reference location of 11 2212 are not scanned. Conversely, when the height of the current block is greater than the width thereof, the reference location of 10 2211 and the reference location of 11 2212 are scanned, but the reference location of 12 2213 is not scanned. For example, because the height of the current block 2200 is greater than the width thereof, the reference location of 10 2211 and the reference location of 11 2212 may be scanned, whereas the reference location of 12 2213 may not be scanned.

A size of the MPM list may be determined according to whether the adjacent blocks are reconstructed. For example, the number of adjacent blocks reconstructed by the intra prediction with respect to all reference locations around the current block 2200 may be determined, and the size of the MPM list may be determined according to the number of adjacent blocks reconstructed by the intra prediction.

FIG. 23 illustrates a range of an intra prediction direction according to an adjacent block is reconstructed.

A first embodiment 2310 shows a range of an intra prediction direction when a left block and an upper block of a current block 2312 are reconstructed. In the first embodiment 2310, a left adjacent sample, an upper adjacent sample, a lower-left adjacent sample, and a upper-right adjacent sample of the current block 2312 are used as reference samples of the current block 2312. Therefore, a first intra prediction direction range 2350 is determined such that an angle difference between the intra prediction direction and an upper-left direction is 90 degrees or less.

A second embodiment 2320 shows a range of an intra prediction direction when a right block and an upper block of the current block 2322 are reconstructed. In the second embodiment 2320, a right adjacent sample, an upper adjacent sample, a lower-right adjacent sample, and an upper-left adjacent sample of the current block 2322 are used as reference samples of the current block 2322. Therefore, a second intra prediction direction range 2360 is determined such that an angle difference between the intra prediction direction and an upper-right direction is 90 degrees or less.

A third embodiment 2330 shows a range of an intra prediction direction when a left block, a right block, and an upper block of a current block 2332 are reconstructed. In the third embodiment 2330, a left adjacent sample, a right adjacent sample, and an upper adjacent sample of the current block 2332 may be used as reference samples of the current block 2332. Therefore, a third intra prediction direction range 2370 may be determined such that an angle difference between the intra prediction direction and an upper direction is 90 degrees or less. Further, because a lower-left adjacent sample and a lower-right adjacent sample of the current block 2332 may be used as reference samples of the current block 2332, an extended intra prediction direction range 2380 in which the angle difference between the intra prediction direction and the upper direction is 135 degrees or less may be applied to the prediction of the current block 2332.

A fourth embodiment 2340 shows a range of an intra prediction direction when only an upper block of a current block 2342 is reconstructed. In the fourth embodiment 2340, an upper adjacent sample, an upper-left adjacent sample, and a upper-right adjacent sample of the current block 2342 may be used as reference samples of the current block 2342. Therefore, a reduced intra prediction direction range 2390 in which the angle difference between the intra prediction direction and the upper direction is 45 degrees or less may be applied to the prediction of the current block 2342. However, when a left adjacent sample and a right adjacent sample of the current block 2342 are padded, the third intra prediction direction range 2370 in which the angle difference between the intra prediction direction and the upper direction is 90 degrees or less may be applied to the prediction of the current block 2342.

According to an embodiment, about 1.5 times more intra prediction modes than the first to third intra prediction direction ranges 2350, 2360, and 2370 may be assigned to the extended intra prediction direction range 2380. When an additional intra prediction mode is defined, there is a disadvantage in that a size of intra prediction mode information indicating the intra prediction mode increases.

According to an embodiment, the same number of intra prediction modes as the first to third intra prediction direction ranges 2350, 2360, and 2370 may be assigned to the extended intra prediction direction range 2380. Intra prediction modes having a difference of 45 degrees or less from a horizontal mode may be set to refer to one of a left reference sample and a right reference sample, or to refer to both the left and right reference samples. Therefore, the current block may be predicted with reference to the right reference sample according to an existing intra prediction mode without increasing the number of intra prediction modes.

According to an embodiment, a range of an intra prediction direction that may be used for the current block may be limited considering the decoding order. For example, when the decoding order of the current block is a right direction, the third intra prediction direction range 2370 may be limited to include a left intra prediction direction. Conversely, when the decoding order of the current block is a left direction, the third intra prediction direction range 2370 may be limited to include a right intra prediction direction.

FIG. 24 illustrates a method of determining a reference sample to be referenced by a current sample according to whether an adjacent block is reconstructed and an intra prediction direction. In particular, an intra prediction method when referring to a right reference sample according to an existing intra prediction mode without increasing the number of intra prediction modes will be described.

In a first embodiment 2400, a reference sample determination method in a case where a left block and an upper block of a current block are reconstructed will be described. The decoder 1630 may determine a reference sample p 2402 as a reference sample of a current sample 2401 based on an intra prediction direction of the current block.

However, in a second embodiment 2410, a right block instead of the left block of the current block is reconstructed, and thus, the decoder 1630 may not determine a reference sample p 2412 as a reference sample of a current sample 2411. Therefore, the decoder 1630 may determine a reference sample q 2413 as a reference sample of the current sample 2411 based on a direction opposite to the intra prediction direction.

In a third embodiment 2420, both the left and right blocks of the current block are reconstructed, and thus, the decoder 1630 may predict a current sample 2421 by using both a reference sample p 2422 in the intra prediction direction and a reference sample q 2423 in the direction opposite to the intra prediction direction. Alternatively, the decoder 1630 may predict the current sample 2421 by using one of the reference sample p 2422 and the reference sample q 2423.

Figure 25A:
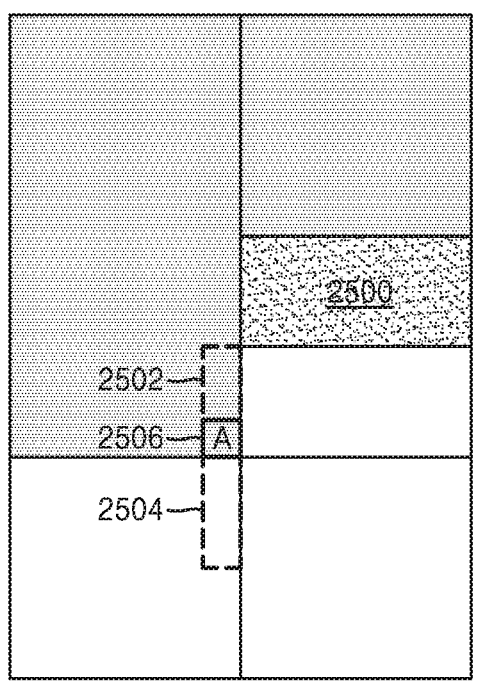
FIGS. 25A through 25C illustrate a padding method of reference samples to be used for intra prediction.
Figure 25B:
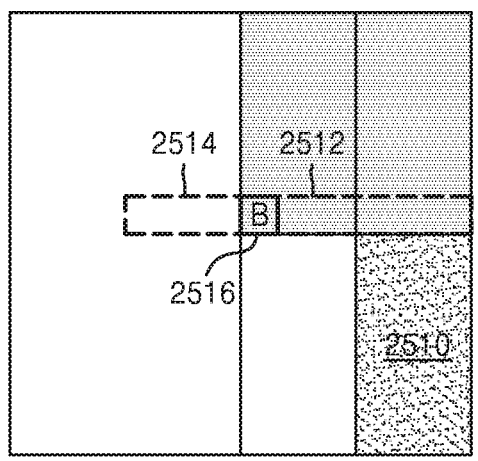
Figure 25C:
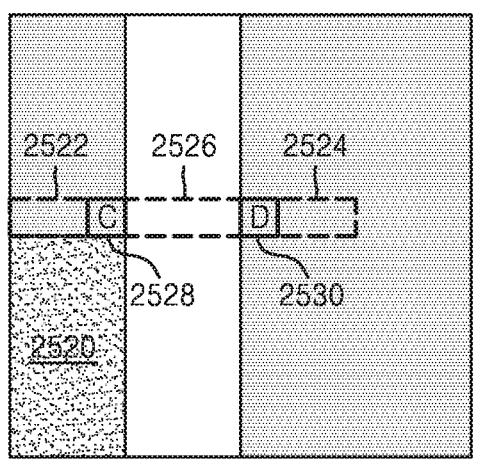

FIGS. 25A through 25C illustrate a padding method of reference samples to be used for intra prediction. For intra prediction, adjacent samples of a current block having a high probability, which are most similar to samples of the current block, are used as reference samples. The decoder 1630 determines a range of a reference sample according to an encoding order of the current block. For example, according to a forward encoding order, a left adjacent sample, an upper adjacent sample, a lower-left adjacent sample, and an upper-right adjacent sample of the current block are determined as reference samples. In this case, a range of the lower-left adjacent sample is determined to be the same as a width of the current block. Also, a range of the upper-right adjacent sample is determined to be the same as a height of the current block.

According to a reverse encoding order, right adjacent samples, upper adjacent samples, lower-right adjacent samples, and upper-left adjacent samples of the current block are determined as reference samples. In this case, a range of the lower-right adjacent sample is determined to be the same as the width of the current block. Also, a range of the upper-left adjacent sample is determined to be the same as the height of the current block.

Some of the adjacent blocks of the current block may be decoded later than the current block. Therefore, when the reference sample is not reconstructed yet, the decoder 1630 may need to pad an unreconstructed sample by using a reference sample that has already been reconstructed.

For example, in FIG. 25A, when a current block 2500 is decoded in a forward decoding order, the decoder 1630 obtains reference samples from an adjacent reconstructed region 2502 that is located at left and lower-left sides of the current block 2500 and is decoded prior to the current block 2500. In addition, because a reference sample may not be obtained from an adjacent non-reconstructed region 2504 that is located at the lower-left side of the current block 2500 and is decoded after the current block 2500, the decoder 1630 pads reference samples of the adjacent non-reconstructed region 2504 by using the reference sample of the adjacent reconstructed region 2502. For example, the reference sample of the adjacent non-reconstructed region 2504 may be padded by using a reference sample A 2506 at a location closest to the adjacent non-reconstructed region 2504 in the adjacent reconstructed region 2502.

In FIG. 25B, when a current block 2510 is decoded in a reverse decoding order, the decoder 1630 obtains reference samples from an adjacent reconstructed region 2512 that is located at upper and upper-left sides of the current block 2500 and is decoded prior to the current block 2510. In addition, because a reference sample may not be obtained from an adjacent non-reconstructed region 2514 that is located at the upper-left side of the current block 2500 and is decoded after the current block 2510, the decoder 1630 pads reference samples of the adjacent non-reconstructed region 2514 by using the reference sample of the adjacent reconstructed region 2512. For example, the decoder 1630 may pad the reference sample of the adjacent non-reconstructed region 2514 by using a reference sample B 2516 at a location closest to the adjacent non-reconstructed region 2514 in the adjacent reconstructed region 2512.

In FIG. 25C, when a current block 2520 is decoded in a forward decoding order, the decoder 1630 obtains a reference sample from a first adjacent reconstructed region 2522 that is located at an upper side of the current block 2520 and is decoded prior to the current block 2520. The decoder 1630 obtains a reference sample from a second adjacent reconstructed region 2524 that is located at an upper-left side of the current block 2520 and is decoded prior to the current block 2520. In FIG. 25C, an adjacent non-reconstructed region 2526 is located between the first adjacent reconstructed region 2522 and the second adjacent reconstructed region 2524.

Accordingly, the decoder 1630 may pad reference samples of the adjacent non-reconstructed region 2526 by linearly interpolating a reference sample C 2528 at a location closest to the adjacent non-reconstructed region 2526 in the first adjacent reconstructed region 2522 and a reference sample D 2530 at a location closest to the adjacent non-reconstructed region 2526 in the second adjacent reconstructed region 2524.

Alternatively, the decoder 1630 may pad the reference samples of the adjacent non-reconstructed region 2526 by using an average value of the reference sample C 2528 and the reference sample D 2530. According to another embodiment, the decoder 1630 may pad the reference samples of the adjacent non-reconstructed region 2526 with one value of the reference sample C 2528 and the reference sample D 2530.

Figure 26:
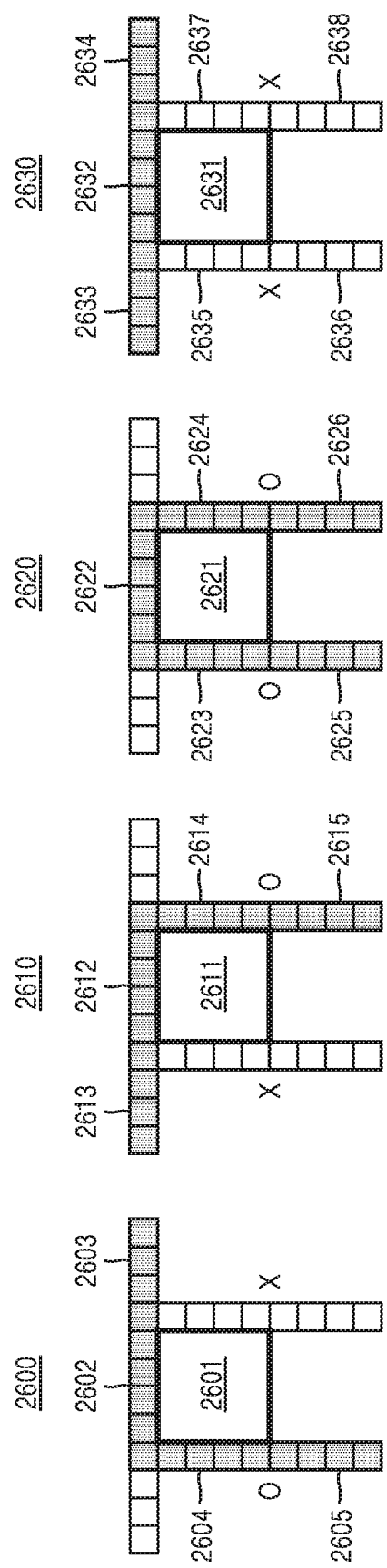
FIG. 26 illustrates an intra prediction method according to whether an adjacent block is reconstructed.

FIG. 26 illustrates an intra prediction method according to whether an adjacent block is reconstructed.

A first embodiment 2600 shows an intra prediction method when an upper block and a left block of a current block 2601 are reconstructed prior to the current block 2601 according to the decoding order. In the first embodiment 2600, upper reference samples 2602, upper-right reference samples 2603, left reference samples 2604, and lower-left reference samples 2605 may be used for intra prediction. The first embodiment 2600 occurs in a conventional video decoding method in which a decoding order is not switched, and the current block 2601 is predicted according to a conventional intra prediction method.

A second embodiment 2610 shows an intra prediction method when an upper block and a right block of a current block 2611 are reconstructed prior to the current block 2611 according to the decoding order. In the second embodiment 2610, upper reference samples 2612, upper-left reference samples 2613, right reference samples 2614, and lower-right reference samples 2615 may be used for intra prediction. Because the second embodiment 2610 is horizontally symmetrical to the first embodiment 2600, an intra prediction method according to the second embodiment 2610 is horizontally symmetrical to an intra prediction method according to the first embodiment 2600. For example, when the horizontal mode is applied to the current block, the left reference samples 2604 are referred to in the first embodiment 2600, whereas the right reference samples 2614 are referred to in the second embodiment 2610. Equally, the intra prediction method according to another directional intra mode and a planar mode of the second embodiment 2610 may also be horizontally symmetrical to the intra prediction method according to another directional intra mode and a planar mode of the first embodiment 2600.

A third embodiment 2620 shows an intra prediction method when an upper block, a left block, and a right block of a current block 2621 are reconstructed prior to the current block 2621 according to the decoding order. In the third embodiment 2620, upper reference samples 2622, left reference samples 2623, right reference samples 2624, lower-left reference samples 2625, and lower-right reference samples 2626 may be used for intra prediction. In the third embodiment 2620, the left reference samples 2623 and the right reference samples 2624 may be used together in the prediction of the current block 2621. For example, when the horizontal mode is applied to the current block 2621, the decoder 1630 may predict the current block 2621 by using an average or a weighted average of a first reference value obtained from left reference samples 2623 and a second reference value obtained from right reference samples 2624.

According to another embodiment, the decoder 1630 may predict the current block 2621 of the third embodiment 2620 by using an average value of a first intermediate prediction value according to the intra prediction method of the first embodiment 2600 and a second intermediate prediction value according to the intra prediction method of the second embodiment 2610. For example, when the horizontal mode is applied to the current block 2621, the decoder 1630 may obtain a final prediction value of the current block 2621 according to the third embodiment 2620 based on the first intermediate prediction value obtained from the left reference samples 2604 according to the intra prediction method of the first embodiment 2600 and the second intermediate prediction value obtained from the right reference samples 2614 according to the intra prediction method of the second embodiment 2610.

According to another embodiment, the decoder 1630 may predict the current block 2621 of the third embodiment 2620 by using one of a first prediction value according to the intra prediction method of the first embodiment 2600 and a second prediction value according to the intra prediction method of the second embodiment 2610. For example, when the horizontal mode is applied to the current block 2621, the decoder 1630 may obtain the final prediction value of the current block 2621 according to the third embodiment 2620 by using one selected from among the first prediction value obtained from the left reference samples 2604 according to the intra prediction method of the first embodiment 2600 and the second prediction value obtained from the right reference samples 2614 according to the intra prediction method of the second embodiment 2610.

A fourth embodiment 2630 shows an intra prediction method when only an upper block, an upper-left block, and an upper-right block are reconstructed prior to the current block 2631. In the fourth embodiment 2630, upper reference samples 2632, upper-left reference samples 2633, and upper-right reference samples 2634 may be used for intra prediction. Therefore, the intra prediction method, in which left reference samples 2635, lower-left reference samples 2636, right reference samples 2637, and lower-right reference samples 2638 are necessarily used, may not be used in the fourth embodiment 2630. For example, the horizontal mode uses left reference samples or right reference samples and thus may not be used in the fourth embodiment 2630.

In the fourth embodiment 2630, the upper reference samples 2632 are the only reference samples that are adjacent to a current block 2631 according to the decoding order. Also, the upper-left reference samples 2633 and the upper-right reference samples 2634 are spatially separated from the current block 2631, and thus, the prediction accuracy of the fourth embodiment 2630 may be lower than those of other embodiments 2600, 2610, and 2620. Therefore, the intra prediction method used in the fourth embodiment 2630 is preferably a vertical mode using the upper reference sample 2632 adjacent to the current block 2631 or a directional prediction mode adjacent to the vertical mode.

However, when the left reference samples 2635, the lower-left reference samples 2636, the right reference samples 2637, and the lower-right reference samples 2638 are padded based on the upper reference samples 2632, the upper-left reference samples 2633, and the upper-right reference samples 2634, the decoder 1630 may predict the current block 2631 of the fourth embodiment 2630 according to the intra prediction method of the third embodiment 2620.

Figure 27:
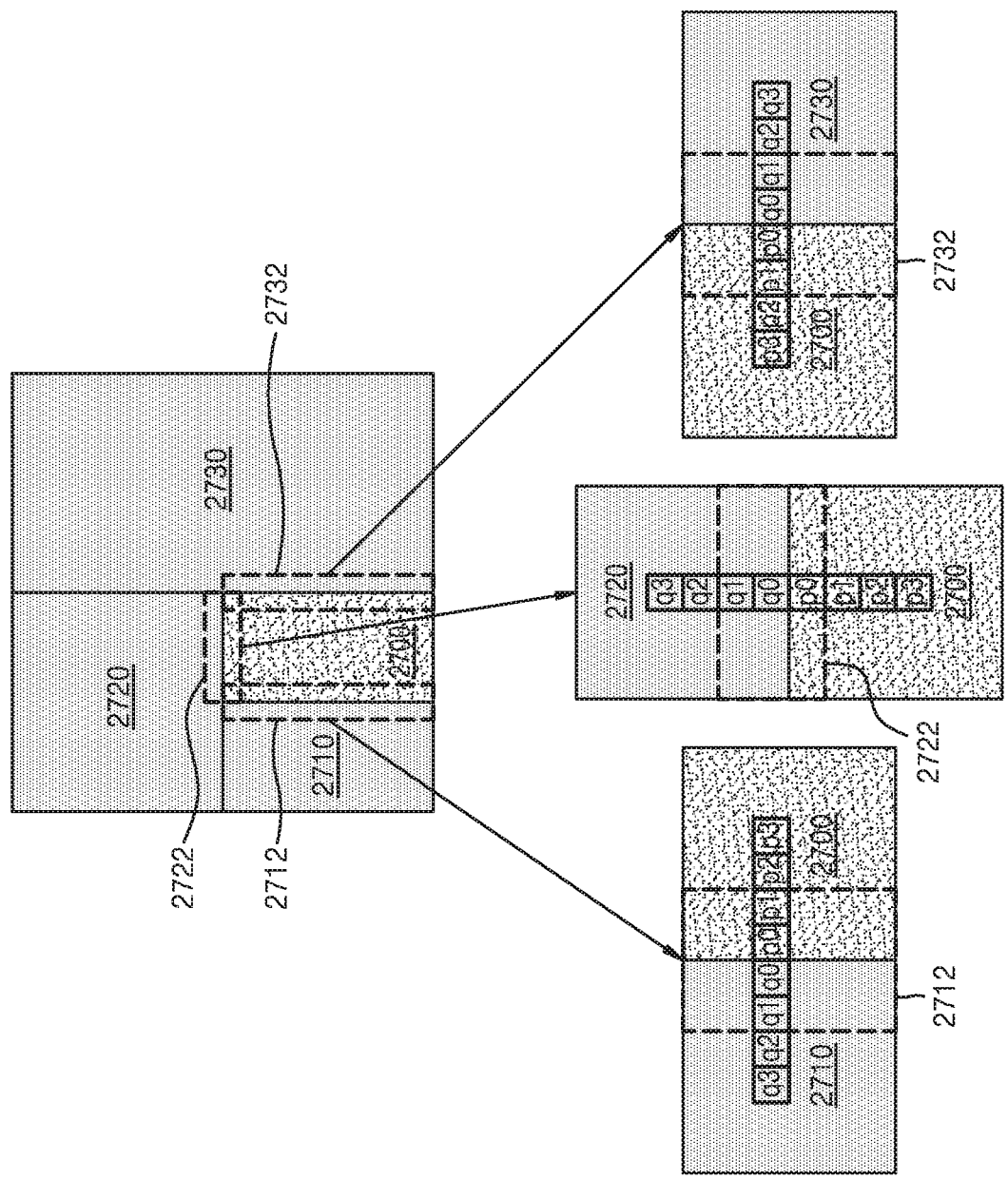
FIG. 27 illustrates a deblocking filtering method according to whether an adjacent block is reconstructed.

FIG. 27 illustrates a deblocking filtering method according to whether an adjacent block is reconstructed. When an image is encoded in block units according to transformation and quantization, discontinuity occurs between samples at a block boundary of a decoded image. A degradation due to discontinuity between the samples at the block boundary is referred to as a blocking artifact. As an intensity of quantization increases, a loss of image data increases, and thus, blocking artifact also increases. Accordingly, a deblocking filter is used to reduce discontinuity of the samples at the block boundary.

When a left block 2710 and an upper block 2720 of a current block 2700 are decoded prior to the current block 2700 according to the decoding order, adjacent samples 2712 located at a boundary between the current block 2700 and the left block 2710 and adjacent samples 2722 located at a boundary between the current block 2700 and the upper block 2720 are deblocking filtered. However, when a right block 2730 of the current block 2700 is decoded prior to the current block 2700 due to switching of the encoding order, adjacent samples 2732 located at a boundary between the current block 2700 and the right block 2730 may also be deblocking filtered.

Figure 28A:
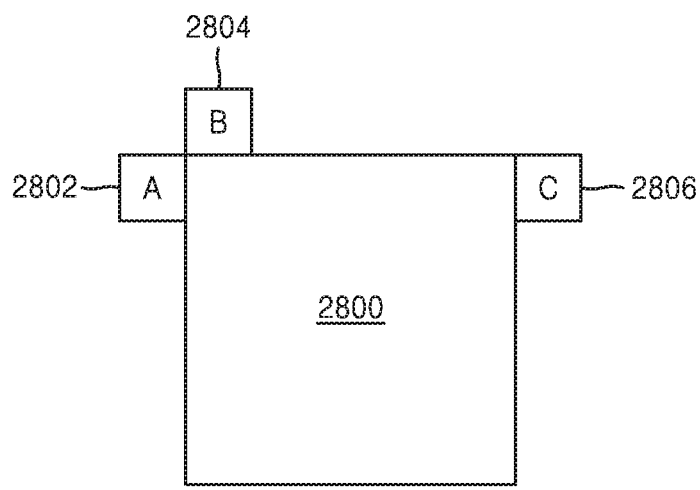
FIGS. 28A and 28B illustrate a method of determining context information for entropy decoding of prediction mode information according to whether an adjacent block is reconstructed.
Figure 28B:
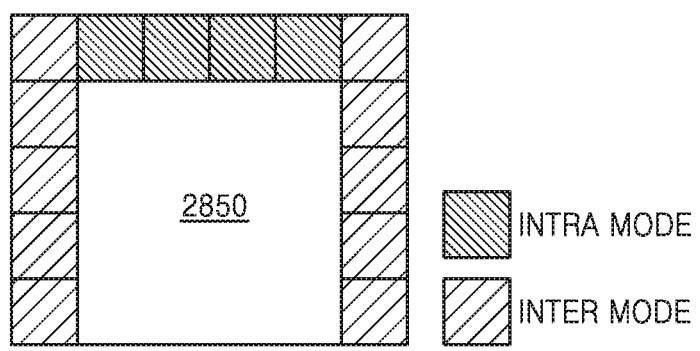

FIGS. 28A and 28B illustrate a method of determining context information for entropy decoding of prediction mode information according to whether an adjacent block is reconstructed. Only intra prediction is applied to blocks of an I slice. However, one of intra prediction and inter prediction may be applied to blocks of a P slice and a B slice. Therefore, when a coding unit is included in the P slice or the B slice, prediction mode information indicating one of an intra prediction mode and an inter prediction mode applied to the coding unit is decoded.

Prediction mode information of a current block 2800 may be entropy decoded according to a context of adjacent blocks. FIG. 28A illustrates locations of adjacent blocks of the current block 2800 for determining a context of the prediction mode information. When the encoding order is not switched, the context of the prediction mode information is determined depending on a prediction mode of a block at a location A 2802 and a prediction mode of a block at a location B 2804. For example, a first context may be used when the intra mode is applied to both the block at the location A 2802 and the block at the location B 2804. Further, a second context may be used when the intra mode is applied to only one of the block at the location A 2802 and the block at the location B 2804. Also, the second context may be used when the inter mode is applied to both the block at the location A 2802 and the block at the location B 2804.

When the encoding order is switchable, the context of the prediction mode information is determined depending on the prediction mode of the block at the location A 2802, the prediction mode of the block at the location B 2804, and a prediction mode of a block at a location C 2806. A method for determining the context of the prediction mode information from three adjacent blocks is described in Equation 1.

$$\text{num\_intra} = \text{isIntra}(L) + \text{isIntra}(A) + \text{isIntra}(R)$$

$$\text{Ctx\_idx} = \min(\text{num\_intra}, T) \quad \text{[Equation 1]}$$

In Equation 1, isIntra(L) denotes whether the prediction mode of the block at the location A 2802 is the intra mode. Also, isIntra(A) denotes whether the prediction mode of the block at the location B 2804 is the intra mode. Further, isIntra(R) denotes whether the prediction mode of the block at the location C 2806 is the intra mode. Accordingly, num_intra denotes the number of intra modes applied to the blocks at the location A 2802, the location B 2804, and the location C 2806. Therefore, num_intra may have a value of 0 to 3.

Ctx_idx is an index indicating the context of the prediction mode information of the current block. In addition, T denotes a maximum value of Ctx_idx. Ctx_idx is determined as a smaller value of num_intra and T. Accordingly, the number of contexts is determined according to a value of T. For example, when T is 2, Ctx_idx has a value of 0 to 2. Therefore, the context of the prediction mode information of the current block is determined depending on which prediction mode is used to predict a right block of the current block.

FIG. 28B illustrates an embodiment of determining a context of prediction mode information of a current block according to a dominant prediction mode applied to adjacent blocks of the current block. In FIG. 28A, the context of the prediction mode information of the current block is determined according to the prediction modes of the blocks at predetermined locations A, B, and C 2802, 2804, and 2806. However, according to FIG. 28B, the decoder 1630 scans which prediction mode is used for each basic unit having a size of 4×4 around the current block, and compares the number of basic units, in which the intra mode is used, with the number of basic units, in which the inter mode is used, to determine the context of the prediction mode information of the current block.

A method of determining the context of the prediction mode information from the dominant prediction mode applied to the adjacent blocks of the current block is described in Equation 2.

$$\text{Ctx\_idx} = \text{if}(\text{num\_intra} < \text{num\_inter})?0:1; \quad \text{[Equation 2]}$$

In Equation 2, num_intra denotes the number of basic units to which the intra mode is applied from among reconstructed basic units. Also, num_inter denotes the number of basic units to which the inter mode is applied from among the reconstructed basic units. Ctx_idx is an index indicating the context of the prediction mode information of the current block. Ctx_idx is determined as 0 when num_intra is greater than num_inter, and is determined as 1 when num_intra is smaller than num_inter.

For example, prediction modes of 14 basic units having a size of 4×4 on upper, left, and right sides of a current block 2850 having a size of 16×16 are scanned. In FIG. 28B, because the intra mode is applied to 4 basic units and the inter mode is applied to 10 basic units, the dominant prediction mode is determined as the inter mode. Further, Ctx_idx, which is the context of the prediction mode information, is determined as 1.

When the encoding order is not switched, a basic unit on a right side may not be considered in determining the context of the prediction mode information. However, when the encoding order is switched, the basic unit on the right side may be considered in determining the context of the prediction mode information, as shown in FIG. 28B.

Figure 29A:
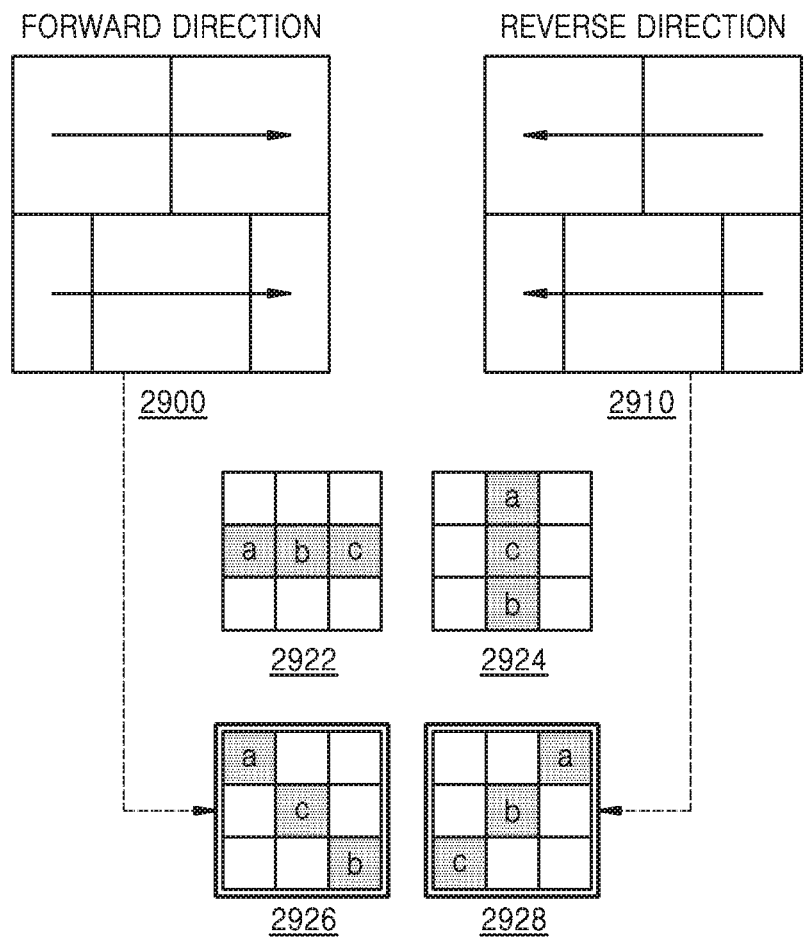
FIGS. 29A and 29B illustrate a method of applying an in-loop filter according to a decoding order.
Figure 29B:
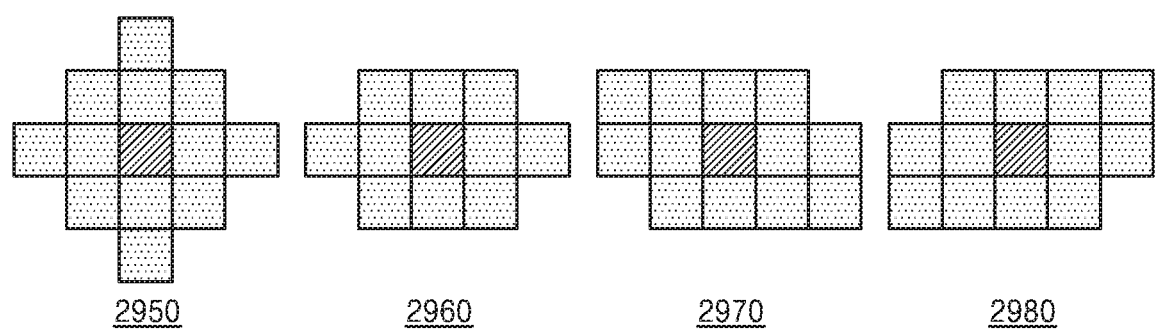

FIGS. 29A and 29B illustrate a method of applying an in-loop filter according to a decoding order.

FIG. 29A illustrates a sample adaptive offset (SAO) type of an SAO filter according to a decoding order. The SAO filter is used to minimize an error between a reconstructed image and an original image by adding an offset adaptively to a sample. The SAO filter is used for a deblocking filtered current picture. The SAO filter is classified into a band type and an edge type. A band-type SAO filter may effectively correct an error of a reconstructed sample by applying an offset to samples in a specific band. An edge-type SAO filter may effectively correct an error of the reconstructed sample according to an edge direction of the current block.

The edge direction applied to the edge-type SAO filter includes a horizontal edge direction 2922, a vertical edge direction 2924, a 135-degree edge direction 2926, and a 45-degree edge direction 2928. An edge direction applied to SAO filtering of the current block is determined according to edge direction information. By assigning a short codeword to an edge direction having a high possibility to be applied and assigning a long codeword to an edge direction having a low possibility to be applied, a coding rate of the edge direction information may be improved. Therefore, the coding rate of the edge direction information may be improved by determining the codeword assigned to each edge direction according to the encoding order.

The horizontal edge direction 2922 and the vertical edge direction 2924 may be applied to the current block regardless of the decoding order. However, in the cases of the 135-degree edge direction 2926 and the 45-degree edge direction 2928, possibilities of being applied to the current block may differ according to the decoding order.

For example, as in a first embodiment 2900, when the decoding order applied to the current block is forward, a possibility that the 135-degree edge direction 2926 is applied is higher than a possibility that the 45-degree edge direction 2928 is applied. Accordingly, by assigning a short codeword to the 135-degree edge direction 2926 and assigning a long codeword to the 45-degree edge direction 2928, the coding rate of the edge direction information may be improved.

Conversely, as shown in a second embodiment 2910, when the decoding order applied to the current block is reverse, the possibility that the 45-degree edge direction 2928 is applied is higher than the possibility that the 135-degree edge direction 2926 is applied. Accordingly, by assigning a short codeword to the 45-degree edge direction 2928 and assigning a long codeword to the 135-degree edge direction 2926, the coding rate of the edge direction information may be improved.

FIG. 29B illustrates a filter shape of an adaptive loop filter according to a decoding order.

The adaptive loop filter is used to minimize an error between an original image and a reconstructed image based on a Wiener filter. A filtered value of the current sample is determined by a weighted average of sample values of reference samples determined according to the filter shape of the adaptive loop filter and a sample value of the current sample. The filter shape of the adaptive loop filter may be determined differently according to the decoding order.

A basic filter shape of the adaptive loop filter may be a diamond shape 2950. However, adaptive loop filtering according to the diamond shape 2950 requires storing five sample lines in a memory of a video decoding device, and thus, there may be a disadvantage of an excessive load on the memory of the video decoding device. Therefore, a cut diamond shape 2960 requiring three sample lines has less burden on the memory the video decoding device as compared with the diamond shape 2950.

However, for efficiency of the adaptive loop filter, a left-oriented cut diamond shape 2970 or a right-oriented cut diamond shape 2980 having the same area of a filter shape region as that of the diamond shape 2950 may be used according to the decoding order of the current block. For example, when the current block is encoded in a forward direction, the left-oriented cut diamond shape 2970 may be used. Conversely, when the current block is encoded in a reverse direction, the right-oriented cut diamond shape 2980 may be used.

Figure 30:
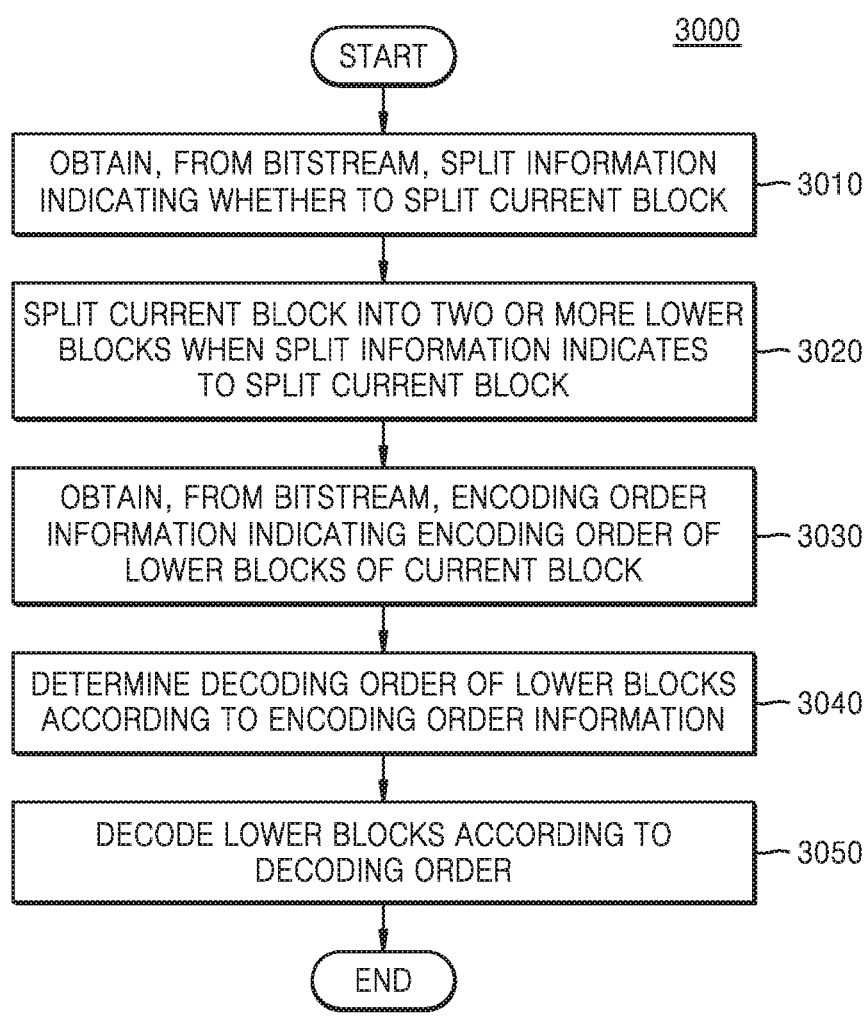
FIG. 30 illustrates a video decoding method regarding splitting of a current block and determination of an encoding order of split lower blocks, according to an embodiment.

FIG. 30 illustrates a video decoding method 3000 regarding splitting of a current block and determination of an encoding order of split lower blocks, according to an embodiment.

In operation 3010, split information indicating whether to split the current block is obtained from a bitstream.

In operation 3020, when the split information indicates to split the current block, the current block is split into two or more lower blocks.

When the split information indicates the split of the current block, split shape information of the current block may be obtained. The current block may be split into two or more lower blocks according to the split shape information. The split shape information indicates one of a vertical binary split, a vertical tri split, a horizontal binary split, a horizontal tri split, and a quad split.

When the split information does not indicate to split the current block, the current block may be reconstructed by a prediction value and a residual value of the current block.

In operation 3030, encoding order information indicating an encoding order of lower blocks of the current block is obtained from the bitstream. Whether to obtain the encoding order information may be determined according to at least one of a size and a split shape of the current block. Further, when the encoding order information is determined to be obtained for the current block, the encoding order information may be obtained.

In operation 3040, a decoding order of the lower blocks is determined according to the encoding order information.

In operation 3050, lower blocks are decoded according to the decoding order.

The lower block may be split according to split information of the lower block. When the lower block is no longer split according to the split information of the lower block, the lower blocks may be reconstructed by a prediction value and a residual value of the lower block.

When inter predicting the lower block, a motion vector list used for inter prediction may be determined according to a distance from a center of the lower block and whether adjacent blocks of the lower block are decoded.

When intra predicting the lower block, an MPM list used for intra prediction may be determined according to the distance from the center of the lower block and whether the adjacent blocks of the lower block are decoded. A range of an intra prediction direction used for intra prediction may be determined according to whether the adjacent blocks of the lower block are decoded.

A reconstructed region reference sample of the lower block may be obtained from an adjacent reconstructed region of the lower block. In addition, one or more reconstructed region reference samples adjacent to an adjacent non-reconstructed region of the lower block may be determined. A non-reconstructed region reference sample may be generated by using the one or more reconstructed region reference samples.

When two reconstructed region reference samples are adjacent to left and right sides of the adjacent non-reconstructed region, non-reconstructed region reference samples may be generated by linearly interpolating the two reconstructed region reference samples.

The intra prediction direction of the lower block may be determined according to the intra prediction mode information. Forward reference samples in the intra prediction direction and reverse reference samples in a direction opposite to the intra prediction direction may be obtained. The lower block may be intra predicted by using the forward reference samples and the reverse reference samples.

In addition, when both a left block and a right block of the lower block are decoded, the lower block may be predicted based on a left reference sample and a right reference sample obtained through the left block and the right block.

Samples located at a boundary of the decoded lower blocks may be deblocking filtered according to whether adjacent samples of the decoded lower block are decoded. Accordingly, samples located at a right boundary of the current block may be deblocking filtered according to an embodiment.

Coding information of the lower block may be entropy decoded according to a context determined based on whether the adjacent blocks of the lower block are decoded. Therefore, the context may be determined according to the right block of the current block.

The decoded lower blocks may be filtered by using the SAO filter determined according to the decoding order.

Functions of the video decoding device 1600 described with reference to FIG. 16 may be included in the video decoding method 3000.

Figure 31:
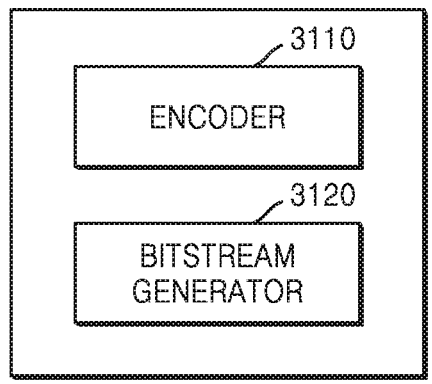
FIG. 31 illustrates a video encoding device according to an embodiment regarding splitting of a current block and determination of an encoding order of split lower blocks.

FIG. 31 illustrates a video encoding device 3100 according to an embodiment regarding splitting of a current block and determination of an encoding order of split lower blocks.

The video encoding device 3100 includes an encoder 3110 and a bitstream generator 3120. In FIG. 31, the encoder 3110 and the bitstream generator 3120 are illustrated as separate constituent units, but according to an embodiment, the encoder 3110 and the bitstream generator 3120 may be combined and implemented as one constituent unit.

In FIG. 31, the encoder 3110 and the bitstream generator 3120 are illustrated as being included in a single device, but devices that perform respective functions of the encoder 3110 and the bitstream generator 3120 may not necessarily be physically adjacent to each other. Therefore, the encoder 3110 and the bitstream generator 3120 may be distributed according to an embodiment.

The encoder 3110 and the bitstream generator 3120 may be implemented by one processor according to an embodiment. In addition, the encoder 3110 and the bitstream generator 3120 may be implemented by a plurality of processors according to an embodiment.

Functions performed by the encoder 3110 and the bitstream generator 3120 of FIG. 31 may be performed by the bitstream generator 120 of FIG. 1A.

The encoder 3110 may split the current block into at least two lower blocks, and may determine whether to split the current block based on a result of splitting the current block. For example, the encoder 3110 may determine to split the current block in a case that the coding efficiency is good when splitting the current block, and may determine not to split the current block in a case that the coding efficiency is good when not splitting the current block.

The encoder 3110 may generate split information indicating whether to split the current block. The encoder 3110 may determine a splitting method of the current block based on the coding efficiency, and may generate split shape information indicating the splitting method of the current block.

The encoder 3110 may determine an encoding order of the lower blocks included in the current block, and generate encoding order information indicating the encoding order of the lower blocks, according to coding efficiency based on the encoding order. The encoder 3110 may improve coding efficiency of an image by comparing coding efficiency when the current coding unit is encoded in a forward direction with coding efficiency when the current coding unit is encoded in a reverse direction to determine an encoding order.

When the splitting of the lower block is completed, the encoder 3110 may determine a prediction mode of the lower block. The encoder 3110 may determine the prediction mode of the lower block according to coding efficiencies of prediction modes that may be applied to the lower block. Prediction modes that may be applied to the lower block include a directional mode, a DC mode, a planar mode, an MPI mode, an LM chroma mode, an MPC mode, a merge mode, an AMVP mode, an OBMC mode, a sub-block MVP mode, an affine merge mode, an affine AMVP mode, a bi-directional matching FRUC mode, a template matching FRUC mode, a PDPC mode, etc.

The encoder 3110 may determine an intra prediction method and an inter prediction method considering whether the right block of the lower block is reconstructed. Further, the encoder 3110 may apply the deblocking filter and the SAO filter to the lower block considering whether the right block of the lower block is reconstructed. Also, the encoder 3110 may entropy decode encoding information of the lower block according to the context determined based on whether the adjacent blocks of the lower block are decoded.

The bitstream generator 3120 outputs a bitstream including information about encoding of the current block generated by the encoder 3110. The information about the encoding of the current block may include split information, split shape information, split order information, prediction mode information, etc.

The video encoding device 3100 of FIG. 31 may perform a video encoding method corresponding to a video decoding method performed by the video decoding device 1600 of FIG. 16.

Figure 32:
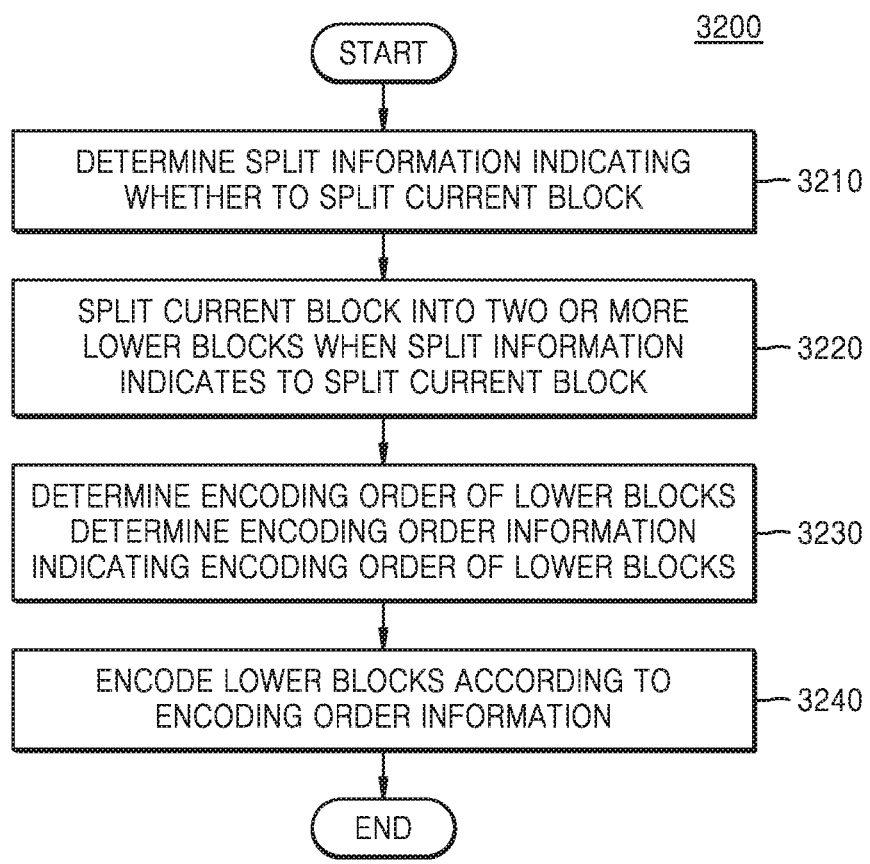
FIG. 32 illustrates a video encoding method regarding splitting of a current block and determination of an encoding order of split lower blocks, according to an embodiment.

FIG. 32 illustrates a video encoding method 3200 according to an embodiment regarding splitting of a current block and determination of an encoding order of split lower blocks.

In operation 3210, split information indicating whether to split the current block is determined.

In operation 3220, when the split information indicates to split the current block, the current block is split into two or more lower blocks.

In operation 3230, an encoding order of the lower blocks is determined, and encoding order information indicating the encoding order of the lower blocks is determined.

In operation 3240, the lower blocks are encoded according to the encoding order information.

Functions of the video encoding device 3100 described with reference to FIG. 31 may be included in the video encoding method 3200.

FIG. 33 is a diagram for explaining a method of indicating splits of a current coding unit.

split_unit( ) may denote syntax for splitting the current coding unit. Split information (split_mode) may include at least one of information indicating whether to perform splitting, split direction information, and split type information. The information indicating whether to perform splitting indicates whether to split the current coding unit. The split direction information indicates that the current coding unit is split into one of a horizontal direction and a vertical direction.

The split type information indicates that the coding unit is split into one of a binary split, a tri split, and a quad split. The binary split means that one of a height and a width of the coding unit is split by ½. The tri split means that one of the height and the width of the coding unit is split into 1:2:1. Also, the quad split means that the height and the width of the coding unit are split by ½.

For convenience of description, the present disclosure describes the split information (split_mode) as being divided into the information indicating whether to perform splitting, the split direction information, and the split type information, but the present disclosure is not limited thereto. Information on a split shape mode may be expressed by combining the information indicating whether to perform splitting, the split direction information, or the split type information. For example, the split information (split_mode) may indicate that the current coding unit is not split (NO_SPLIT). Further, the split information (split_mode) may indicate a quad split (QUAD_SPLIT). Also, the split information (split_mode) may indicate a binary vertical split (BI_VER_SPLIT). Also, the split information (split_mode) may indicate a binary horizontal split (BI_HOR_SPLIT). Further, the split information (split_mode) may indicate a tri vertical split (TRI_VER_SPLIT). The split information (split_mode) may indicate a tri horizontal split TRI_HOR_SPLIT.

The image decoding device 150 may obtain the split information based on a bin string. The image decoding device 150 may determine whether to split the coding unit, a split direction, and a split type, based on the bin string.

The bin string is represented by only bins consisting of syntax elements of '0' or '1'. The bin string may be formed of at least one bit. The image decoding device 150 may determine the number of bits of a bin string based on the number of split shape modes allowable from the current coding unit. For example, the image decoding device 150 may determine that there are a mode in which the current coding unit is split according to a specific split direction and a specific split type, and a mode in which the current coding unit is not split. That is, there may be two split shape modes allowable from the current coding unit. The image decoding device 150 may determine split information of a coding unit based on a bin string for a split mode including one bin. The one bin may indicate whether to perform splitting. The bin may indicate no split (NO_SPLIT). When the bin indicates splitting, the image decoding device 150 may determine the split direction or the split type based on the allowable split shape modes of the current coding unit.

Also, when there are three split shape modes allowable from the current coding unit, the image decoding device 150 may obtain split shape modes of the coding unit based on a bin string including two bins. A first bin of the bin string may indicate whether to perform splitting. The second bin of the bin string may indicate a split type or a split direction. The image decoding device 150 may determine the split direction or the split type based on the allowable split shape modes of the current coding unit.

Also, when there are four or five split shape modes allowable from the current coding unit, the image decoding device 150 may split the coding unit based on a bin string including three bins. A first bin of the bin string may indicate whether to split. A second bin of the bin string may indicate a split type or a split direction. A third bin of the bin string may indicate a split direction or a split type. The image decoding device 150 may determine the split direction or the split type based on the allowable split shape modes of the current coding unit.

The image decoding device 150 may obtain information about the split mode from the bitstream, but is not limited thereto. The image decoding device 150 may determine information about the split shape modes based on a split rule pre-arranged with the image encoding device 100. The image decoding device 150 may determine information about a pre-arranged split mode based on a size of the current coding unit. For example, the image decoding device 150 may determine information about a split mode of a coding unit having a maximum size as QUAD_SPLIT. Further, the image decoding device 150 may determine information about a split mode of a coding unit having a minimum size as NO_SPLIT.

According to an adaptive binarization method of the split shape mode or an inverse binarization method of a bin string regarding the split shape mode, when types of split shape modes allowable for the current block are different, a split mode corresponding to the bin string may vary even though the number of allowable split shape modes is the same.

According to the video encoding technique based on the coding units having the tree structure described above with reference to FIGS. 1 through 3, image data in a spatial domain is encoded for each coding unit having the tree structure, and while decoding is performed on each largest coding unit according to the video decoding technique based on the coding units having the tree structure, the image data in the spatial domain is reconstructed. Therefore, a picture and a video that is a sequence of pictures may be reconstructed. The reconstructed video may be reproduced by a reproduction device, stored in a storage medium, or transmitted through a network.

The above-described embodiments of the present disclosure may be written as a program executable on a computer, and may be implemented on a general-purpose digital computer operating the program by using a computer-readable recording medium.

Although the present disclosure is described in relation to specific best embodiments, other replacements, modifications, and revisions of the present disclosure will be apparent to those skilled in the art in view of the above-described descriptions. That is, the claims are interpreted to include all the replacements, modifications, and revisions. Therefore, all descriptions described in the present specification and the accompanying drawings should be interpreted in an illustrative and non-limiting sense.

The invention claimed is:

1. A video decoding method comprising:
   determining a decoding order between a left lower block and a right lower block split from a current block according to encoding order information obtained from a bitstream, wherein the right lower block is adjacent to a right side of the left lower block;
   when the right lower block is decoded prior to the left lower block according to the determined decoding order, determining context information for a syntax element of prediction mode information of the left lower block based on a sum of a value of prediction mode information of the right lower block, a value of prediction mode information of a left block adjacent to a left side of the left lower block, and a value of prediction mode information of an upper block adjacent to an upper side of the left lower block, wherein the prediction mode information of the left lower block indicates whether the left lower block is predicted in an intra prediction mode, the prediction mode information of the right lower block indicates whether the right lower block is predicted in the intra prediction mode the prediction mode information of the left block indicates whether the left block is predicted in the intra prediction mode, and the prediction mode information of the upper block indicates whether the upper block is predicted in the intra prediction mode;
   obtaining a context index for the syntax element of the prediction mode information of the left lower block using the context information;
   performing context-adaptive arithmetic entropy-decoding using the context index to obtain the prediction mode information of the left lower block; and
   performing prediction on the left lower block using the prediction mode information of the left lower block.

2. A video decoding device comprising:
   an encoding order determiner configured to determine a decoding order between a left lower block and a right lower block split from a current block, according to encoding order information obtained from a bitstream, wherein the right lower block is adjacent to a right side of the left lower block; and
   a decoder configured to, when the right lower block is decoded prior to the left lower block according to the determined decoding order, determine context information for a syntax element of prediction mode information of the left lower block based on a sum of a value of prediction mode information of the right lower block, a value of prediction mode information of a left block adjacent to a left side of the left lower block, and a value of prediction mode information of an upper block adjacent to an upper side of the left lower block, obtain a context index for the syntax element of the prediction mode information of the left lower block using the context information, and perform context-adaptive arithmetic entropy decoding using the context index to obtain the prediction mode information of the left lower block, and perform prediction on the left lower block using the prediction mode information of the left lower block,
   wherein the prediction mode information of the left lower block indicates whether the left lower block is predicted in an intra prediction mode, the prediction mode information of the right lower block indicates whether the right lower block is predicted in the intra prediction mode the prediction mode information of the left block indicates whether the left block is predicted in the intra prediction mode, and the prediction mode information of the upper block indicates whether the upper block is predicted in the intra prediction mode.

3. A video encoding method comprising:
   determining a decoding order between a left lower block and a right lower block split from a current block, wherein the right lower block is adjacent to a right side of the left lower block;
   when the right lower block is decoded prior to the left lower block according to the determined decoding order, determining context information for a syntax element of prediction mode information of the left lower block based on a sum of a value of prediction mode information of the right lower block, a value of prediction mode information of a left block adjacent to a left side of the left lower block and a value of prediction mode information of an upper block adjacent to an upper side of the left lower block, wherein the prediction mode information of the left lower block indicates whether the left lower block is predicted in an intra prediction mode, and the prediction mode information of the right lower block indicates whether the right lower block is predicted in the intra prediction mode the prediction mode information of the left block indicates whether the left block is predicted in the intra prediction mode, and the prediction mode information of the upper block indicates whether the upper block is predicted in the intra prediction mode;
   obtaining a context index for the syntax element of the prediction mode information of the left lower block using the context information; and
   performing context-adaptive arithmetic entropy encoding on the syntax element of the prediction mode information of the left lower block, using the context information.

* * * * *